US012339750B2

(12) United States Patent
Sharma et al.

(10) Patent No.: US 12,339,750 B2
(45) Date of Patent: Jun. 24, 2025

(54) POLICY-BASED DISASTER RECOVERY FOR A CONTAINERIZED APPLICATION

(71) Applicant: Pure Storage, Inc., Mountain View, CA (US)

(72) Inventors: Tapas Sharma, Maharashtra (IN); Luis Pablo Pabón, Sturbridge, MA (US); Timothy Darnell, Estes Park, CO (US); Paul Theunis, Elk Grove, CA (US)

(73) Assignee: Pure Storage, Inc., Santa Clara, CA (US)

( * ) Notice: Subject to any disclaimer, the term of this patent is extended or adjusted under 35 U.S.C. 154(b) by 241 days.

(21) Appl. No.: 18/095,896

(22) Filed: Jan. 11, 2023

(65) Prior Publication Data
US 2023/0205647 A1    Jun. 29, 2023

Related U.S. Application Data

(63) Continuation-in-part of application No. 17/965,996, filed on Oct. 14, 2022, which is a continuation-in-part of application No. 17/947,529, filed on Sep. 19, 2022, which is a continuation-in-part of application No. 17/555,751, filed on Dec. 20, 2021.

(51) Int. Cl.
*G06F 11/14* (2006.01)
(52) U.S. Cl.
CPC ...... *G06F 11/1469* (2013.01); *G06F 11/1464* (2013.01); *G06F 2201/865* (2013.01)
(58) Field of Classification Search
CPC ............. G06F 11/1469; G06F 11/1464; G06F 2201/865
See application file for complete search history.

(56) References Cited

U.S. PATENT DOCUMENTS

| | | |
|---|---|---|
| 7,519,964 B1 | 4/2009 | Islam et al. |
| 7,712,102 B2 | 5/2010 | Herington et al. |
| 7,760,641 B2 | 7/2010 | Gilfix |
| 7,900,206 B1 | 3/2011 | Joshi et al. |
| 7,904,910 B2 | 3/2011 | Romero |
| 7,975,115 B2 | 7/2011 | Wayda et al. |

(Continued)

OTHER PUBLICATIONS

Hwang, et al., "RAID-x: A New Distributed Disk Array for I/O-Centric Cluster Computing", Proceedings the Ninth International Symposium on High-Performance Distributed Computing, 2000, pp. 279-286.

(Continued)

*Primary Examiner* — Mark A Giardino, Jr.
(74) *Attorney, Agent, or Firm* — ALG Intellectual Property, LLC

(57) ABSTRACT

An illustrative method includes a controller associated with a plurality of clusters receiving, from a user, a disaster recovery policy of a containerized application deployed on a first cluster in the plurality of clusters, determining a cluster profile of each second cluster among one or more second clusters that are distinct from the first cluster in the plurality of clusters, identifying, from the one or more second clusters, a particular cluster based on the disaster recovery policy of the containerized application and the cluster profile of each second cluster, and assigning the particular cluster to be a disaster recovery cluster for the containerized application.

20 Claims, 27 Drawing Sheets

(56) References Cited

U.S. PATENT DOCUMENTS

| | | |
|---|---|---|
| 8,392,564 B1 | 3/2013 | Czajkowski et al. |
| 8,495,472 B1 | 7/2013 | Magerramov et al. |
| 8,504,797 B2 | 8/2013 | Mimatsu |
| 8,706,914 B2 | 4/2014 | Duchesneau |
| 8,793,344 B2 | 7/2014 | Manivel et al. |
| 8,822,155 B2 | 9/2014 | Sukumar et al. |
| 8,918,478 B2 | 12/2014 | Ozzie et al. |
| 8,930,536 B2 | 1/2015 | Jackson |
| 9,026,658 B2 | 5/2015 | Xu et al. |
| 9,086,919 B2 | 7/2015 | Iyer et al. |
| 9,256,467 B1 | 2/2016 | Singh et al. |
| 9,275,063 B1 | 3/2016 | Natanzon |
| 9,280,678 B2 | 3/2016 | Redberg |
| 9,300,536 B2 | 3/2016 | Agarwala et al. |
| 9,395,922 B2 | 7/2016 | Nishikido et al. |
| 9,507,676 B2 | 11/2016 | Fitzpatrick et al. |
| 9,552,299 B2 | 1/2017 | Stalzer |
| 9,571,567 B2 | 2/2017 | Shu et al. |
| 9,740,403 B2 | 8/2017 | Storer et al. |
| 9,766,992 B2 | 9/2017 | Wipfel et al. |
| 9,811,387 B2 | 11/2017 | Baughman et al. |
| 9,848,041 B2 | 12/2017 | Einkauf et al. |
| 9,864,874 B1 | 1/2018 | Shanbhag et al. |
| 9,942,351 B2 | 4/2018 | Bhat et al. |
| 9,954,953 B2 | 4/2018 | Baughman et al. |
| 10,015,106 B1 | 7/2018 | Florissi et al. |
| 10,025,673 B1 | 7/2018 | Maccanti et al. |
| 10,027,758 B2 | 7/2018 | Baughman et al. |
| 10,055,239 B2 | 8/2018 | Adogla et al. |
| 10,102,356 B1 | 10/2018 | Sahin et al. |
| 10,153,941 B2 | 12/2018 | Dion et al. |
| 10,185,495 B2 | 1/2019 | Katsuki |
| 10,187,454 B2 | 1/2019 | Sengodan et al. |
| 10,225,335 B2 | 3/2019 | Fu et al. |
| 10,277,668 B1 | 4/2019 | Florissi |
| 10,305,747 B2 | 5/2019 | Shahab et al. |
| 10,324,639 B2 | 6/2019 | Seo |
| 10,348,822 B2 | 7/2019 | Phan et al. |
| 10,382,530 B2 | 8/2019 | Baughman et al. |
| 10,469,585 B2 | 11/2019 | Zhao et al. |
| 10,567,406 B2 | 2/2020 | Astigarraga et al. |
| 10,594,619 B2 | 3/2020 | Kasso et al. |
| 10,664,264 B2 | 5/2020 | Garvey et al. |
| 10,705,883 B2 | 7/2020 | Wen et al. |
| 10,733,029 B2 | 8/2020 | Kumar Shimoga Manjunatha et al. |
| 10,749,940 B2 | 8/2020 | Baughman et al. |
| 10,778,597 B1 | 9/2020 | Tan et al. |
| 10,791,138 B1 | 9/2020 | Siddiqui et al. |
| 10,810,088 B1 | 10/2020 | Gu et al. |
| 10,841,152 B1 | 11/2020 | Humphreys |
| 10,846,137 B2 | 11/2020 | Vallala et al. |
| 10,868,742 B2 | 12/2020 | Chitalia et al. |
| 10,877,683 B2 | 12/2020 | Wu et al. |
| 10,887,380 B2 | 1/2021 | Pahwa et al. |
| 10,893,097 B1 | 1/2021 | Liu et al. |
| 10,904,303 B2 | 1/2021 | Patel et al. |
| 10,909,003 B2 | 2/2021 | Neichev |
| 10,922,284 B1 | 2/2021 | Venkatasubramanian et al. |
| 10,924,535 B2 | 2/2021 | Du et al. |
| 10,963,349 B2 | 3/2021 | Dhamdhere et al. |
| 10,990,912 B2 | 4/2021 | Dravneek et al. |
| 11,036,521 B2 | 6/2021 | Ferrell et al. |
| 11,086,974 B2 | 8/2021 | Iliofotou et al. |
| 11,102,281 B2 | 8/2021 | Chatt et al. |
| 11,102,282 B2 | 8/2021 | Chatt et al. |
| 11,106,810 B2 | 8/2021 | Natanzon et al. |
| 2006/0026599 A1 | 2/2006 | Herington et al. |
| 2007/0180451 A1 | 8/2007 | Ryan et al. |
| 2011/0035540 A1 | 2/2011 | Fitzgerald et al. |
| 2013/0219022 A1 | 8/2013 | Manivel et al. |
| 2013/0297770 A1 | 11/2013 | Zhang |
| 2015/0113150 A1 | 4/2015 | Jackson |
| 2016/0173640 A1 | 6/2016 | Bhat et al. |
| 2016/0179636 A1* | 6/2016 | Fitzpatrick ............ G06F 11/00 714/4.12 |
| 2016/0203060 A1* | 7/2016 | Singh ................... G06F 11/00 714/19 |
| 2016/0323377 A1 | 11/2016 | Einkauf et al. |
| 2017/0099352 A1 | 4/2017 | Baughman et al. |
| 2017/0235603 A1 | 8/2017 | Baughman et al. |
| 2017/0235616 A1 | 8/2017 | Baughman et al. |
| 2017/0237804 A1 | 8/2017 | Baughman et al. |
| 2017/0257432 A1 | 9/2017 | Fu et al. |
| 2017/0339008 A1 | 11/2017 | Dion et al. |
| 2017/0373940 A1 | 12/2017 | Shahab et al. |
| 2018/0046446 A1 | 2/2018 | Turovsky et al. |
| 2018/0048532 A1 | 2/2018 | Poort et al. |
| 2018/0219794 A1 | 8/2018 | Patil et al. |
| 2018/0287902 A1 | 10/2018 | Chitalia et al. |
| 2018/0293152 A1 | 10/2018 | Sherafat Kazemzadeh et al. |
| 2019/0102155 A1 | 4/2019 | Garvey et al. |
| 2019/0238625 A1 | 8/2019 | Baughman et al. |
| 2019/0253490 A1 | 8/2019 | Du et al. |
| 2019/0324786 A1 | 10/2019 | Ranjan et al. |
| 2019/0327271 A1 | 10/2019 | Saxena et al. |
| 2019/0384649 A1 | 12/2019 | Wen et al. |
| 2020/0073764 A1 | 3/2020 | Neichev |
| 2020/0104202 A1 | 4/2020 | Stupak et al. |
| 2020/0133689 A1 | 4/2020 | Ferrell et al. |
| 2020/0136920 A1 | 4/2020 | Doshi et al. |
| 2020/0151023 A1 | 5/2020 | Bai et al. |
| 2020/0186441 A1 | 6/2020 | Fitzer et al. |
| 2020/0192692 A1 | 6/2020 | Ghag et al. |
| 2020/0265134 A1 | 8/2020 | Cristina et al. |
| 2020/0267071 A1 | 8/2020 | Ghag |
| 2020/0267210 A1 | 8/2020 | Chatt et al. |
| 2020/0267212 A1 | 8/2020 | Chatt et al. |
| 2020/0301751 A1 | 9/2020 | Wen et al. |
| 2020/0314173 A1 | 10/2020 | Pahwa et al. |
| 2020/0341789 A1 | 10/2020 | Ghag et al. |
| 2020/0379794 A1 | 12/2020 | Kim |
| 2021/0037087 A1 | 2/2021 | Liu et al. |
| 2021/0084048 A1 | 3/2021 | Kannan et al. |
| 2021/0099515 A1 | 4/2021 | Liu et al. |
| 2021/0160138 A1 | 5/2021 | Barnes et al. |
| 2021/0200814 A1 | 7/2021 | Tal et al. |
| 2021/0240539 A1 | 8/2021 | Murthy et al. |
| 2021/0281662 A1 | 9/2021 | Mathur |
| 2021/0286611 A1 | 9/2021 | Garvey et al. |
| 2021/0377184 A1 | 12/2021 | Singh et al. |
| 2022/0191248 A1 | 6/2022 | Pieczul et al. |
| 2023/0035310 A1 | 2/2023 | Denneman et al. |
| 2023/0111775 A1 | 4/2023 | Lee et al. |
| 2023/0126168 A1 | 4/2023 | Birsan et al. |
| 2023/0205599 A1* | 6/2023 | Pathak ................. G06F 9/5072 718/104 |

OTHER PUBLICATIONS

Stalzer, et al., "FlashBlades: System Architecture and Applications", Proceedings of the 2nd Workshop on Architectures and Systems for Big Data, Association for Computing Machinery, New York, NY, 2012, pp. 10-14.

Storer, et al., "Pergamum: Replacing Tape with Energy Efficient, Reliable, Disc-Based Archival Storage", FAST'08: Proceedings of the 6th USENIX Conference on File and Storage Technologies, Feb. 2008, Article No. 1, pp. 1-16.

* cited by examiner

POLICY-BASED DISASTER RECOVERY FOR A CONTAINERIZED APPLICATION

RELATED APPLICATIONS

This application is a continuation-in-part of U.S. patent application Ser. No. 17/965,996, filed Oct. 14, 2022, which is a continuation-in-part of U.S. patent application Ser. No. 17/947,529, filed Sep. 19, 2022, which is a continuation-in-part of U.S. patent application Ser. No. 17/555,751, filed Dec. 20, 2021. The content of these applications is hereby incorporated by reference in its entirety.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DESCRIPTION OF EMBODIMENTS

Figure 1A:
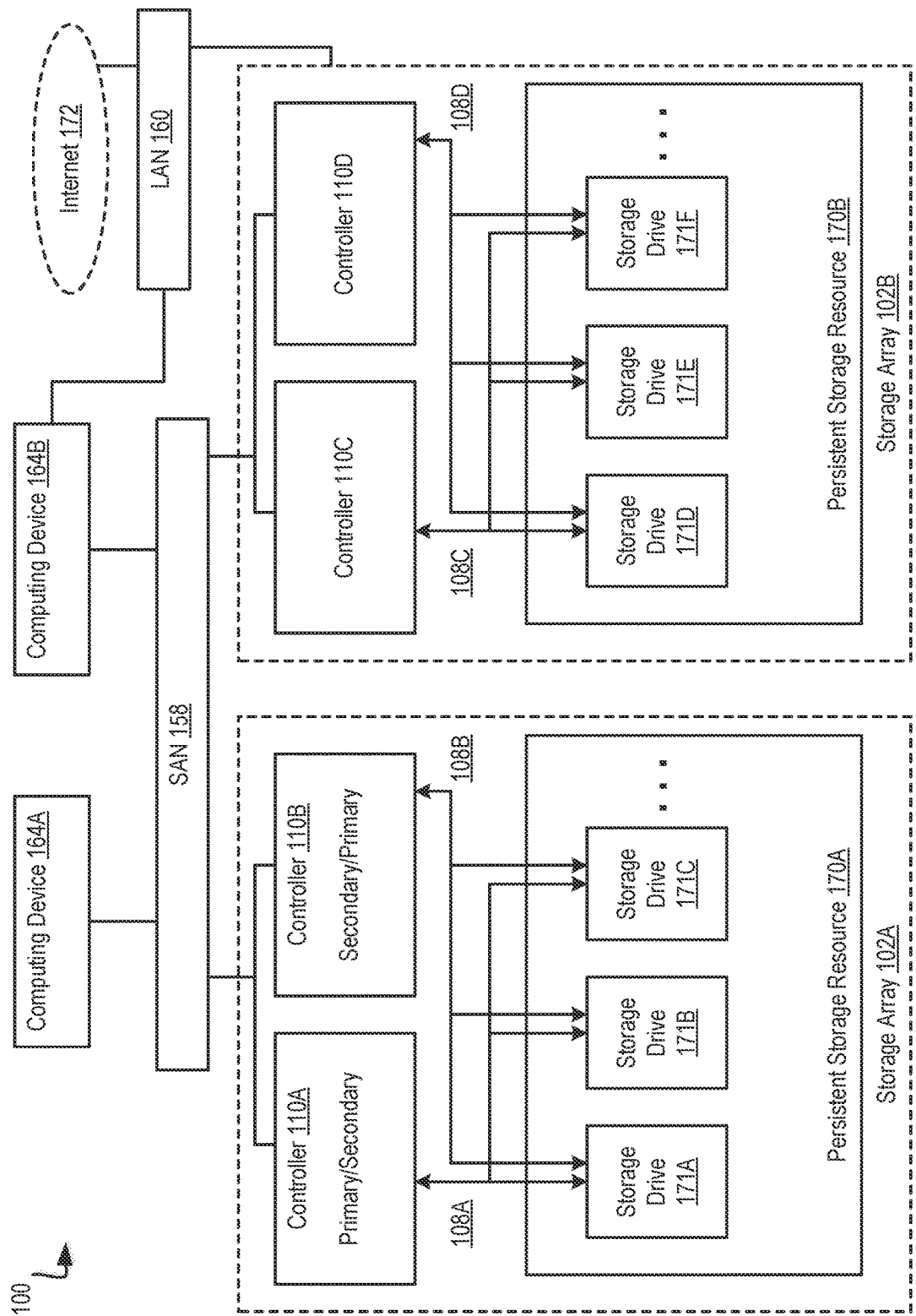
FIG. 1A illustrates a first example system for data storage in accordance with some implementations.

Example methods, apparatuses, and products are described herein for containerized application deployment and disaster recovery across clusters, which disaster recovery may include one or more ways of identifying a disaster recovery cluster for a containerized application. These methods, apparatuses, and products are described in accordance with embodiments of the present disclosure and with reference to the accompanying drawings, beginning with FIG. 1A. FIG. 1A illustrates an example system for data storage, in accordance with some implementations. System 100 (also referred to as "storage system" herein) includes numerous elements for purposes of illustration rather than limitation. It may be noted that system 100 may include the same, more, or fewer elements configured in the same or different manner in other implementations.

System 100 includes a number of computing devices 164A-B. Computing devices (also referred to as "client devices" herein) may be embodied, for example, a server in a data center, a workstation, a personal computer, a notebook, or the like. Computing devices 164A-B may be coupled for data communications to one or more storage arrays 102A-B through a storage area network ('SAN') 158 or a local area network ('LAN') 160.

The SAN 158 may be implemented with a variety of data communications fabrics, devices, and protocols. For example, the fabrics for SAN 158 may include Fibre Channel, Ethernet, Infiniband, Serial Attached Small Computer System Interface ('SAS'), or the like. Data communications protocols for use with SAN 158 may include Advanced Technology Attachment ('ATA'), Fibre Channel Protocol, Small Computer System Interface ('SCSI'), Internet Small Computer System Interface ('iSCSI'), HyperSCSI, Non-Volatile Memory Express ('NVMe') over Fabrics, or the like. It may be noted that SAN 158 is provided for illustration, rather than limitation. Other data communication couplings may be implemented between computing devices 164A-B and storage arrays 102A-B.

The LAN 160 may also be implemented with a variety of fabrics, devices, and protocols. For example, the fabrics for LAN 160 may include Ethernet (802.3), wireless (802.11), or the like. Data communication protocols for use in LAN 160 may include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol ('SIP'), Real Time Protocol ('RTP'), or the like.

Storage arrays 102A-B may provide persistent data storage for the computing devices 164A-B. Storage array 102A may be contained in a chassis (not shown), and storage array 102B may be contained in another chassis (not shown), in some implementations. Storage array 102A and 102B may include one or more storage array controllers 110A-D (also referred to as "controller" herein). A storage array controller 110A-D may be embodied as a module of automated computing machinery comprising computer hardware, computer software, or a combination of computer hardware and software. In some implementations, the storage array controllers 110A-D may be configured to carry out various storage tasks. Storage tasks may include writing data received from the computing devices 164A-B to storage array 102A-B, erasing data from storage array 102A-B, retrieving data from storage array 102A-B and providing data to computing devices 164A-B, monitoring and reporting of storage device utilization and performance, performing redundancy operations, such as Redundant Array of Independent Drives ('RAID') or RAID-like data redundancy operations, compressing data, encrypting data, and so forth.

Storage array controller 110A-D may be implemented in a variety of ways, including as a Field Programmable Gate Array ('FPGA'), a Programmable Logic Chip ('PLC'), an Application Specific Integrated Circuit ('ASIC'), System-on-Chip ('SOC'), or any computing device that includes discrete components such as a processing device, central processing unit, computer memory, or various adapters. Storage array controller 110A-D may include, for example, a data communications adapter configured to support communications via the SAN 158 or LAN 160. In some implementations, storage array controller 110A-D may be independently coupled to the LAN 160. In some implementations, storage array controller 110A-D may include an I/O controller or the like that couples the storage array controller 110A-D for data communications, through a midplane (not shown), to a persistent storage resource 170A-B (also referred to as a "storage resource" herein). The persistent storage resource 170A-B may include any number of storage drives 171A-F (also referred to as "storage devices" herein) and any number of non-volatile Random Access Memory ('NVRAM') devices (not shown).

In some implementations, the NVRAM devices of a persistent storage resource 170A-B may be configured to receive, from the storage array controller 110A-D, data to be stored in the storage drives 171A-F. In some examples, the data may originate from computing devices 164A-B. In some examples, writing data to the NVRAM device may be carried out more quickly than directly writing data to the storage drive 171A-F. In some implementations, the storage array controller 110A-D may be configured to utilize the NVRAM devices as a quickly accessible buffer for data destined to be written to the storage drives 171A-F. Latency for write requests using NVRAM devices as a buffer may be improved relative to a system in which a storage array controller 110A-D writes data directly to the storage drives 171A-F. In some implementations, the NVRAM devices may be implemented with computer memory in the form of high bandwidth, low latency RAM. The NVRAM device is referred to as "non-volatile" because the NVRAM device may receive or include a unique power source that maintains the state of the RAM after main power loss to the NVRAM device. Such a power source may be a battery, one or more capacitors, or the like. In response to a power loss, the NVRAM device may be configured to write the contents of the RAM to a persistent storage, such as the storage drives 171A-F.

In some implementations, storage drive 171A-F may refer to any device configured to record data persistently, where "persistently" or "persistent" refers as to a device's ability to maintain recorded data after loss of power. In some implementations, storage drive 171A-F may correspond to non-disk storage media. For example, the storage drive 171A-F may be one or more solid-state drives ('SSDs'), flash memory based storage, any type of solid-state non-volatile memory, or any other type of non-mechanical storage device. In other implementations, storage drive 171A-F may include mechanical or spinning hard disk, such as hard-disk drives ('HDD').

In some implementations, the storage array controllers 110A-D may be configured for offloading device management responsibilities from storage drive 171A-F in storage array 102A-B. For example, storage array controllers 110A-D may manage control information that may describe the state of one or more memory blocks in the storage drives 171A-F. The control information may indicate, for example, that a particular memory block has failed and should no longer be written to, that a particular memory block contains boot code for a storage array controller 110A-D, the number of program-erase ('P/E') cycles that have been performed on a particular memory block, the age of data stored in a particular memory block, the type of data that is stored in a particular memory block, and so forth. In some implementations, the control information may be stored with an associated memory block as metadata. In other implementations, the control information for the storage drives 171A-F may be stored in one or more particular memory blocks of the storage drives 171A-F that are selected by the storage array controller 110A-D. The selected memory blocks may be tagged with an identifier indicating that the selected memory block contains control information. The identifier may be utilized by the storage array controllers 110A-D in conjunction with storage drives 171A-F to quickly identify the memory blocks that contain control information. For example, the storage controllers 110A-D may issue a command to locate memory blocks that contain control information. It may be noted that control information may be so large that parts of the control information may be stored in multiple locations, that the control information may be stored in multiple locations for purposes of redundancy, for example, or that the control information may otherwise be distributed across multiple memory blocks in the storage drives 171A-F.

In some implementations, storage array controllers 110A-D may offload device management responsibilities from storage drives 171A-F of storage array 102A-B by retrieving, from the storage drives 171A-F, control information describing the state of one or more memory blocks in the storage drives 171A-F. Retrieving the control information from the storage drives 171A-F may be carried out, for example, by the storage array controller 110A-D querying the storage drives 171A-F for the location of control information for a particular storage drives 171A-F. The storage drives 171A-F may be configured to execute instructions that enable the storage drive 171A-F to identify the location of the control information. The instructions may be executed by a controller (not shown) associated with or otherwise located on the storage drive 171A-F and may cause the storage drive 171A-F to scan a portion of each memory block to identify the memory blocks that store control information for the storage drives 171A-F. The storage drives 171A-F may respond by sending a response message to the storage array controller 110A-D that includes the location of control information for the storage drive 171A-F. Responsive to receiving the response message, storage array controllers 110A-D may issue a request to read data stored at the address associated with the location of control information for the storage drives 171A-F.

In other implementations, the storage array controllers 110A-D may further offload device management responsibilities from storage drives 171A-F by performing, in response to receiving the control information, a storage drive management operation. A storage drive management operation may include, for example, an operation that is typically performed by the storage drive 171A-F (e.g., the controller (not shown) associated with a particular storage drive 171A-F). A storage drive management operation may include, for example, ensuring that data is not written to failed memory blocks within the storage drive 171A-F, ensuring that data is written to memory blocks within the storage drive 171A-F in such a way that adequate wear leveling is achieved, and so forth.

In some implementations, storage array 102A-B may implement two or more storage array controllers 110A-D. For example, storage array 102A may include storage array controllers 110A and storage array controllers 110B. At a given instant, a single storage array controller 110A-D (e.g., storage array controller 110A) of a storage system 100 may be designated with primary status (also referred to as "primary controller" herein), and other storage array controllers 110A-D (e.g., storage array controller 110A) may be designated with secondary status (also referred to as "secondary controller" herein). The primary controller may have particular rights, such as permission to alter data in persistent storage resource 170A-B (e.g., writing data to persistent storage resource 170A-B). At least some of the rights of the primary controller may supersede the rights of the secondary controller. For instance, the secondary controller may not have permission to alter data in persistent storage resource 170A-B when the primary controller has the right. The status of storage array controllers 110A-D may change. For example, storage array controller 110A may be designated with secondary status, and storage array controller 110B may be designated with primary status.

In some implementations, a primary controller, such as storage array controller 110A, may serve as the primary controller for one or more storage arrays 102A-B, and a second controller, such as storage array controller 110B, may serve as the secondary controller for the one or more storage arrays 102A-B. For example, storage array controller 110A may be the primary controller for storage array 102A and storage array 102B, and storage array controller 110B may be the secondary controller for storage array 102A and 102B. In some implementations, storage array controllers 110C and 110D (also referred to as "storage processing modules") may neither have primary or secondary status. Storage array controllers 110C and 110D, implemented as storage processing modules, may act as a communication interface between the primary and secondary controllers (e.g., storage array controllers 110A and 110B, respectively) and storage array 102B. For example, storage array controller 110A of storage array 102A may send a write request, via SAN 158, to storage array 102B. The write request may be received by both storage array controllers 110C and 110D of storage array 102B. Storage array controllers 110C and 110D facilitate the communication, e.g., send the write request to the appropriate storage drive 171A-F. It may be noted that in some implementations storage processing modules may be used to increase the number of storage drives controlled by the primary and secondary controllers.

In some implementations, storage array controllers 110A-D are communicatively coupled, via a midplane (not shown), to one or more storage drives 171A-F and to one or more NVRAM devices (not shown) that are included as part of a storage array 102A-B. The storage array controllers 110A-D may be coupled to the midplane via one or more data communication links and the midplane may be coupled to the storage drives 171A-F and the NVRAM devices via one or more data communications links. The data communications links described herein are collectively illustrated by data communications links 108A-D and may include a Peripheral Component Interconnect Express ('PCIe') bus, for example.

Figure 1B:
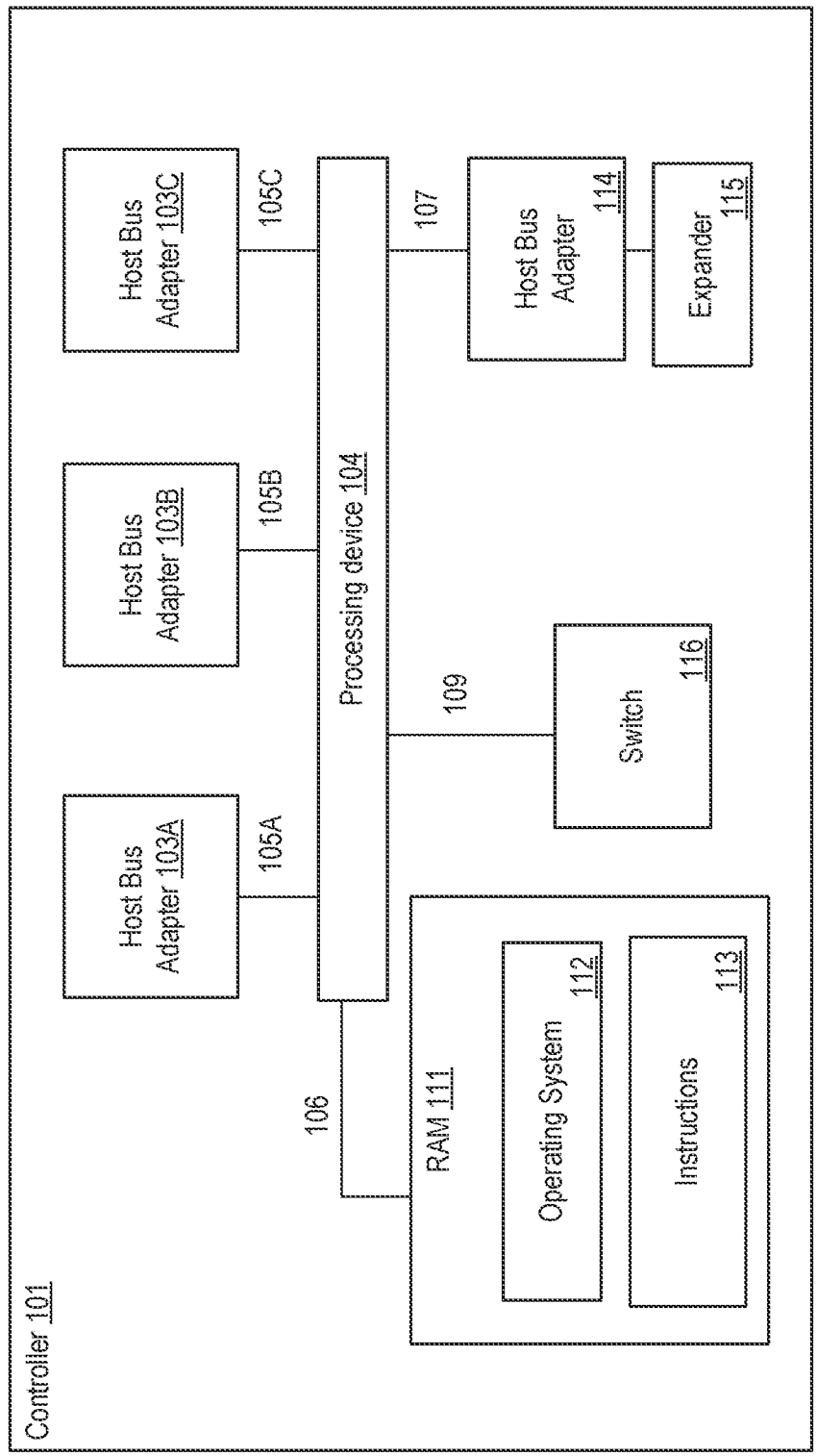
FIG. 1B illustrates a second example system for data storage in accordance with some implementations.

FIG. 1B illustrates an example system for data storage, in accordance with some implementations. Storage array controller 101 illustrated in FIG. 1B may be similar to the storage array controllers 110A-D described with respect to FIG. 1A. In one example, storage array controller 101 may be similar to storage array controller 110A or storage array controller 110B. Storage array controller 101 includes numerous elements for purposes of illustration rather than limitation. It may be noted that storage array controller 101 may include the same, more, or fewer elements configured in the same or different manner in other implementations. It may be noted that elements of FIG. 1A may be included below to help illustrate features of storage array controller 101.

Storage array controller 101 may include one or more processing devices 104 and random access memory ('RAM') 111. Processing device 104 (or controller 101) represents one or more general-purpose processing devices such as a microprocessor, central processing unit, or the like. More particularly, the processing device 104 (or controller 101) may be a complex instruction set computing ('CISC') microprocessor, reduced instruction set computing ('RISC') microprocessor, very long instruction word ('VLIW') microprocessor, or a processor implementing other instruction sets or processors implementing a combination of instruction sets. The processing device 104 (or controller 101) may also be one or more special-purpose processing devices such as an ASIC, an FPGA, a digital signal processor ('DSP'), network processor, or the like.

The processing device 104 may be connected to the RAM 111 via a data communications link 106, which may be embodied as a high speed memory bus such as a Double-Data Rate 4 ('DDR4') bus. Stored in RAM 111 is an operating system 112. In some implementations, instructions 113 are stored in RAM 111. Instructions 113 may include computer program instructions for performing operations in in a direct-mapped flash storage system. In one embodiment, a direct-mapped flash storage system is one that that addresses data blocks within flash drives directly and without an address translation performed by the storage controllers of the flash drives.

In some implementations, storage array controller 101 includes one or more host bus adapters 103A-C that are coupled to the processing device 104 via a data communications link 105A-C. In some implementations, host bus adapters 103A-C may be computer hardware that connects a host system (e.g., the storage array controller) to other network and storage arrays. In some examples, host bus adapters 103A-C may be a Fibre Channel adapter that enables the storage array controller 101 to connect to a SAN, an Ethernet adapter that enables the storage array controller 101 to connect to a LAN, or the like. Host bus adapters 103A-C may be coupled to the processing device 104 via a data communications link 105A-C such as, for example, a PCIe bus.

In some implementations, storage array controller 101 may include a host bus adapter 114 that is coupled to an expander 115. The expander 115 may be used to attach a host system to a larger number of storage drives. The expander 115 may, for example, be a SAS expander utilized to enable the host bus adapter 114 to attach to storage drives in an implementation where the host bus adapter 114 is embodied as a SAS controller.

In some implementations, storage array controller 101 may include a switch 116 coupled to the processing device 104 via a data communications link 109. The switch 116 may be a computer hardware device that can create multiple endpoints out of a single endpoint, thereby enabling multiple devices to share a single endpoint. The switch 116 may, for example, be a PCIe switch that is coupled to a PCIe bus (e.g., data communications link 109) and presents multiple PCIe connection points to the midplane.

In some implementations, storage array controller 101 includes a data communications link 107 for coupling the storage array controller 101 to other storage array controllers. In some examples, data communications link 107 may be a QuickPath Interconnect (QPI) interconnect.

A traditional storage system that uses traditional flash drives may implement a process across the flash drives that are part of the traditional storage system. For example, a higher level process of the storage system may initiate and control a process across the flash drives. However, a flash drive of the traditional storage system may include its own storage controller that also performs the process. Thus, for the traditional storage system, a higher level process (e.g., initiated by the storage system) and a lower level process (e.g., initiated by a storage controller of the storage system) may both be performed.

To resolve various deficiencies of a traditional storage system, operations may be performed by higher level processes and not by the lower level processes. For example, the flash storage system may include flash drives that do not include storage controllers that provide the process. Thus, the operating system of the flash storage system itself may initiate and control the process. This may be accomplished by a direct-mapped flash storage system that addresses data blocks within the flash drives directly and without an address translation performed by the storage controllers of the flash drives.

In some implementations, storage drive 171A-F may be one or more zoned storage devices. In some implementations, the one or more zoned storage devices may be a shingled HDD. In some implementations, the one or more storage devices may be a flash-based SSD. In a zoned storage device, a zoned namespace on the zoned storage device can be addressed by groups of blocks that are grouped and aligned by a natural size, forming a number of addressable zones. In some implementations utilizing an SSD, the natural size may be based on the erase block size of the SSD. In some implementations, the zones of the zoned storage device may be defined during initialization of the zoned storage device. In some implementations, the zones may be defined dynamically as data is written to the zoned storage device.

In some implementations, zones may be heterogeneous, with some zones each being a page group and other zones being multiple page groups. In some implementations, some zones may correspond to an erase block and other zones may correspond to multiple erase blocks. In an implementation, zones may be any combination of differing numbers of pages in page groups and/or erase blocks, for heterogeneous mixes of programming modes, manufacturers, product types and/or product generations of storage devices, as applied to heterogeneous assemblies, upgrades, distributed storages, etc. In some implementations, zones may be defined as having usage characteristics, such as a property of supporting data with particular kinds of longevity (very short lived or very long lived, for example). These properties could be used by a zoned storage device to determine how the zone will be managed over the zone's expected lifetime.

It should be appreciated that a zone is a virtual construct. Any particular zone may not have a fixed location at a storage device. Until allocated, a zone may not have any location at a storage device. A zone may correspond to a number representing a chunk of virtually allocatable space that is the size of an erase block or other block size in various implementations. When the system allocates or opens a zone, zones get allocated to flash or other solid-state storage memory and, as the system writes to the zone, pages are written to that mapped flash or other solid-state storage memory of the zoned storage device. When the system closes the zone, the associated erase block(s) or other sized block(s) are completed. At some point in the future, the system may delete a zone which will free up the zone's allocated space. During its lifetime, a zone may be moved around to different locations of the zoned storage device, e.g., as the zoned storage device does internal maintenance.

In some implementations, the zones of the zoned storage device may be in different states. A zone may be in an empty state in which data has not been stored at the zone. An empty zone may be opened explicitly, or implicitly by writing data to the zone. This is the initial state for zones on a fresh zoned storage device, but may also be the result of a zone reset. In some implementations, an empty zone may have a designated location within the flash memory of the zoned storage device. In an implementation, the location of the empty zone may be chosen when the zone is first opened or first written to (or later if writes are buffered into memory). A zone may be in an open state either implicitly or explicitly, where a zone that is in an open state may be written to store data with write or append commands. In an implementation, a zone that is in an open state may also be written to using a copy command that copies data from a different zone. In some implementations, a zoned storage device may have a limit on the number of open zones at a particular time.

A zone in a closed state is a zone that has been partially written to, but has entered a closed state after issuing an explicit close operation. A zone in a closed state may be left available for future writes, but may reduce some of the run-time overhead consumed by keeping the zone in an open state. In some implementations, a zoned storage device may have a limit on the number of closed zones at a particular time. A zone in a full state is a zone that is storing data and can no longer be written to. A zone may be in a full state either after writes have written data to the entirety of the zone or as a result of a zone finish operation. Prior to a finish operation, a zone may or may not have been completely written. After a finish operation, however, the zone may not be opened a written to further without first performing a zone reset operation.

The mapping from a zone to an erase block (or to a shingled track in an HDD) may be arbitrary, dynamic, and hidden from view. The process of opening a zone may be an operation that allows a new zone to be dynamically mapped to underlying storage of the zoned storage device, and then allows data to be written through appending writes into the zone until the zone reaches capacity. The zone can be finished at any point, after which further data may not be written into the zone. When the data stored at the zone is no longer needed, the zone can be reset which effectively deletes the zone's content from the zoned storage device, making the physical storage held by that zone available for the subsequent storage of data. Once a zone has been written and finished, the zoned storage device ensures that the data stored at the zone is not lost until the zone is reset. In the time between writing the data to the zone and the resetting of the zone, the zone may be moved around between shingle tracks or erase blocks as part of maintenance operations within the zoned storage device, such as by copying data to keep the data refreshed or to handle memory cell aging in an SSD.

In some implementations utilizing an HDD, the resetting of the zone may allow the shingle tracks to be allocated to a new, opened zone that may be opened at some point in the future. In some implementations utilizing an SSD, the resetting of the zone may cause the associated physical erase block(s) of the zone to be erased and subsequently reused for the storage of data. In some implementations, the zoned storage device may have a limit on the number of open zones at a point in time to reduce the amount of overhead dedicated to keeping zones open.

The operating system of the flash storage system may identify and maintain a list of allocation units across multiple flash drives of the flash storage system. The allocation units may be entire erase blocks or multiple erase blocks. The operating system may maintain a map or address range that directly maps addresses to erase blocks of the flash drives of the flash storage system.

Direct mapping to the erase blocks of the flash drives may be used to rewrite data and erase data. For example, the operations may be performed on one or more allocation units that include a first data and a second data where the first data is to be retained and the second data is no longer being used by the flash storage system. The operating system may initiate the process to write the first data to new locations within other allocation units and erasing the second data and marking the allocation units as being available for use for subsequent data. Thus, the process may only be performed by the higher level operating system of the flash storage system without an additional lower level process being performed by controllers of the flash drives.

Advantages of the process being performed only by the operating system of the flash storage system include increased reliability of the flash drives of the flash storage system as unnecessary or redundant write operations are not being performed during the process. One possible point of novelty here is the concept of initiating and controlling the process at the operating system of the flash storage system. In addition, the process can be controlled by the operating system across multiple flash drives. This is contrast to the process being performed by a storage controller of a flash drive.

A storage system can consist of two storage array controllers that share a set of drives for failover purposes, or it could consist of a single storage array controller that provides a storage service that utilizes multiple drives, or it could consist of a distributed network of storage array controllers each with some number of drives or some amount of Flash storage where the storage array controllers in the network collaborate to provide a complete storage service and collaborate on various aspects of a storage service including storage allocation and garbage collection.

Figure 1C:
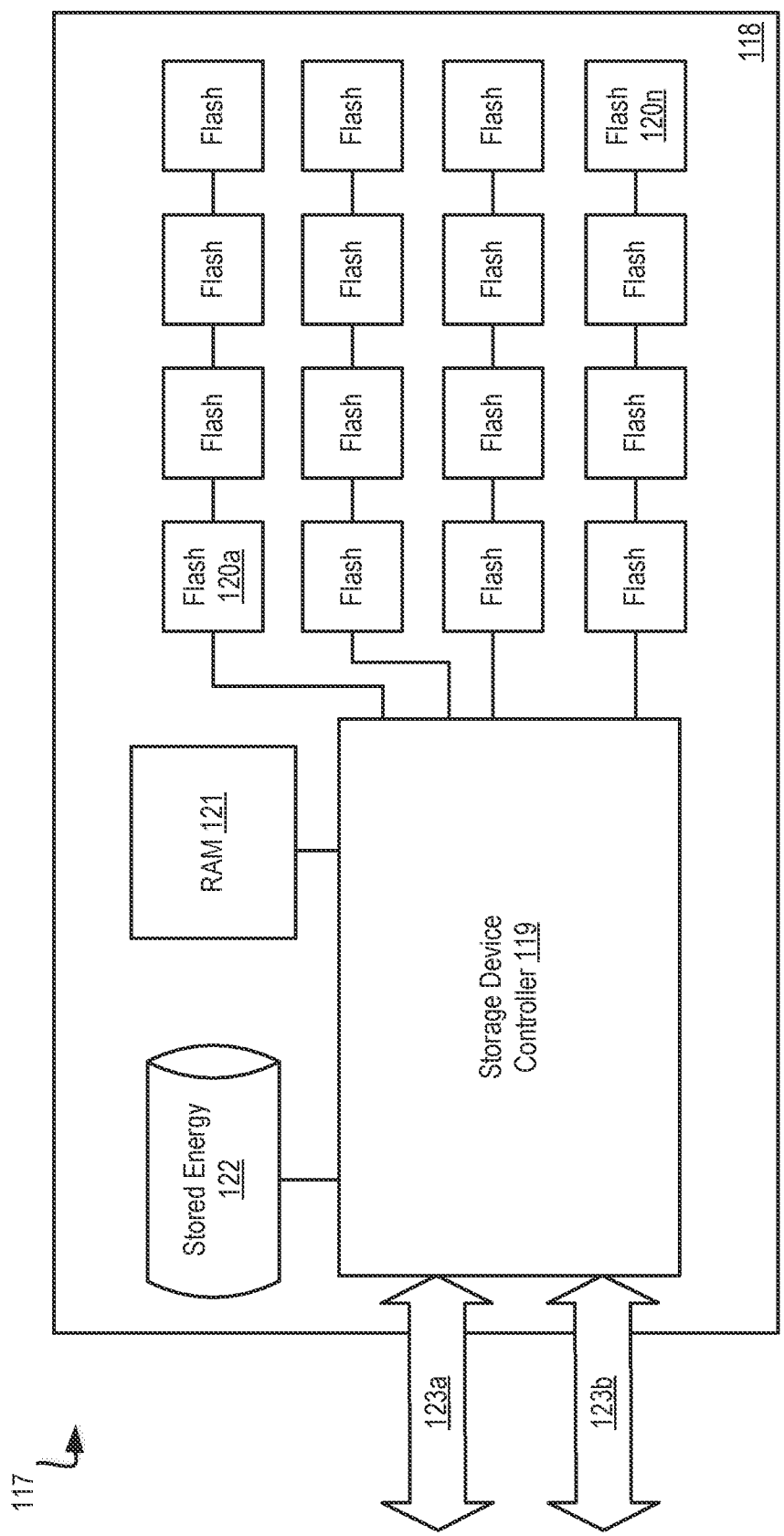
FIG. 1C illustrates a third example system for data storage in accordance with some implementations.

FIG. 1C illustrates a third example system 117 for data storage in accordance with some implementations. System 117 (also referred to as "storage system" herein) includes numerous elements for purposes of illustration rather than limitation. It may be noted that system 117 may include the same, more, or fewer elements configured in the same or different manner in other implementations.

In one embodiment, system 117 includes a dual Peripheral Component Interconnect ('PCI') flash storage device 118 with separately addressable fast write storage. System 117 may include a storage device controller 119. In one embodiment, storage device controller 119A-D may be a CPU, ASIC, FPGA, or any other circuitry that may implement control structures necessary according to the present disclosure. In one embodiment, system 117 includes flash memory devices (e.g., including flash memory devices 120*a*-*n*), operatively coupled to various channels of the storage device controller 119. Flash memory devices 120*a*-*n*, may be presented to the controller 119A-D as an addressable collection of Flash pages, erase blocks, and/or control elements sufficient to allow the storage device controller 119A-D to program and retrieve various aspects of the Flash. In one embodiment, storage device controller 119A-D may perform operations on flash memory devices 120*a*-*n* including storing and retrieving data content of pages, arranging and erasing any blocks, tracking statistics related to the use and reuse of Flash memory pages, erase blocks, and cells, tracking and predicting error codes and faults within the Flash memory, controlling voltage levels associated with programming and retrieving contents of Flash cells, etc.

In one embodiment, system 117 may include RAM 121 to store separately addressable fast-write data. In one embodiment, RAM 121 may be one or more separate discrete devices. In another embodiment, RAM 121 may be integrated into storage device controller 119A-D or multiple storage device controllers. The RAM 121 may be utilized for other purposes as well, such as temporary program memory for a processing device (e.g., a CPU) in the storage device controller 119.

In one embodiment, system 117 may include a stored energy device 122, such as a rechargeable battery or a capacitor. Stored energy device 122 may store energy sufficient to power the storage device controller 119, some amount of the RAM (e.g., RAM 121), and some amount of Flash memory (e.g., Flash memory 120a-120n) for sufficient time to write the contents of RAM to Flash memory. In one embodiment, storage device controller 119A-D may write the contents of RAM to Flash Memory if the storage device controller detects loss of external power.

In one embodiment, system 117 includes two data communications links 123a, 123b. In one embodiment, data communications links 123a, 123b may be PCI interfaces. In another embodiment, data communications links 123a, 123b may be based on other communications standards (e.g., HyperTransport, InfiniBand, etc.). Data communications links 123a, 123b may be based on non-volatile memory express ('NVMe') or NVMe over fabrics ('NVMf') specifications that allow external connection to the storage device controller 119A-D from other components in the storage system 117. It should be noted that data communications links may be interchangeably referred to herein as PCI buses for convenience.

System 117 may also include an external power source (not shown), which may be provided over one or both data communications links 123a, 123b, or which may be provided separately. An alternative embodiment includes a separate Flash memory (not shown) dedicated for use in storing the content of RAM 121. The storage device controller 119A-D may present a logical device over a PCI bus which may include an addressable fast-write logical device, or a distinct part of the logical address space of the storage device 118, which may be presented as PCI memory or as persistent storage. In one embodiment, operations to store into the device are directed into the RAM 121. On power failure, the storage device controller 119A-D may write stored content associated with the addressable fast-write logical storage to Flash memory (e.g., Flash memory 120a-n) for long-term persistent storage.

In one embodiment, the logical device may include some presentation of some or all of the content of the Flash memory devices 120a-n, where that presentation allows a storage system including a storage device 118 (e.g., storage system 117) to directly address Flash memory pages and directly reprogram erase blocks from storage system components that are external to the storage device through the PCI bus. The presentation may also allow one or more of the external components to control and retrieve other aspects of the Flash memory including some or all of: tracking statistics related to use and reuse of Flash memory pages, erase blocks, and cells across all the Flash memory devices; tracking and predicting error codes and faults within and across the Flash memory devices; controlling voltage levels associated with programming and retrieving contents of Flash cells; etc.

In one embodiment, the stored energy device 122 may be sufficient to ensure completion of in-progress operations to the Flash memory devices 120a-120n stored energy device 122 may power storage device controller 119A-D and associated Flash memory devices (e.g., 120a-n) for those operations, as well as for the storing of fast-write RAM to Flash memory. Stored energy device 122 may be used to store accumulated statistics and other parameters kept and tracked by the Flash memory devices 120a-n and/or the storage device controller 119. Separate capacitors or stored energy devices (such as smaller capacitors near or embedded within the Flash memory devices themselves) may be used for some or all of the operations described herein.

Various schemes may be used to track and optimize the life span of the stored energy component, such as adjusting voltage levels over time, partially discharging the stored energy device 122 to measure corresponding discharge characteristics, etc. If the available energy decreases over time, the effective available capacity of the addressable fast-write storage may be decreased to ensure that it can be written safely based on the currently available stored energy.

Figure 1D:
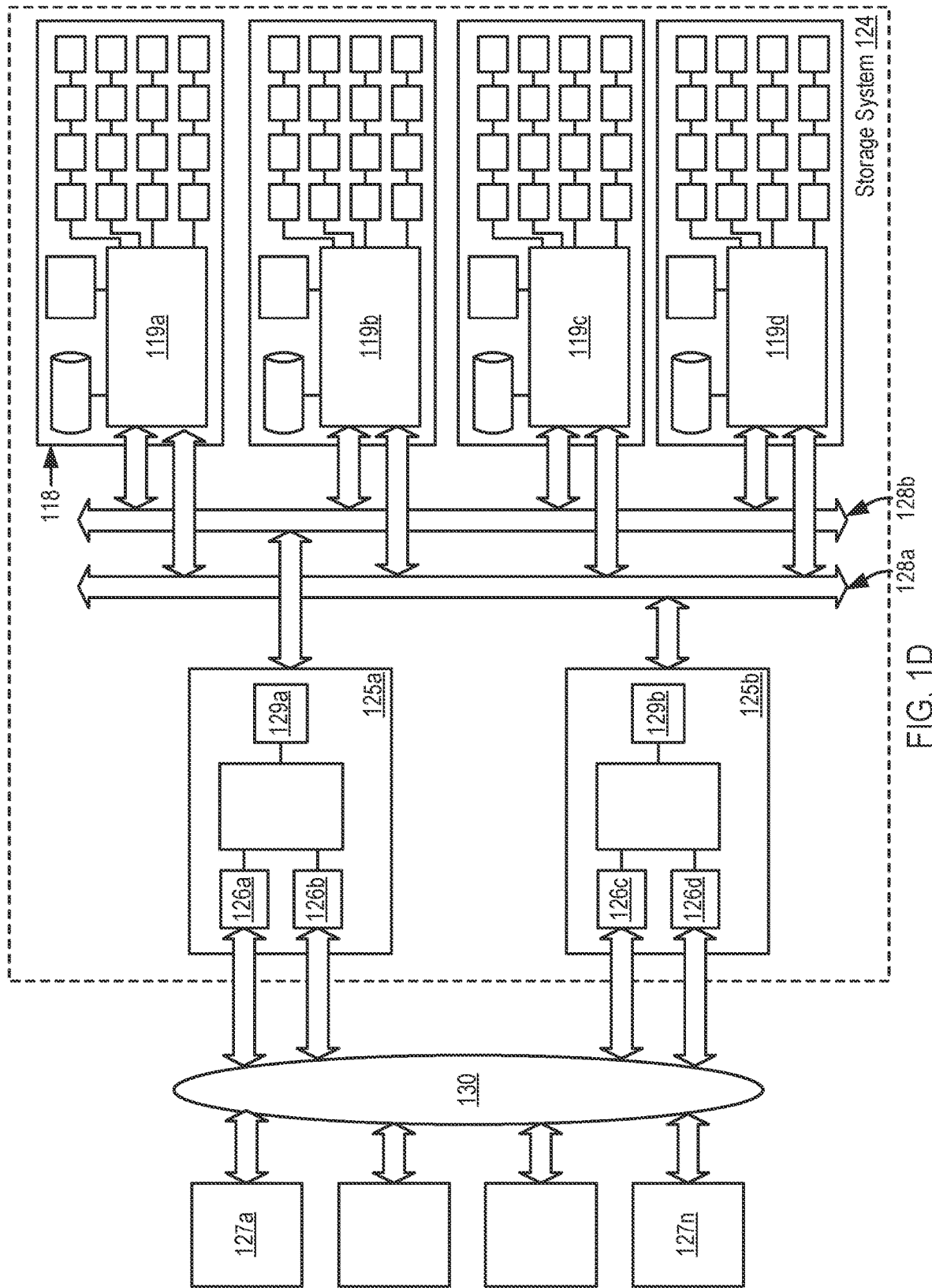
FIG. 1D illustrates a fourth example system for data storage in accordance with some implementations.

FIG. 1D illustrates a third example storage system 124 for data storage in accordance with some implementations. In one embodiment, storage system 124 includes storage controllers 125a, 125b. In one embodiment, storage controllers 125a, 125b are operatively coupled to Dual PCI storage devices. Storage controllers 125a, 125b may be operatively coupled (e.g., via a storage network 130) to some number of host computers 127a-n.

In one embodiment, two storage controllers (e.g., 125a and 125b) provide storage services, such as a SCS) block storage array, a file server, an object server, a database or data analytics service, etc. The storage controllers 125a, 125b may provide services through some number of network interfaces (e.g., 126a-d) to host computers 127a-n outside of the storage system 124. Storage controllers 125a, 125b may provide integrated services or an application entirely within the storage system 124, forming a converged storage and compute system. The storage controllers 125a, 125b may utilize the fast write memory within or across storage devices 119a-d to journal in progress operations to ensure the operations are not lost on a power failure, storage controller removal, storage controller or storage system shutdown, or some fault of one or more software or hardware components within the storage system 124.

In one embodiment, storage controllers 125a, 125b operate as PCI masters to one or the other PCI buses 128a, 128b. In another embodiment, 128a and 128b may be based on other communications standards (e.g., HyperTransport, InfiniBand, etc.). Other storage system embodiments may operate storage controllers 125a, 125b as multi-masters for both PCI buses 128a, 128b. Alternately, a PCI/NVMe/NVMf switching infrastructure or fabric may connect multiple storage controllers. Some storage system embodiments may allow storage devices to communicate with each other directly rather than communicating only with storage controllers. In one embodiment, a storage device controller 119a may be operable under direction from a storage controller 125a to synthesize and transfer data to be stored into Flash memory devices from data that has been stored in RAM (e.g., RAM 121 of FIG. 1C). For example, a recalculated version of RAM content may be transferred after a storage controller has determined that an operation has fully committed across the storage system, or when fast-write memory on the device has reached a certain used capacity, or after a certain amount of time, to ensure improve safety of the data or to release addressable fast-write capacity for reuse. This mechanism may be used, for example, to avoid a second transfer over a bus (e.g., 128a, 128b) from the storage controllers 125a, 125b. In one embodiment, a recalculation may include compressing data, attaching indexing or other metadata, combining multiple data segments together, performing erasure code calculations, etc.

In one embodiment, under direction from a storage controller 125a, 125b, a storage device controller 119a, 119b may be operable to calculate and transfer data to other storage devices from data stored in RAM (e.g., RAM 121 of FIG. 1C) without involvement of the storage controllers

125*a*, 125*b*. This operation may be used to mirror data stored in one storage controller 125*a* to another storage controller 125*b*, or it could be used to offload compression, data aggregation, and/or erasure coding calculations and transfers to storage devices to reduce load on storage controllers or the storage controller interface 129*a*, 129*b* to the PCI bus 128*a*, 128*b*.

A storage device controller 119A-D may include mechanisms for implementing high availability primitives for use by other parts of a storage system external to the Dual PCI storage device 118. For example, reservation or exclusion primitives may be provided so that, in a storage system with two storage controllers providing a highly available storage service, one storage controller may prevent the other storage controller from accessing or continuing to access the storage device. This could be used, for example, in cases where one controller detects that the other controller is not functioning properly or where the interconnect between the two storage controllers may itself not be functioning properly.

In one embodiment, a storage system for use with Dual PCI direct mapped storage devices with separately addressable fast write storage includes systems that manage erase blocks or groups of erase blocks as allocation units for storing data on behalf of the storage service, or for storing metadata (e.g., indexes, logs, etc.) associated with the storage service, or for proper management of the storage system itself. Flash pages, which may be a few kilobytes in size, may be written as data arrives or as the storage system is to persist data for long intervals of time (e.g., above a defined threshold of time). To commit data more quickly, or to reduce the number of writes to the Flash memory devices, the storage controllers may first write data into the separately addressable fast write storage on one more storage devices.

In one embodiment, the storage controllers 125*a*, 125*b* may initiate the use of erase blocks within and across storage devices (e.g., 118) in accordance with an age and expected remaining lifespan of the storage devices, or based on other statistics. The storage controllers 125*a*, 125*b* may initiate garbage collection and data migration data between storage devices in accordance with pages that are no longer needed as well as to manage Flash page and erase block lifespans and to manage overall system performance.

In one embodiment, the storage system 124 may utilize mirroring and/or erasure coding schemes as part of storing data into addressable fast write storage and/or as part of writing data into allocation units associated with erase blocks. Erasure codes may be used across storage devices, as well as within erase blocks or allocation units, or within and across Flash memory devices on a single storage device, to provide redundancy against single or multiple storage device failures or to protect against internal corruptions of Flash memory pages resulting from Flash memory operations or from degradation of Flash memory cells. Mirroring and erasure coding at various levels may be used to recover from multiple types of failures that occur separately or in combination.

The embodiments depicted with reference to FIGS. 2A-G illustrate a storage cluster that stores user data, such as user data originating from one or more user or client systems or other sources external to the storage cluster. The storage cluster distributes user data across storage nodes housed within a chassis, or across multiple chassis, using erasure coding and redundant copies of metadata. Erasure coding refers to a method of data protection or reconstruction in which data is stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory. Control of storage locations and workloads are distributed across the storage locations in a clustered peer-to-peer system. Tasks such as mediating communications between the various storage nodes, detecting when a storage node has become unavailable, and balancing I/Os (inputs and outputs) across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

The storage cluster may be contained within a chassis, i.e., an enclosure housing one or more storage nodes. A mechanism to provide power to each storage node, such as a power distribution bus, and a communication mechanism, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as PCIe, InfiniBand, and others, are equally suitable. The chassis provides a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system ('NFS'), common internet file system ('CIFS'), small computer system interface ('SCSI') or hypertext transfer protocol ('HTTP'). Translation from the client protocol may occur at the switch, chassis external communication bus or within each storage node. In some embodiments, multiple chassis may be coupled or connected to each other through an aggregator switch. A portion and/or all of the coupled or connected chassis may be designated as a storage cluster. As discussed above, each chassis can have multiple blades, each blade has a media access control ('MAC') address, but the storage cluster is presented to an external network as having a single cluster IP address and a single MAC address in some embodiments.

Each storage node may be one or more storage servers and each storage server is connected to one or more non-volatile solid state memory units, which may be referred to as storage units or storage devices. One embodiment includes a single storage server in each storage node and between one to eight non-volatile solid state memory units, however this one example is not meant to be limiting. The storage server may include a processor, DRAM and interfaces for the internal communication bus and power distribution for each of the power buses. Inside the storage node, the interfaces and storage unit share a communication bus, e.g., PCI Express, in some embodiments. The non-volatile solid state memory units may directly access the internal communication bus interface through a storage node communication bus, or request the storage node to access the bus interface. The non-volatile solid state memory unit contains an embedded CPU, solid state storage controller, and a quantity of solid state mass storage, e.g., between 2-32 terabytes ('TB') in some embodiments. An embedded volatile storage medium, such as DRAM, and an energy reserve apparatus are included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory ('MRAM') that substitutes for DRAM and enables a reduced power hold-up apparatus.

One of many features of the storage nodes and non-volatile solid state storage is the ability to proactively rebuild data in a storage cluster. The storage nodes and non-volatile solid state storage can determine when a storage node or non-volatile solid state storage in the storage cluster is unreachable, independent of whether there is an attempt to read data involving that storage node or non-volatile solid state storage. The storage nodes and non-volatile solid state storage then cooperate to recover and rebuild the data in at least partially new locations. This constitutes a proactive rebuild, in that the system rebuilds data without waiting until the data is needed for a read access initiated from a client system employing the storage cluster. These and further details of the storage memory and operation thereof are discussed below.

Figure 2A:
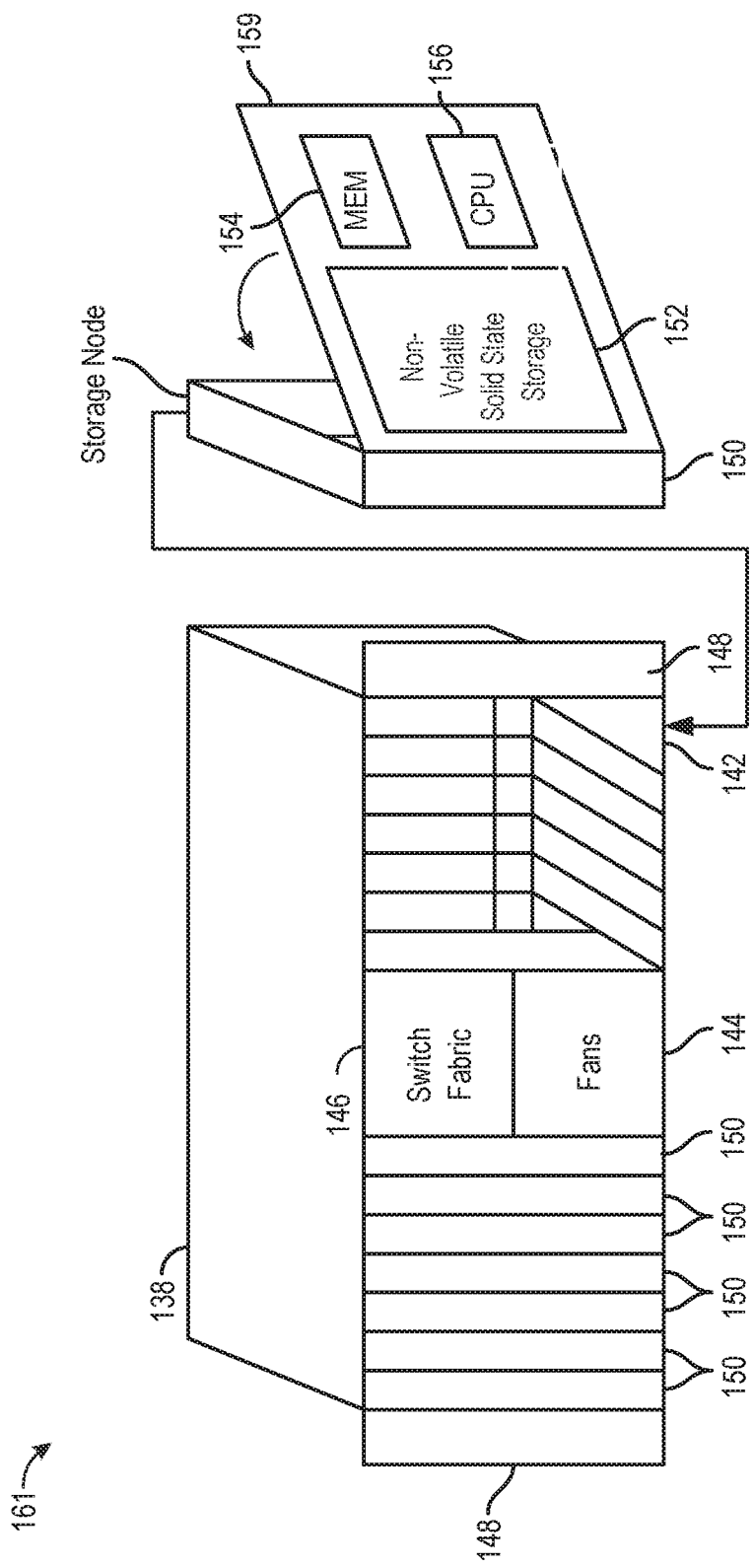
FIG. 2A is a perspective view of a storage cluster with multiple storage nodes and internal storage coupled to each storage node to provide network attached storage, in accordance with some embodiments.

FIG. 2A is a perspective view of a storage cluster 161, with multiple storage nodes 150 and internal solid-state memory coupled to each storage node to provide network attached storage or storage area network, in accordance with some embodiments. A network attached storage, storage area network, or a storage cluster, or other storage memory, could include one or more storage clusters 161, each having one or more storage nodes 150, in a flexible and reconfigurable arrangement of both the physical components and the amount of storage memory provided thereby. The storage cluster 161 is designed to fit in a rack, and one or more racks can be set up and populated as desired for the storage memory. The storage cluster 161 has a chassis 138 having multiple slots 142. It should be appreciated that chassis 138 may be referred to as a housing, enclosure, or rack unit. In one embodiment, the chassis 138 has fourteen slots 142, although other numbers of slots are readily devised. For example, some embodiments have four slots, eight slots, sixteen slots, thirty-two slots, or other suitable number of slots. Each slot 142 can accommodate one storage node 150 in some embodiments. Chassis 138 includes flaps 148 that can be utilized to mount the chassis 138 on a rack. Fans 144 provide air circulation for cooling of the storage nodes 150 and components thereof, although other cooling components could be used, or an embodiment could be devised without cooling components. A switch fabric 146 couples storage nodes 150 within chassis 138 together and to a network for communication to the memory. In an embodiment depicted in herein, the slots 142 to the left of the switch fabric 146 and fans 144 are shown occupied by storage nodes 150, while the slots 142 to the right of the switch fabric 146 and fans 144 are empty and available for insertion of storage node 150 for illustrative purposes. This configuration is one example, and one or more storage nodes 150 could occupy the slots 142 in various further arrangements. The storage node arrangements need not be sequential or adjacent in some embodiments. Storage nodes 150 are hot pluggable, meaning that a storage node 150 can be inserted into a slot 142 in the chassis 138, or removed from a slot 142, without stopping or powering down the system. Upon insertion or removal of storage node 150 from slot 142, the system automatically reconfigures in order to recognize and adapt to the change. Reconfiguration, in some embodiments, includes restoring redundancy and/or rebalancing data or load.

Each storage node 150 can have multiple components. In the embodiment shown here, the storage node 150 includes a printed circuit board 159 populated by a CPU 156, i.e., processor, a memory 154 coupled to the CPU 156, and a non-volatile solid state storage 152 coupled to the CPU 156, although other mountings and/or components could be used in further embodiments. The memory 154 has instructions which are executed by the CPU 156 and/or data operated on by the CPU 156. As further explained below, the non-volatile solid state storage 152 includes flash or, in further embodiments, other types of solid-state memory.

Referring to FIG. 2A, storage cluster 161 is scalable, meaning that storage capacity with non-uniform storage sizes is readily added, as described above. One or more storage nodes 150 can be plugged into or removed from each chassis and the storage cluster self-configures in some embodiments. Plug-in storage nodes 150, whether installed in a chassis as delivered or later added, can have different sizes. For example, in one embodiment a storage node 150 can have any multiple of 4 TB, e.g., 8 TB, 12 TB, 16 TB, 32 TB, etc. In further embodiments, a storage node 150 could have any multiple of other storage amounts or capacities. Storage capacity of each storage node 150 is broadcast, and influences decisions of how to stripe the data. For maximum storage efficiency, an embodiment can self-configure as wide as possible in the stripe, subject to a predetermined requirement of continued operation with loss of up to one, or up to two, non-volatile solid state storage 152 units or storage nodes 150 within the chassis.

Figure 2B:
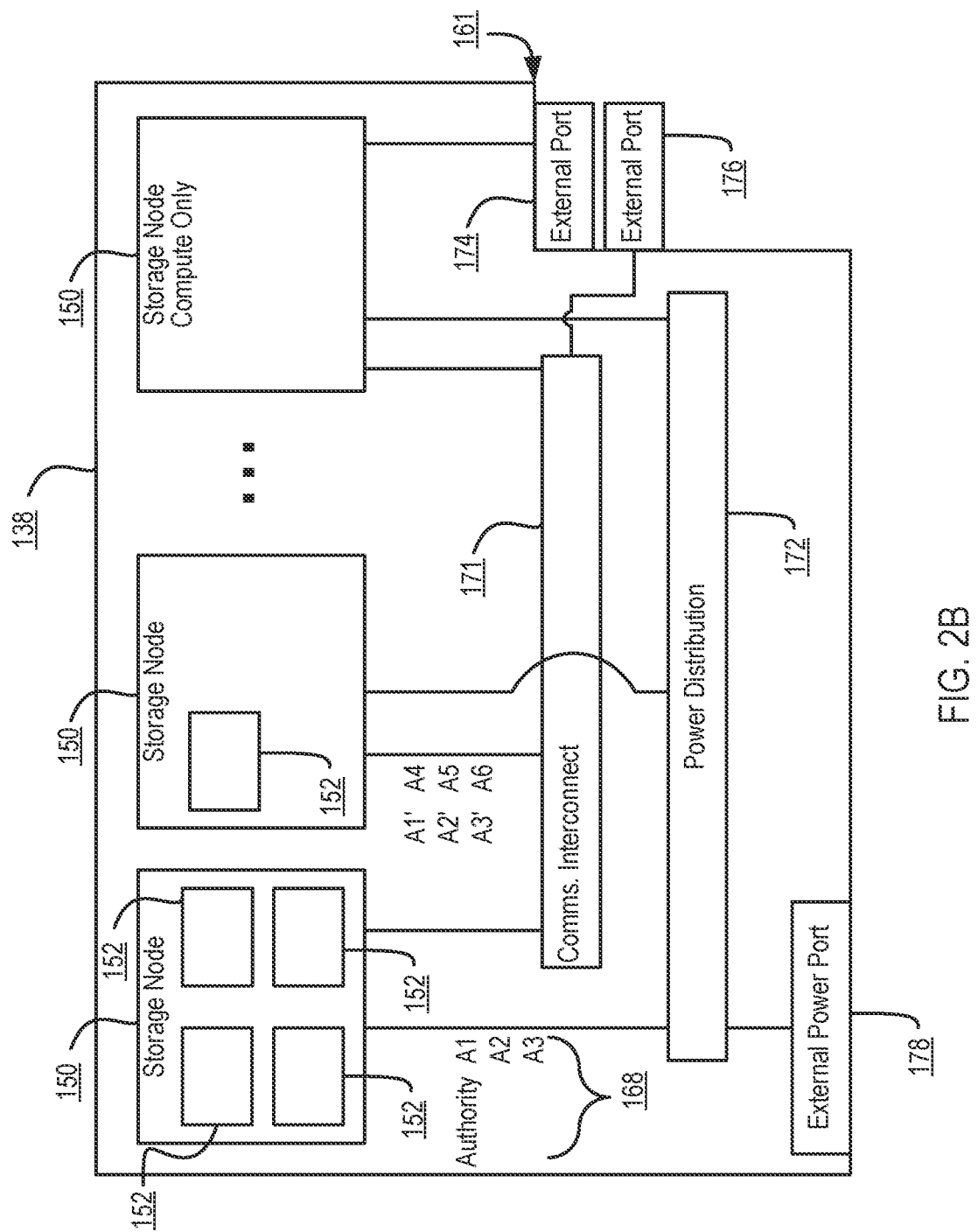
FIG. 2B is a block diagram showing an interconnect switch coupling multiple storage nodes in accordance with some embodiments.

FIG. 2B is a block diagram showing a communications interconnect 173 and power distribution bus 172 coupling multiple storage nodes 150. Referring back to FIG. 2A, the communications interconnect 173 can be included in or implemented with the switch fabric 146 in some embodiments. Where multiple storage clusters 161 occupy a rack, the communications interconnect 173 can be included in or implemented with a top of rack switch, in some embodiments. As illustrated in FIG. 2B, storage cluster 161 is enclosed within a single chassis 138. External port 176 is coupled to storage nodes 150 through communications interconnect 173, while external port 174 is coupled directly to a storage node. External power port 178 is coupled to power distribution bus 172. Storage nodes 150 may include varying amounts and differing capacities of non-volatile solid state storage 152 as described with reference to FIG. 2A. In addition, one or more storage nodes 150 may be a compute only storage node as illustrated in FIG. 2B. Authorities 168 are implemented on the non-volatile solid state storage 152, for example as lists or other data structures stored in memory. In some embodiments the authorities are stored within the non-volatile solid state storage 152 and supported by software executing on a controller or other processor of the non-volatile solid state storage 152. In a further embodiment, authorities 168 are implemented on the storage nodes 150, for example as lists or other data structures stored in the memory 154 and supported by software executing on the CPU 156 of the storage node 150. Authorities 168 control how and where data is stored in the non-volatile solid state storage 152 in some embodiments. This control assists in determining which type of erasure coding scheme is applied to the data, and which storage nodes 150 have which portions of the data. Each authority 168 may be assigned to a non-volatile solid state storage 152. Each authority may control a range of inode numbers, segment numbers, or other data identifiers which are assigned to data by a file system, by the storage nodes 150, or by the non-volatile solid state storage 152, in various embodiments.

Every piece of data, and every piece of metadata, has redundancy in the system in some embodiments. In addition, every piece of data and every piece of metadata has an owner, which may be referred to as an authority. If that authority is unreachable, for example through failure of a storage node, there is a plan of succession for how to find that data or that metadata. In various embodiments, there are redundant copies of authorities 168. Authorities 168 have a relationship to storage nodes 150 and non-volatile solid state storage 152 in some embodiments. Each authority 168, covering a range of data segment numbers or other identifiers of the data, may be assigned to a specific non-volatile solid state storage 152. In some embodiments the authorities 168 for all of such ranges are distributed over the non-volatile solid state storage 152 of a storage cluster. Each storage node 150 has a network port that provides access to the non-volatile solid state storage(s) 152 of that storage node 150. Data can be stored in a segment, which is associated with a segment number and that segment number is an indirection for a configuration of a RAID (redundant array of independent disks) stripe in some embodiments. The assignment and use of the authorities 168 thus establishes an indirection to data. Indirection may be referred to as the ability to reference data indirectly, in this case via an authority 168, in accordance with some embodiments. A segment identifies a set of non-volatile solid state storage 152 and a local identifier into the set of non-volatile solid state storage 152 that may contain data. In some embodiments, the local identifier is an offset into the device and may be reused sequentially by multiple segments. In other embodiments the local identifier is unique for a specific segment and never reused. The offsets in the non-volatile solid state storage 152 are applied to locating data for writing to or reading from the non-volatile solid state storage 152 (in the form of a RAID stripe). Data is striped across multiple units of non-volatile solid state storage 152, which may include or be different from the non-volatile solid state storage 152 having the authority 168 for a particular data segment.

If there is a change in where a particular segment of data is located, e.g., during a data move or a data reconstruction, the authority 168 for that data segment should be consulted, at that non-volatile solid state storage 152 or storage node 150 having that authority 168. In order to locate a particular piece of data, embodiments calculate a hash value for a data segment or apply an inode number or a data segment number. The output of this operation points to a non-volatile solid state storage 152 having the authority 168 for that particular piece of data. In some embodiments there are two stages to this operation. The first stage maps an entity identifier (ID), e.g., a segment number, inode number, or directory number to an authority identifier. This mapping may include a calculation such as a hash or a bit mask. The second stage is mapping the authority identifier to a particular non-volatile solid state storage 152, which may be done through an explicit mapping. The operation is repeatable, so that when the calculation is performed, the result of the calculation repeatably and reliably points to a particular non-volatile solid state storage 152 having that authority 168. The operation may include the set of reachable storage nodes as input. If the set of reachable non-volatile solid state storage units changes the optimal set changes. In some embodiments, the persisted value is the current assignment (which is always true) and the calculated value is the target assignment the cluster will attempt to reconfigure towards. This calculation may be used to determine the optimal non-volatile solid state storage 152 for an authority in the presence of a set of non-volatile solid state storage 152 that are reachable and constitute the same cluster. The calculation also determines an ordered set of peer non-volatile solid state storage 152 that will also record the authority to non-volatile solid state storage mapping so that the authority may be determined even if the assigned non-volatile solid state storage is unreachable. A duplicate or substitute authority 168 may be consulted if a specific authority 168 is unavailable in some embodiments.

With reference to FIGS. 2A and 2B, two of the many tasks of the CPU 156 on a storage node 150 are to break up write data, and reassemble read data. When the system has determined that data is to be written, the authority 168 for that data is located as above. When the segment ID for data is already determined the request to write is forwarded to the non-volatile solid state storage 152 currently determined to be the host of the authority 168 determined from the segment. The host CPU 156 of the storage node 150, on which the non-volatile solid state storage 152 and corresponding authority 168 reside, then breaks up or shards the data and transmits the data out to various non-volatile solid state storage 152. The transmitted data is written as a data stripe in accordance with an erasure coding scheme. In some embodiments, data is requested to be pulled, and in other embodiments, data is pushed. In reverse, when data is read, the authority 168 for the segment ID containing the data is located as described above. The host CPU 156 of the storage node 150 on which the non-volatile solid state storage 152 and corresponding authority 168 reside requests the data from the non-volatile solid state storage and corresponding storage nodes pointed to by the authority. In some embodiments the data is read from flash storage as a data stripe. The host CPU 156 of storage node 150 then reassembles the read data, correcting any errors (if present) according to the appropriate erasure coding scheme, and forwards the reassembled data to the network. In further embodiments, some or all of these tasks can be handled in the non-volatile solid state storage 152. In some embodiments, the segment host requests the data be sent to storage node 150 by requesting pages from storage and then sending the data to the storage node making the original request.

In embodiments, authorities 168 operate to determine how operations will proceed against particular logical elements. Each of the logical elements may be operated on through a particular authority across a plurality of storage controllers of a storage system. The authorities 168 may communicate with the plurality of storage controllers so that the plurality of storage controllers collectively perform operations against those particular logical elements.

In embodiments, logical elements could be, for example, files, directories, object buckets, individual objects, delineated parts of files or objects, other forms of key-value pair databases, or tables. In embodiments, performing an operation can involve, for example, ensuring consistency, structural integrity, and/or recoverability with other operations against the same logical element, reading metadata and data associated with that logical element, determining what data should be written durably into the storage system to persist any changes for the operation, or where metadata and data can be determined to be stored across modular storage devices attached to a plurality of the storage controllers in the storage system.

In some embodiments the operations are token based transactions to efficiently communicate within a distributed system. Each transaction may be accompanied by or associated with a token, which gives permission to execute the transaction. The authorities 168 are able to maintain a pre-transaction state of the system until completion of the operation in some embodiments. The token based communication may be accomplished without a global lock across the system, and also enables restart of an operation in case of a disruption or other failure.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory or a segment. That is, entities are units of data or metadata stored by a storage system. Entities are grouped into sets called authorities. Each authority has an authority owner, which is a storage node that has the exclusive right to update the entities in the authority. In other words, a storage node contains the authority, and that the authority, in turn, contains entities.

A segment is a logical container of data in accordance with some embodiments. A segment is an address space between medium address space and physical flash locations, i.e., the data segment number, are in this address space. Segments may also contain meta-data, which enable data redundancy to be restored (rewritten to different flash locations or devices) without the involvement of higher level software. In one embodiment, an internal format of a segment contains client data and medium mappings to determine the position of that data. Each data segment is protected, e.g., from memory and other failures, by breaking the segment into a number of data and parity shards, where applicable. The data and parity shards are distributed, i.e., striped, across non-volatile solid state storage 152 coupled to the host CPUs 156 (See FIGS. 2E and 2G) in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top are the directory entries (file names) which link to an inode. Inodes point into medium address space, where data is logically stored. Medium addresses may be mapped through a series of indirect mediums to spread the load of large files, or implement data services like deduplication or snapshots. Medium addresses may be mapped through a series of indirect mediums to spread the load of large files, or implement data services like deduplication or snapshots. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage 152 unit may be assigned a range of address space. Within this assigned range, the non-volatile solid state storage 152 is able to allocate addresses without synchronization with other non-volatile solid state storage 152.

Data and metadata is stored by a set of underlying storage layouts that are optimized for varying workload patterns and storage devices. These layouts incorporate multiple redundancy schemes, compression formats and index algorithms. Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check ('LDPC') code is used within a single storage unit. Reed-Solomon encoding is used within a storage cluster, and mirroring is used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes agree implicitly on two things through calculations: (1) the authority that contains the entity, and (2) the storage node that contains the authority. The assignment of entities to authorities can be done by pseudo randomly assigning entities to authorities, by splitting entities into ranges based upon an externally produced key, or by placing a single entity into each authority. Examples of pseudorandom schemes are linear hashing and the Replication Under Scalable Hashing ('RUSH') family of hashes, including Controlled Replication Under Scalable Hashing ('CRUSH'). In some embodiments, pseudo-random assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy is independent of the placement of authorities for data consistency. In some embodiments, storage nodes that contain authorities do not contain any persistent storage. Instead, the storage nodes are connected to non-volatile solid state storage units that do not contain authorities. The communications interconnect between storage nodes and non-volatile solid state storage units consists of multiple communication technologies and has non-uniform performance and fault tolerance characteristics. In some embodiments, as mentioned above, non-volatile solid state storage units are connected to storage nodes via PCI express, storage nodes are connected together within a single chassis using Ethernet backplane, and chassis are connected together to form a storage cluster. Storage clusters are connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners have the exclusive right to modify entities, to migrate entities from one non-volatile solid state storage unit to another non-volatile solid state storage unit, and to add and remove copies of entities. This allows for maintaining the redundancy of the underlying data. When an authority owner fails, is going to be decommissioned, or is overloaded, the authority is transferred to a new storage node. Transient failures make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed machine). In some embodiments, a consensus protocol is used, and failover is automatic. If too many failures or replication events occur in too short a time period, the system goes into a self-preservation mode and halts replication and data movement activities until an administrator intervenes in accordance with some embodiments.

As authorities are transferred between storage nodes and authority owners update entities in their authorities, the system transfers messages between the storage nodes and non-volatile solid state storage units. With regard to persistent messages, messages that have different purposes are of different types. Depending on the type of the message, the system maintains different ordering and durability guarantees. As the persistent messages are being processed, the messages are temporarily stored in multiple durable and non-durable storage hardware technologies. In some embodiments, messages are stored in RAM, NVRAM and on NAND flash devices, and a variety of protocols are used in order to make efficient use of each storage medium. Latency-sensitive client requests may be persisted in replicated NVRAM, and then later NAND, while background rebalancing operations are persisted directly to NAND.

Persistent messages are persistently stored prior to being transmitted. This allows the system to continue to serve client requests despite failures and component replacement. Although many hardware components contain unique identifiers that are visible to system administrators, manufacturer, hardware supply chain and ongoing monitoring quality control infrastructure, applications running on top of the infrastructure address virtualize addresses. These virtualized addresses do not change over the lifetime of the storage system, regardless of component failures and replacements. This allows each component of the storage system to be replaced over time without reconfiguration or disruptions of client request processing, i.e., the system supports non-disruptive upgrades.

In some embodiments, the virtualized addresses are stored with sufficient redundancy. A continuous monitoring system correlates hardware and software status and the hardware identifiers. This allows detection and prediction of failures due to faulty components and manufacturing details. The monitoring system also enables the proactive transfer of authorities and entities away from impacted devices before failure occurs by removing the component from the critical path in some embodiments.

Figure 2C:
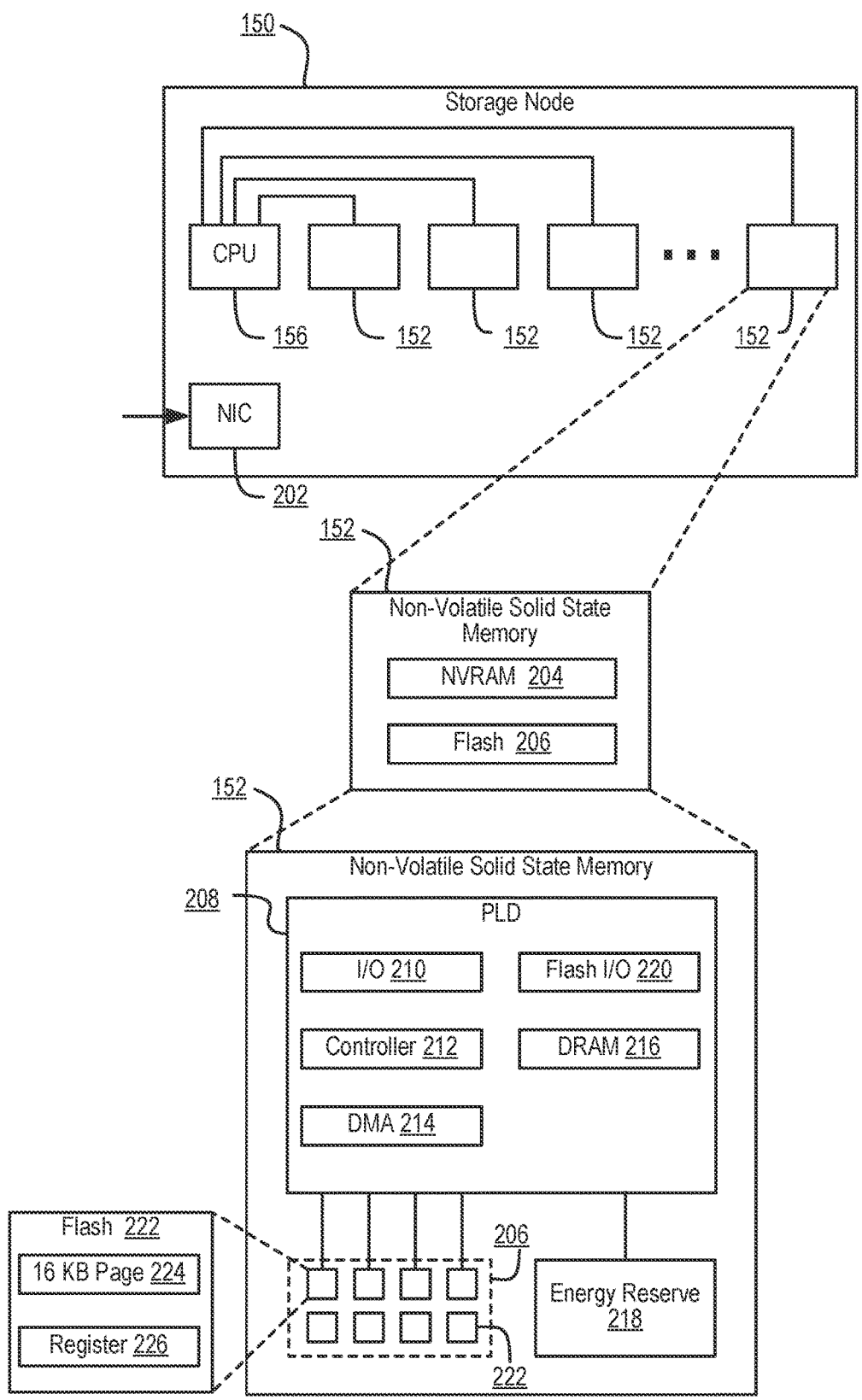
FIG. 2C is a multiple level block diagram, showing contents of a storage node and contents of one of the non-volatile solid state storage units in accordance with some embodiments.

FIG. 2C is a multiple level block diagram, showing contents of a storage node 150 and contents of a non-volatile solid state storage 152 of the storage node 150. Data is communicated to and from the storage node 150 by a network interface controller ('NIC') 202 in some embodiments. Each storage node 150 has a CPU 156, and one or more non-volatile solid state storage 152, as discussed above. Moving down one level in FIG. 2C, each non-volatile solid state storage 152 has a relatively fast non-volatile solid state memory, such as nonvolatile random access memory ('NVRAM') 204, and flash memory 206. In some embodiments, NVRAM 204 may be a component that does not require program/erase cycles (DRAM, MRAM, PCM), and can be a memory that can support being written vastly more often than the memory is read from. Moving down another level in FIG. 2C, the NVRAM 204 is implemented in one embodiment as high speed volatile memory, such as dynamic random access memory (DRAM) 216, backed up by energy reserve 218. Energy reserve 218 provides sufficient electrical power to keep the DRAM 216 powered long enough for contents to be transferred to the flash memory 206 in the event of power failure. In some embodiments, energy reserve 218 is a capacitor, super-capacitor, battery, or other device, that supplies a suitable supply of energy sufficient to enable the transfer of the contents of DRAM 216 to a stable storage medium in the case of power loss. The flash memory 206 is implemented as multiple flash dies 222, which may be referred to as packages of flash dies 222 or an array of flash dies 222. It should be appreciated that the flash dies 222 could be packaged in any number of ways, with a single die per package, multiple dies per package (i.e., multichip packages), in hybrid packages, as bare dies on a printed circuit board or other substrate, as encapsulated dies, etc. In the embodiment shown, the non-volatile solid state storage 152 has a controller 212 or other processor, and an input output (I/O) port 210 coupled to the controller 212. I/O port 210 is coupled to the CPU 156 and/or the network interface controller 202 of the flash storage node 150. Flash input output (I/O) port 220 is coupled to the flash dies 222, and a direct memory access unit (DMA) 214 is coupled to the controller 212, the DRAM 216 and the flash dies 222. In the embodiment shown, the I/O port 210, controller 212, DMA unit 214 and flash I/O port 220 are implemented on a programmable logic device ('PLD') 208, e.g., an FPGA. In this embodiment, each flash die 222 has pages, organized as sixteen kB (kilobyte) pages 224, and a register 226 through which data can be written to or read from the flash die 222. In further embodiments, other types of solid-state memory are used in place of, or in addition to flash memory illustrated within flash die 222.

Storage clusters 161, in various embodiments as disclosed herein, can be contrasted with storage arrays in general. The storage nodes 150 are part of a collection that creates the storage cluster 161. Each storage node 150 owns a slice of data and computing required to provide the data. Multiple storage nodes 150 cooperate to store and retrieve the data. Storage memory or storage devices, as used in storage arrays in general, are less involved with processing and manipulating the data. Storage memory or storage devices in a storage array receive commands to read, write, or erase data. The storage memory or storage devices in a storage array are not aware of a larger system in which they are embedded, or what the data means. Storage memory or storage devices in storage arrays can include various types of storage memory, such as RAM, solid state drives, hard disk drives, etc. The non-volatile solid state storage 152 units described herein have multiple interfaces active simultaneously and serving multiple purposes. In some embodiments, some of the functionality of a storage node 150 is shifted into a storage unit 152, transforming the storage unit 152 into a combination of storage unit 152 and storage node 150. Placing computing (relative to storage data) into the storage unit 152 places this computing closer to the data itself. The various system embodiments have a hierarchy of storage node layers with different capabilities. By contrast, in a storage array, a controller owns and knows everything about all of the data that the controller manages in a shelf or storage devices. In a storage cluster 161, as described herein, multiple controllers in multiple non-volatile sold state storage 152 units and/or storage nodes 150 cooperate in various ways (e.g., for erasure coding, data sharding, metadata communication and redundancy, storage capacity expansion or contraction, data recovery, and so on).

Figure 2D:
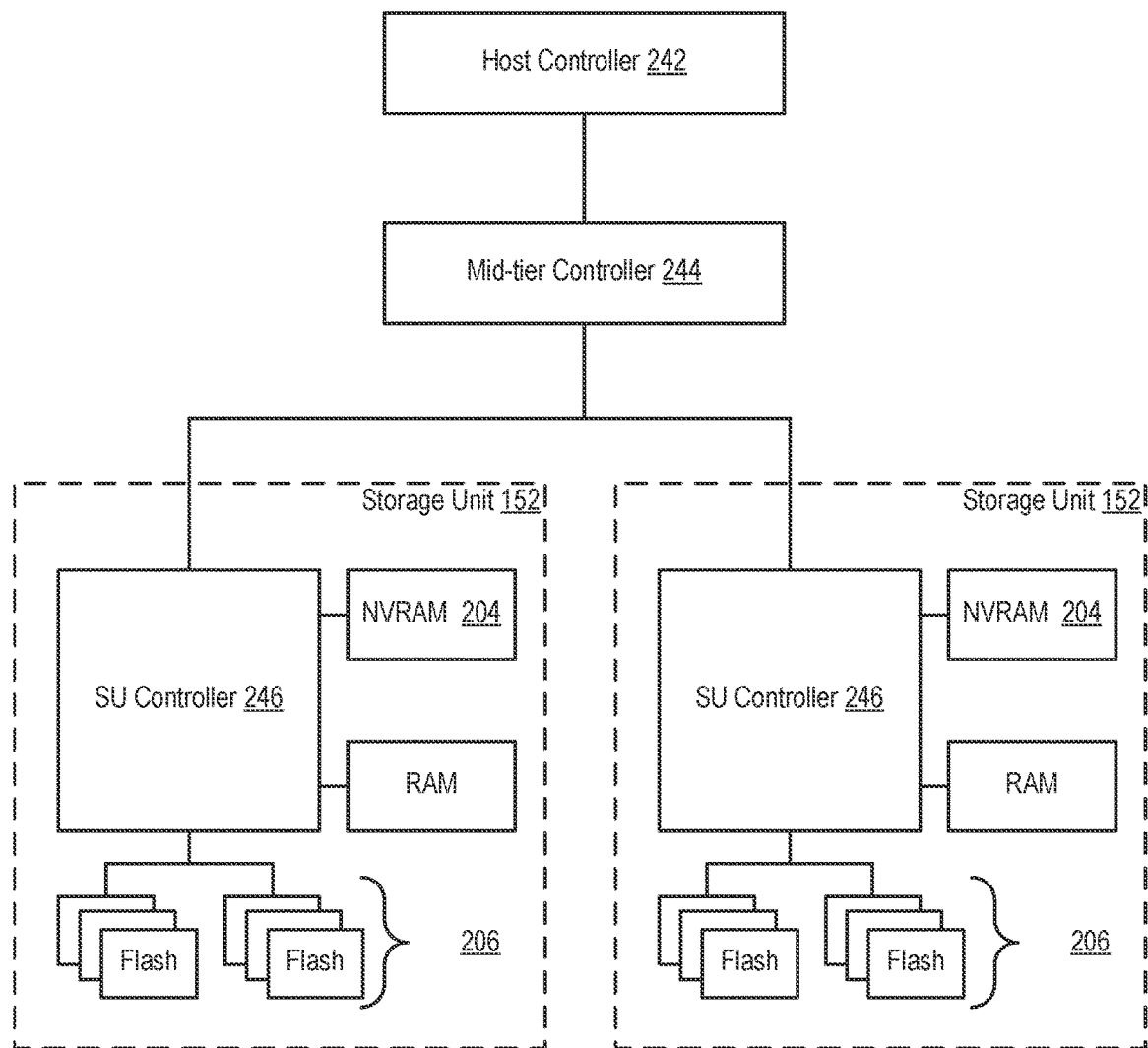
FIG. 2D shows a storage server environment, which uses embodiments of the storage nodes and storage units of some previous figures in accordance with some embodiments.

FIG. 2D shows a storage server environment, which uses embodiments of the storage nodes 150 and storage 152 units of FIGS. 2A-C. In this version, each non-volatile solid state storage 152 unit has a processor such as controller 212 (see FIG. 2C), an FPGA, flash memory 206, and NVRAM 204 (which is super-capacitor backed DRAM 216, see FIGS. 2B and 2C) on a PCIe (peripheral component interconnect express) board in a chassis 138 (see FIG. 2A). The non-volatile solid state storage 152 unit may be implemented as a single board containing storage, and may be the largest tolerable failure domain inside the chassis. In some embodiments, up to two non-volatile solid state storage 152 units may fail and the device will continue with no data loss.

The physical storage is divided into named regions based on application usage in some embodiments. The NVRAM 204 is a contiguous block of reserved memory in the non-volatile solid state storage 152 DRAM 216, and is backed by NAND flash. NVRAM 204 is logically divided into multiple memory regions written for two as spool (e.g., spool_region). Space within the NVRAM 204 spools is managed by each authority 168 independently. Each device provides an amount of storage space to each authority 168. That authority 168 further manages lifetimes and allocations within that space. Examples of a spool include distributed transactions or notions. When the primary power to a non-volatile solid state storage 152 unit fails, onboard supercapacitors provide a short duration of power hold up. During this holdup interval, the contents of the NVRAM 204 are flushed to flash memory 206. On the next power-on, the contents of the NVRAM 204 are recovered from the flash memory 206.

As for the storage unit controller, the responsibility of the logical "controller" is distributed across each of the blades containing authorities 168. This distribution of logical control is shown in FIG. 2D as a host controller 242, mid-tier controller 244 and storage unit controller(s) 246. Management of the control plane and the storage plane are treated independently, although parts may be physically co-located on the same blade. Each authority 168 effectively serves as an independent controller. Each authority 168 provides its own data and metadata structures, its own background workers, and maintains its own lifecycle.

Figure 2E:
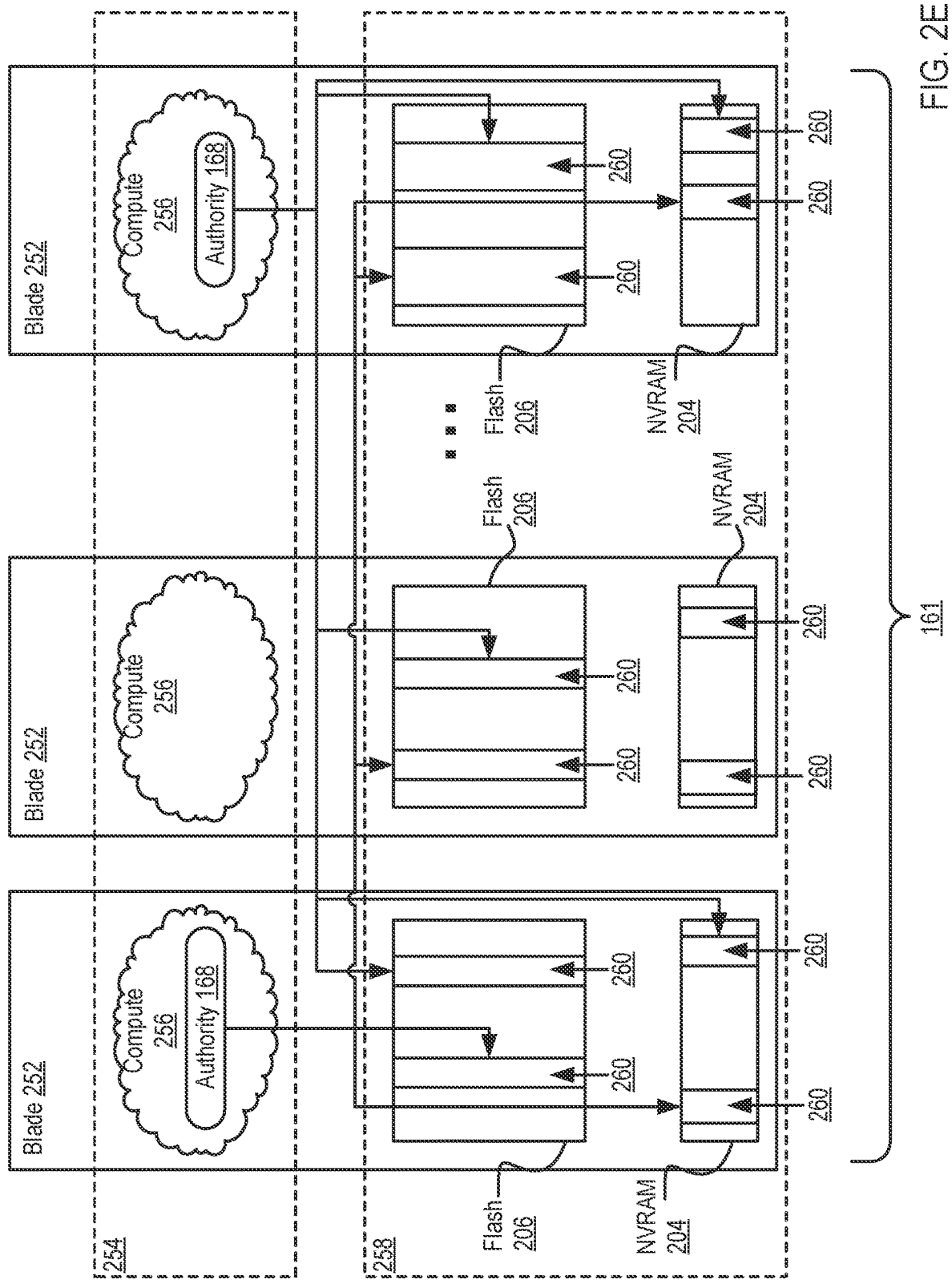
FIG. 2E is a blade hardware block diagram, showing a control plane, compute and storage planes, and authorities interacting with underlying physical resources, in accordance with some embodiments.

FIG. 2E is a blade 252 hardware block diagram, showing a control plane 254, compute and storage planes 256, 258, and authorities 168 interacting with underlying physical resources, using embodiments of the storage nodes 150 and storage units 152 of FIGS. 2A-C in the storage server environment of FIG. 2D. The control plane 254 is partitioned into a number of authorities 168 which can use the compute resources in the compute plane 256 to run on any of the blades 252. The storage plane 258 is partitioned into a set of devices, each of which provides access to flash 206 and NVRAM 204 resources. In one embodiment, the compute plane 256 may perform the operations of a storage array controller, as described herein, on one or more devices of the storage plane 258 (e.g., a storage array).

In the compute and storage planes 256, 258 of FIG. 2E, the authorities 168 interact with the underlying physical resources (i.e., devices). From the point of view of an authority 168, its resources are striped over all of the physical devices. From the point of view of a device, it provides resources to all authorities 168, irrespective of where the authorities happen to run. Each authority 168 has allocated or has been allocated one or more partitions 260 of storage memory in the storage units 152, e.g., partitions 260 in flash memory 206 and NVRAM 204. Each authority 168 uses those allocated partitions 260 that belong to it, for writing or reading user data. Authorities can be associated with differing amounts of physical storage of the system. For example, one authority 168 could have a larger number of partitions 260 or larger sized partitions 260 in one or more storage units 152 than one or more other authorities 168.

Figure 2F:
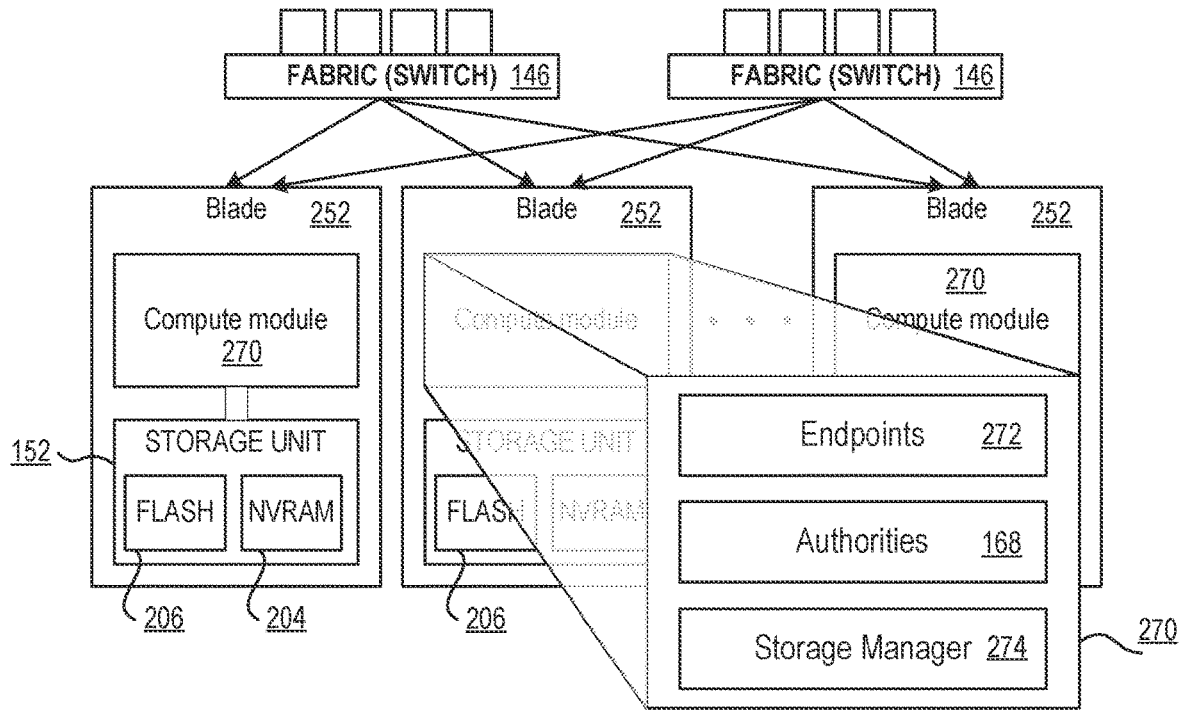
FIG. 2F depicts elasticity software layers in blades of a storage cluster, in accordance with some embodiments.

FIG. 2F depicts elasticity software layers in blades 252 of a storage cluster, in accordance with some embodiments. In the elasticity structure, elasticity software is symmetric, i.e., each blade's compute module 270 runs the three identical layers of processes depicted in FIG. 2F. Storage managers 274 execute read and write requests from other blades 252 for data and metadata stored in local storage unit 152 NVRAM 204 and flash 206. Authorities 168 fulfill client requests by issuing the necessary reads and writes to the blades 252 on whose storage units 152 the corresponding data or metadata resides. Endpoints 272 parse client connection requests received from switch fabric 146 supervisory software, relay the client connection requests to the authorities 168 responsible for fulfillment, and relay the authorities' 168 responses to clients. The symmetric three-layer structure enables the storage system's high degree of concurrency. Elasticity scales out efficiently and reliably in these embodiments. In addition, elasticity implements a unique scale-out technique that balances work evenly across all resources regardless of client access pattern, and maximizes concurrency by eliminating much of the need for inter-blade coordination that typically occurs with conventional distributed locking.

Still referring to FIG. 2F, authorities 168 running in the compute modules 270 of a blade 252 perform the internal operations required to fulfill client requests. One feature of elasticity is that authorities 168 are stateless, i.e., they cache active data and metadata in their own blades' 252 DRAMs for fast access, but the authorities store every update in their NVRAM 204 partitions on three separate blades 252 until the update has been written to flash 206. All the storage system writes to NVRAM 204 are in triplicate to partitions on three separate blades 252 in some embodiments. With triple-mirrored NVRAM 204 and persistent storage protected by parity and Reed-Solomon RAID checksums, the storage system can survive concurrent failure of two blades 252 with no loss of data, metadata, or access to either.

Because authorities 168 are stateless, they can migrate between blades 252. Each authority 168 has a unique identifier. NVRAM 204 and flash 206 partitions are associated with authorities' 168 identifiers, not with the blades 252 on which they are running in some. Thus, when an authority 168 migrates, the authority 168 continues to manage the same storage partitions from its new location. When a new blade 252 is installed in an embodiment of the storage cluster, the system automatically rebalances load by: partitioning the new blade's 252 storage for use by the system's authorities 168, migrating selected authorities 168 to the new blade 252, starting endpoints 272 on the new blade 252 and including them in the switch fabric's 146 client connection distribution algorithm.

From their new locations, migrated authorities 168 persist the contents of their NVRAM 204 partitions on flash 206, process read and write requests from other authorities 168, and fulfill the client requests that endpoints 272 direct to them. Similarly, if a blade 252 fails or is removed, the system redistributes its authorities 168 among the system's remaining blades 252. The redistributed authorities 168 continue to perform their original functions from their new locations.

Figure 2G:
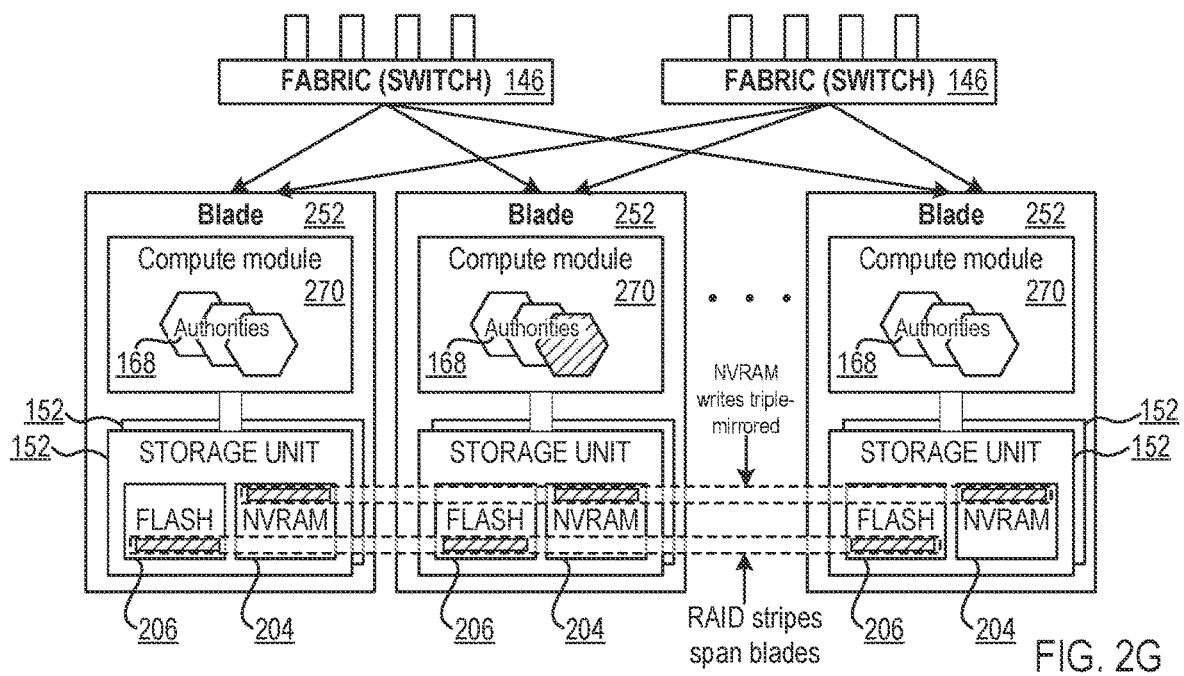
FIG. 2G depicts authorities and storage resources in blades of a storage cluster, in accordance with some embodiments.

FIG. 2G depicts authorities 168 and storage resources in blades 252 of a storage cluster, in accordance with some embodiments. Each authority 168 is exclusively responsible for a partition of the flash 206 and NVRAM 204 on each blade 252. The authority 168 manages the content and integrity of its partitions independently of other authorities 168. Authorities 168 compress incoming data and preserve it temporarily in their NVRAM 204 partitions, and then consolidate, RAID-protect, and persist the data in segments of the storage in their flash 206 partitions. As the authorities 168 write data to flash 206, storage managers 274 perform the necessary flash translation to optimize write performance and maximize media longevity. In the background, authorities 168 "garbage collect," or reclaim space occupied by data that clients have made obsolete by overwriting the data. It should be appreciated that since authorities' 168 partitions are disjoint, there is no need for distributed locking to execute client and writes or to perform background functions.

The embodiments described herein may utilize various software, communication and/or networking protocols. In addition, the configuration of the hardware and/or software may be adjusted to accommodate various protocols. For example, the embodiments may utilize Active Directory, which is a database based system that provides authentication, directory, policy, and other services in a WINDOWS™ environment. In these embodiments, LDAP (Lightweight Directory Access Protocol) is one example application protocol for querying and modifying items in directory service providers such as Active Directory. In some embodiments, a network lock manager ('NLM') is utilized as a facility that works in cooperation with the Network File System ('NFS') to provide a System V style of advisory file and record locking over a network. The Server Message Block ('SMB') protocol, one version of which is also known as Common Internet File System ('CIFS'), may be integrated with the storage systems discussed herein. SMB operates as an application-layer network protocol typically used for providing shared access to files, printers, and serial ports and miscellaneous communications between nodes on a network. SMB also provides an authenticated inter-process communication mechanism. AMAZON™ S3 (Simple Storage Service) is a web service offered by Amazon Web Services, and the systems described herein may interface with Amazon S3 through web services interfaces (REST (representational state transfer), SOAP (simple object access protocol), and BitTorrent). A RESTful API (application programming interface) breaks down a transaction to create a series of small modules. Each module addresses a particular underlying part of the transaction. The control or permissions provided with these embodiments, especially for object data, may include utilization of an access control list ('ACL'). The ACL is a list of permissions attached to an object and the ACL specifies which users or system processes are granted access to objects, as well as what operations are allowed on given objects. The systems may utilize Internet Protocol version 6 ('IPv6'), as well as IPv4, for the communications protocol that provides an identification and location system for computers on networks and routes traffic across the Internet. The routing of packets between networked systems may include Equal-cost multi-path routing ('ECMP'), which is a routing strategy where next-hop packet forwarding to a single destination can occur over multiple "best paths" which tie for top place in routing metric calculations. Multi-path routing can be used in conjunction with most routing protocols, because it is a per-hop decision limited to a single router. The software may support Multi-tenancy, which is an architecture in which a single instance of a software application serves multiple customers. Each customer may be referred to as a tenant. Tenants may be given the ability to customize some parts of the application, but may not customize the application's code, in some embodiments. The embodiments may maintain audit logs. An audit log is a document that records an event in a computing system. In addition to documenting what resources were accessed, audit log entries typically include destination and source addresses, a timestamp, and user login information for compliance with various regulations. The embodiments may support various key management policies, such as encryption key rotation. In addition, the system may support dynamic root passwords or some variation dynamically changing passwords.

Figure 3A:
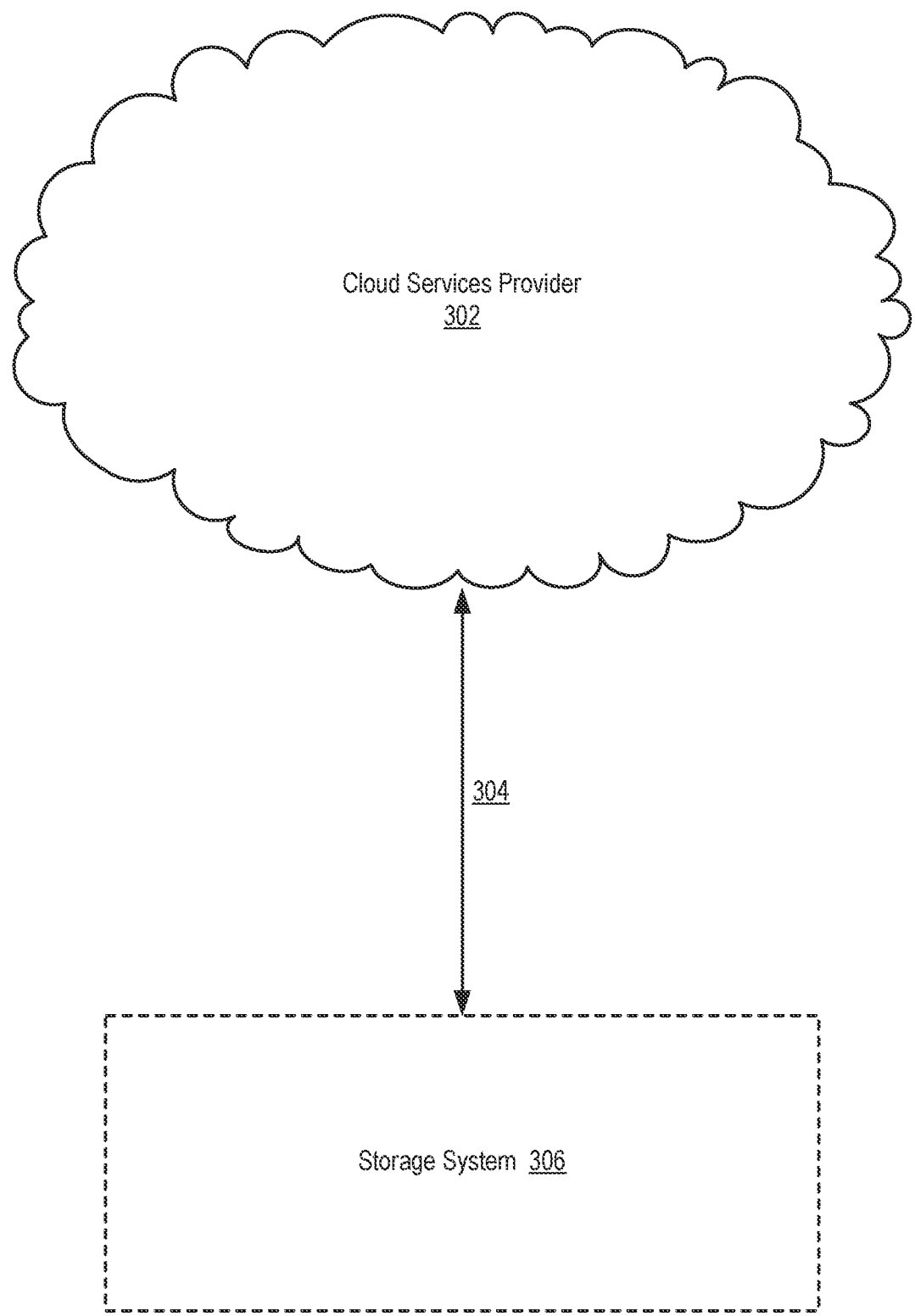
FIG. 3A sets forth a diagram of a storage system that is coupled for data communications with a cloud services provider in accordance with some embodiments of the present disclosure.

FIG. 3A sets forth a diagram of a storage system 306 that is coupled for data communications with a cloud services provider 302 in accordance with some embodiments of the present disclosure. Although depicted in less detail, the storage system 306 depicted in FIG. 3A may be similar to the storage systems described above with reference to FIGS. 1A-1D and FIGS. 2A-2G. In some embodiments, the storage system 306 depicted in FIG. 3A may be embodied as a storage system that includes imbalanced active/active controllers, as a storage system that includes balanced active/active controllers, as a storage system that includes active/active controllers where less than all of each controller's resources are utilized such that each controller has reserve resources that may be used to support failover, as a storage system that includes fully active/active controllers, as a storage system that includes dataset-segregated controllers, as a storage system that includes dual-layer architectures with front-end controllers and back-end integrated storage controllers, as a storage system that includes scale-out clusters of dual-controller arrays, as well as combinations of such embodiments.

In the example depicted in FIG. 3A, the storage system 306 is coupled to the cloud services provider 302 via a data communications link 304. Such a data communications link 304 may be fully wired, fully wireless, or some aggregation of wired and wireless data communications pathways. In such an example, digital information may be exchanged between the storage system 306 and the cloud services provider 302 via the data communications link 304 using one or more data communications protocols. For example, digital information may be exchanged between the storage system 306 and the cloud services provider 302 via the data communications link 304 using the handheld device transfer protocol ('HDTP'), hypertext transfer protocol ('HTTP'), internet protocol ('IP'), real-time transfer protocol ('RTP'), transmission control protocol ('TCP'), user datagram protocol ('UDP'), wireless application protocol ('WAP'), or other protocol.

The cloud services provider 302 depicted in FIG. 3A may be embodied, for example, as a system and computing environment that provides a vast array of services to users of the cloud services provider 302 through the sharing of computing resources via the data communications link 304. The cloud services provider 302 may provide on-demand access to a shared pool of configurable computing resources such as computer networks, servers, storage, applications and services, and so on.

In the example depicted in FIG. 3A, the cloud services provider 302 may be configured to provide a variety of services to the storage system 306 and users of the storage system 306 through the implementation of various service models. For example, the cloud services provider 302 may be configured to provide services through the implementation of an infrastructure as a service ('IaaS') service model, through the implementation of a platform as a service ('PaaS') service model, through the implementation of a software as a service ('SaaS') service model, through the implementation of an authentication as a service ('AaaS') service model, through the implementation of a storage as a service model where the cloud services provider 302 offers access to its storage infrastructure for use by the storage system 306 and users of the storage system 306, and so on.

In the example depicted in FIG. 3A, the cloud services provider 302 may be embodied, for example, as a private cloud, as a public cloud, or as a combination of a private cloud and public cloud. In an embodiment in which the cloud services provider 302 is embodied as a private cloud, the cloud services provider 302 may be dedicated to providing services to a single organization rather than providing services to multiple organizations. In an embodiment where the cloud services provider 302 is embodied as a public cloud, the cloud services provider 302 may provide services to multiple organizations. In still alternative embodiments, the cloud services provider 302 may be embodied as a mix of a private and public cloud services with a hybrid cloud deployment.

Although not explicitly depicted in FIG. 3A, readers will appreciate that a vast amount of additional hardware components and additional software components may be necessary to facilitate the delivery of cloud services to the storage system 306 and users of the storage system 306. For example, the storage system 306 may be coupled to (or even include) a cloud storage gateway. Such a cloud storage gateway may be embodied, for example, as hardware-based or software-based appliance that is located on premise with the storage system 306. Such a cloud storage gateway may operate as a bridge between local applications that are executing on the storage system 306 and remote, cloud-based storage that is utilized by the storage system 306. Through the use of a cloud storage gateway, organizations may move primary iSCSI or NAS to the cloud services provider 302, thereby enabling the organization to save space on their on-premises storage systems. Such a cloud storage gateway may be configured to emulate a disk array, a block-based device, a file server, or other storage system that can translate the SCSI commands, file server commands, or other appropriate command into REST-space protocols that facilitate communications with the cloud services provider 302.

In order to enable the storage system 306 and users of the storage system 306 to make use of the services provided by the cloud services provider 302, a cloud migration process may take place during which data, applications, or other elements from an organization's local systems (or even from another cloud environment) are moved to the cloud services provider 302. In order to successfully migrate data, applications, or other elements to the cloud services provider's 302 environment, middleware such as a cloud migration tool may be utilized to bridge gaps between the cloud services provider's 302 environment and an organization's environment. In order to further enable the storage system 306 and users of the storage system 306 to make use of the services provided by the cloud services provider 302, a cloud orchestrator may also be used to arrange and coordinate automated tasks in pursuit of creating a consolidated process or workflow. Such a cloud orchestrator may perform tasks such as configuring various components, whether those components are cloud components or on-premises components, as well as managing the interconnections between such components.

In the example depicted in FIG. 3A, and as described briefly above, the cloud services provider 302 may be configured to provide services to the storage system 306 and users of the storage system 306 through the usage of a SaaS service model. For example, the cloud services provider 302 may be configured to provide access to data analytics applications to the storage system 306 and users of the storage system 306. Such data analytics applications may be configured, for example, to receive vast amounts of telemetry data phoned home by the storage system 306. Such telemetry data may describe various operating characteristics of the storage system 306 and may be analyzed for a vast array of purposes including, for example, to determine the health of the storage system 306, to identify workloads that are executing on the storage system 306, to predict when the storage system 306 will run out of various resources, to recommend configuration changes, hardware or software upgrades, workflow migrations, or other actions that may improve the operation of the storage system 306.

The cloud services provider 302 may also be configured to provide access to virtualized computing environments to the storage system 306 and users of the storage system 306. Examples of such virtualized environments can include virtual machines that are created to emulate an actual computer, virtualized desktop environments that separate a logical desktop from a physical machine, virtualized file systems that allow uniform access to different types of concrete file systems, and many others.

Although the example depicted in FIG. 3A illustrates the storage system 306 being coupled for data communications with the cloud services provider 302, in other embodiments the storage system 306 may be part of a hybrid cloud deployment in which private cloud elements (e.g., private cloud services, on-premises infrastructure, and so on) and public cloud elements (e.g., public cloud services, infrastructure, and so on that may be provided by one or more cloud services providers) are combined to form a single solution, with orchestration among the various platforms. Such a hybrid cloud deployment may leverage hybrid cloud management software such as, for example, Azure™ Arc from Microsoft™, that centralize the management of the hybrid cloud deployment to any infrastructure and enable the deployment of services anywhere. In such an example, the hybrid cloud management software may be configured to create, update, and delete resources (both physical and virtual) that form the hybrid cloud deployment, to allocate compute and storage to specific workloads, to monitor workloads and resources for performance, policy compliance, updates and patches, security status, or to perform a variety of other tasks.

Readers will appreciate that by pairing the storage systems described herein with one or more cloud services providers, various offerings may be enabled. For example, disaster recovery as a service ('DRaaS') may be provided where cloud resources are utilized to protect applications and data from disruption caused by disaster, including in embodiments where the storage systems may serve as the primary data store. In such embodiments, a total system backup may be taken that allows for business continuity in the event of system failure. In such embodiments, cloud data backup techniques (by themselves or as part of a larger DRaaS solution) may also be integrated into an overall solution that includes the storage systems and cloud services providers described herein.

The storage systems described herein, as well as the cloud services providers, may be utilized to provide a wide array of security features. For example, the storage systems may encrypt data at rest (and data may be sent to and from the storage systems encrypted) and may make use of Key Management-as-a-Service ('KMaaS') to manage encryption keys, keys for locking and unlocking storage devices, and so on. Likewise, cloud data security gateways or similar mechanisms may be utilized to ensure that data stored within the storage systems does not improperly end up being stored in the cloud as part of a cloud data backup operation. Furthermore, microsegmentation or identity-based-segmentation may be utilized in a data center that includes the storage systems or within the cloud services provider, to create secure zones in data centers and cloud deployments that enables the isolation of workloads from one another.

Figure 3B:
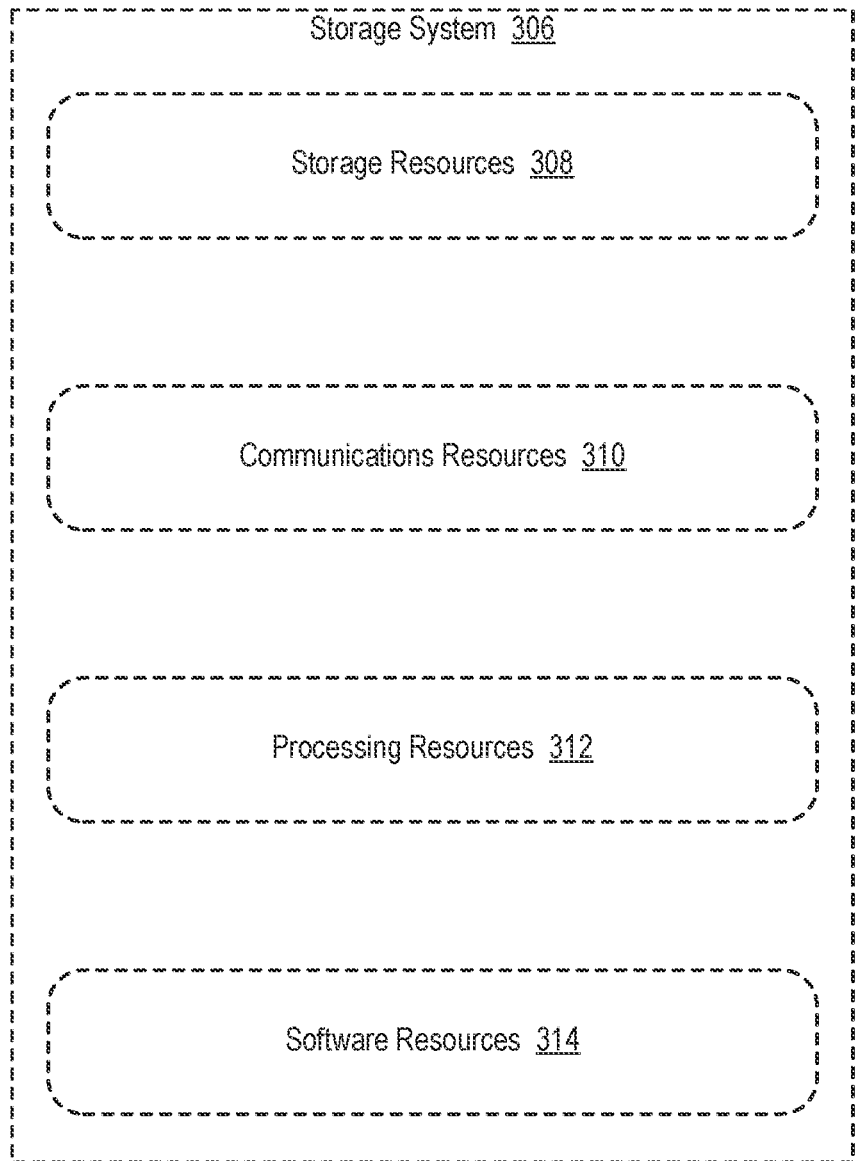
FIG. 3B sets forth a diagram of a storage system in accordance with some embodiments of the present disclosure.

For further explanation, FIG. 3B sets forth a diagram of a storage system 306 in accordance with some embodiments of the present disclosure. Although depicted in less detail, the storage system 306 depicted in FIG. 3B may be similar to the storage systems described above with reference to FIGS. 1A-1D and FIGS. 2A-2G as the storage system may include many of the components described above.

The storage system 306 depicted in FIG. 3B may include a vast amount of storage resources 308, which may be embodied in many forms. For example, the storage resources 308 can include nano-RAM or another form of nonvolatile random access memory that utilizes carbon nanotubes deposited on a substrate, 3D crosspoint non-volatile memory, flash memory including single-level cell ('SLC') NAND flash, multi-level cell ('MLC') NAND flash, triple-level cell ('TLC') NAND flash, quad-level cell ('QLC') NAND flash, or others. Likewise, the storage resources 308 may include non-volatile magnetoresistive random-access memory ('MRAM'), including spin transfer torque ('STT') MRAM. The example storage resources 308 may alternatively include non-volatile phase-change memory ('PCM'), quantum memory that allows for the storage and retrieval of photonic quantum information, resistive random-access memory ('ReRAM'), storage class memory ('SCM'), or other form of storage resources, including any combination of resources described herein. Readers will appreciate that other forms of computer memories and storage devices may be utilized by the storage systems described above, including DRAM, SRAM, EEPROM, universal memory, and many others. The storage resources 308 depicted in FIG. 3A may be embodied in a variety of form factors, including but not limited to, dual in-line memory modules ('DIMMs'), non-volatile dual in-line memory modules ('NVDIMMs'), M.2, U.2, and others.

The storage resources 308 depicted in FIG. 3B may include various forms of SCM. SCM may effectively treat fast, non-volatile memory (e.g., NAND flash) as an extension of DRAM such that an entire dataset may be treated as an in-memory dataset that resides entirely in DRAM. SCM may include non-volatile media such as, for example, NAND flash. Such NAND flash may be accessed utilizing NVMe that can use the PCIe bus as its transport, providing for relatively low access latencies compared to older protocols. In fact, the network protocols used for SSDs in all-flash arrays can include NVMe using Ethernet (ROCE, NVME TCP), Fibre Channel (NVMe FC), InfiniBand (iWARP), and others that make it possible to treat fast, non-volatile memory as an extension of DRAM. In view of the fact that DRAM is often byte-addressable and fast, non-volatile memory such as NAND flash is block-addressable, a controller software/hardware stack may be needed to convert the block data to the bytes that are stored in the media. Examples of media and software that may be used as SCM can include, for example, 3D XPoint, Intel Memory Drive Technology, Samsung's Z-SSD, and others.

The storage resources 308 depicted in FIG. 3B may also include racetrack memory (also referred to as domain-wall memory). Such racetrack memory may be embodied as a form of non-volatile, solid-state memory that relies on the intrinsic strength and orientation of the magnetic field created by an electron as it spins in addition to its electronic charge, in solid-state devices. Through the use of spin-coherent electric current to move magnetic domains along a nanoscopic permalloy wire, the domains may pass by magnetic read/write heads positioned near the wire as current is passed through the wire, which alter the domains to record patterns of bits. In order to create a racetrack memory device, many such wires and read/write elements may be packaged together.

The example storage system 306 depicted in FIG. 3B may implement a variety of storage architectures. For example, storage systems in accordance with some embodiments of the present disclosure may utilize block storage where data is stored in blocks, and each block essentially acts as an individual hard drive. Storage systems in accordance with some embodiments of the present disclosure may utilize object storage, where data is managed as objects. Each object may include the data itself, a variable amount of metadata, and a globally unique identifier, where object storage can be implemented at multiple levels (e.g., device level, system level, interface level). Storage systems in accordance with some embodiments of the present disclosure utilize file storage in which data is stored in a hierarchical structure. Such data may be saved in files and folders, and presented to both the system storing it and the system retrieving it in the same format.

The example storage system 306 depicted in FIG. 3B may be embodied as a storage system in which additional storage resources can be added through the use of a scale-up model, additional storage resources can be added through the use of a scale-out model, or through some combination thereof. In a scale-up model, additional storage may be added by adding additional storage devices. In a scale-out model, however, additional storage nodes may be added to a cluster of storage nodes, where such storage nodes can include additional processing resources, additional networking resources, and so on.

The example storage system 306 depicted in FIG. 3B may leverage the storage resources described above in a variety of different ways. For example, some portion of the storage resources may be utilized to serve as a write cache, storage resources within the storage system may be utilized as a read cache, or tiering may be achieved within the storage systems by placing data within the storage system in accordance with one or more tiering policies.

The storage system 306 depicted in FIG. 3B also includes communications resources 310 that may be useful in facilitating data communications between components within the storage system 306, as well as data communications between the storage system 306 and computing devices that are outside of the storage system 306, including embodiments where those resources are separated by a relatively vast expanse. The communications resources 310 may be configured to utilize a variety of different protocols and data communication fabrics to facilitate data communications between components within the storage systems as well as computing devices that are outside of the storage system. For example, the communications resources 310 can include fibre channel ('FC') technologies such as FC fabrics and FC protocols that can transport SCSI commands over FC network, FC over ethernet ('FCoE') technologies through which FC frames are encapsulated and transmitted over Ethernet networks, InfiniBand ('IB') technologies in which a switched fabric topology is utilized to facilitate transmissions between channel adapters, NVM Express ('NVMe') technologies and NVMe over fabrics ('NVMeoF') technologies through which non-volatile storage media attached via a PCI express ('PCIe') bus may be accessed, and others. In fact, the storage systems described above may, directly or indirectly, make use of neutrino communication technologies and devices through which information (including binary information) is transmitted using a beam of neutrinos.

The communications resources 310 can also include mechanisms for accessing storage resources 308 within the storage system 306 utilizing serial attached SCSI ('SAS'), serial ATA ('SATA') bus interfaces for connecting storage resources 308 within the storage system 306 to host bus adapters within the storage system 306, internet small computer systems interface ('iSCSI') technologies to provide block-level access to storage resources 308 within the storage system 306, and other communications resources that that may be useful in facilitating data communications between components within the storage system 306, as well as data communications between the storage system 306 and computing devices that are outside of the storage system 306.

The storage system 306 depicted in FIG. 3B also includes processing resources 312 that may be useful in useful in executing computer program instructions and performing other computational tasks within the storage system 306. The processing resources 312 may include one or more ASICs that are customized for some particular purpose as well as one or more CPUs. The processing resources 312 may also include one or more DSPs, one or more FPGAs, one or more systems on a chip ('SoCs'), or other form of processing resources 312. The storage system 306 may utilize the storage resources 312 to perform a variety of tasks including, but not limited to, supporting the execution of software resources 314 that will be described in greater detail below.

The storage system 306 depicted in FIG. 3B also includes software resources 314 that, when executed by processing resources 312 within the storage system 306, may perform a vast array of tasks. The software resources 314 may include, for example, one or more modules of computer program instructions that when executed by processing resources 312 within the storage system 306 are useful in carrying out various data protection techniques. Such data protection techniques may be carried out, for example, by system software executing on computer hardware within the storage system, by a cloud services provider, or in other ways. Such data protection techniques can include data archiving, data backup, data replication, data snapshotting, data and database cloning, and other data protection techniques.

The software resources 314 may also include software that is useful in implementing software-defined storage ('SDS'). In such an example, the software resources 314 may include one or more modules of computer program instructions that, when executed, are useful in policy-based provisioning and management of data storage that is independent of the underlying hardware. Such software resources 314 may be useful in implementing storage virtualization to separate the storage hardware from the software that manages the storage hardware.

The software resources 314 may also include software that is useful in facilitating and optimizing I/O operations that are directed to the storage system 306. For example, the software resources 314 may include software modules that perform various data reduction techniques such as, for example, data compression, data deduplication, and others. The software resources 314 may include software modules that intelligently group together I/O operations to facilitate better usage of the underlying storage resource 308, software modules that perform data migration operations to migrate from within a storage system, as well as software modules that perform other functions. Such software resources 314 may be embodied as one or more software containers or in many other ways.

Figure 3C:
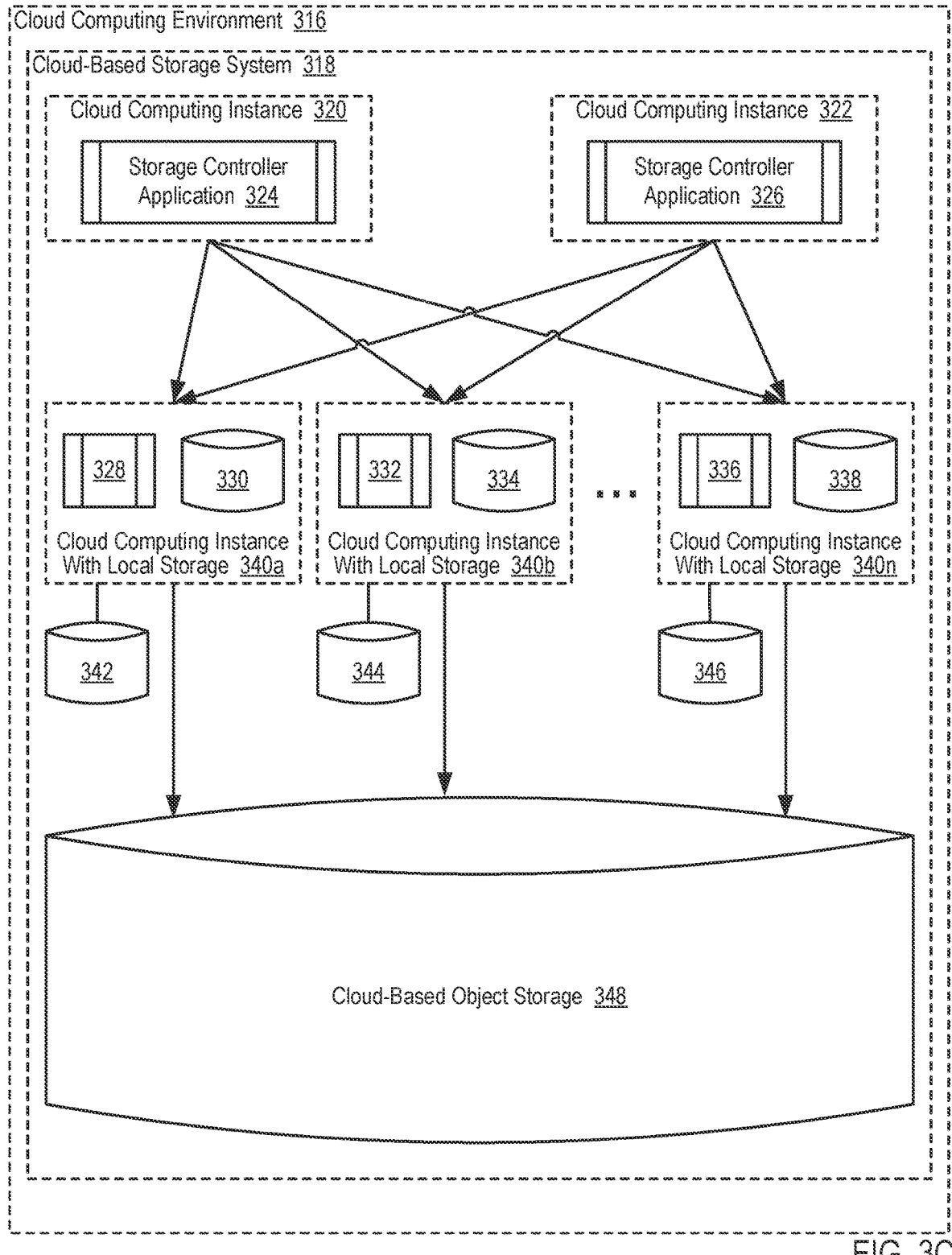
FIG. 3C sets forth an example of a cloud-based storage system in accordance with some embodiments of the present disclosure.

For further explanation, FIG. 3C sets forth an example of a cloud-based storage system 318 in accordance with some embodiments of the present disclosure. In the example depicted in FIG. 3C, the cloud-based storage system 318 is created entirely in a cloud computing environment 316 such as, for example, Amazon Web Services ('AWS')™, Microsoft Azure™, Google Cloud Platform™, IBM Cloud™, Oracle Cloud™, and others. The cloud-based storage system 318 may be used to provide services similar to the services that may be provided by the storage systems described above.

The cloud-based storage system 318 depicted in FIG. 3C includes two cloud computing instances 320, 322 that each are used to support the execution of a storage controller application 324, 326. The cloud computing instances 320, 322 may be embodied, for example, as instances of cloud computing resources (e.g., virtual machines) that may be provided by the cloud computing environment 316 to support the execution of software applications such as the storage controller application 324, 326. For example, each of the cloud computing instances 320, 322 may execute on an Azure VM, where each Azure VM may include high speed temporary storage that may be leveraged as a cache (e.g., as a read cache). In one embodiment, the cloud computing instances 320, 322 may be embodied as Amazon Elastic Compute Cloud ('EC2') instances. In such an example, an Amazon Machine Image ('AMI') that includes the storage controller application 324, 326 may be booted to create and configure a virtual machine that may execute the storage controller application 324, 326.

In the example method depicted in FIG. 3C, the storage controller application 324, 326 may be embodied as a module of computer program instructions that, when executed, carries out various storage tasks. For example, the storage controller application 324, 326 may be embodied as a module of computer program instructions that, when executed, carries out the same tasks as the controllers 110A, 110B in FIG. 1A described above such as writing data to the cloud-based storage system 318, erasing data from the cloud-based storage system 318, retrieving data from the cloud-based storage system 318, monitoring and reporting of storage device utilization and performance, performing redundancy operations, such as RAID or RAID-like data redundancy operations, compressing data, encrypting data, deduplicating data, and so forth. Readers will appreciate that because there are two cloud computing instances 320, 322 that each include the storage controller application 324, 326, in some embodiments one cloud computing instance 320 may operate as the primary controller as described above while the other cloud computing instance 322 may operate as the secondary controller as described above. Readers will appreciate that the storage controller application 324, 326 depicted in FIG. 3C may include identical source code that is executed within different cloud computing instances 320, 322 such as distinct EC2 instances.

Readers will appreciate that other embodiments that do not include a primary and secondary controller are within the scope of the present disclosure. For example, each cloud computing instance 320, 322 may operate as a primary controller for some portion of the address space supported by the cloud-based storage system 318, each cloud computing instance 320, 322 may operate as a primary controller where the servicing of I/O operations directed to the cloud-based storage system 318 are divided in some other way, and so on. In fact, in other embodiments where costs savings may be prioritized over performance demands, only a single cloud computing instance may exist that contains the storage controller application.

The cloud-based storage system 318 depicted in FIG. 3C includes cloud computing instances 340a, 340b, 340n with local storage 330, 334, 338. The cloud computing instances 340a, 340b, 340n may be embodied, for example, as instances of cloud computing resources that may be provided by the cloud computing environment 316 to support the execution of software applications. The cloud computing instances 340a, 340b, 340n of FIG. 3C may differ from the cloud computing instances 320, 322 described above as the cloud computing instances 340a, 340b, 340n of FIG. 3C have local storage 330, 334, 338 resources whereas the cloud computing instances 320, 322 that support the execution of the storage controller application 324, 326 need not have local storage resources. The cloud computing instances 340a, 340b, 340n with local storage 330, 334, 338 may be embodied, for example, as EC2 M5 instances that include one or more SSDs, as EC2 R5 instances that include one or more SSDs, as EC2 I3 instances that include one or more SSDs, and so on. In some embodiments, the local storage 330, 334, 338 must be embodied as solid-state storage (e.g., SSDs) rather than storage that makes use of hard disk drives.

In the example depicted in FIG. 3C, each of the cloud computing instances 340a, 340b, 340n with local storage 330, 334, 338 can include a software daemon 328, 332, 336 that, when executed by a cloud computing instance 340a, 340b, 340n can present itself to the storage controller applications 324, 326 as if the cloud computing instance 340a, 340b, 340n were a physical storage device (e.g., one or more SSDs). In such an example, the software daemon 328, 332, 336 may include computer program instructions similar to those that would normally be contained on a storage device such that the storage controller applications 324, 326 can send and receive the same commands that a storage controller would send to storage devices. In such a way, the storage controller applications 324, 326 may include code that is identical to (or substantially identical to) the code that would be executed by the controllers in the storage systems described above. In these and similar embodiments, communications between the storage controller applications 324, 326 and the cloud computing instances 340a, 340b, 340n with local storage 330, 334, 338 may utilize iSCSI, NVMe over TCP, messaging, a custom protocol, or in some other mechanism.

In the example depicted in FIG. 3C, each of the cloud computing instances 340a, 340b, 340n with local storage 330, 334, 338 may also be coupled to block storage 342, 344, 346 that is offered by the cloud computing environment 316 such as, for example, as Amazon Elastic Block Store ('EBS') volumes. In such an example, the block storage 342, 344, 346 that is offered by the cloud computing environment 316 may be utilized in a manner that is similar to how the NVRAM devices described above are utilized, as the software daemon 328, 332, 336 (or some other module) that is executing within a particular cloud comping instance 340a, 340b, 340n may, upon receiving a request to write data, initiate a write of the data to its attached EBS volume as well as a write of the data to its local storage 330, 334, 338 resources. In some alternative embodiments, data may only be written to the local storage 330, 334, 338 resources within a particular cloud comping instance 340a, 340b, 340n. In an alternative embodiment, rather than using the block storage 342, 344, 346 that is offered by the cloud computing environment 316 as NVRAM, actual RAM on each of the cloud computing instances 340a, 340b, 340n with local storage 330, 334, 338 may be used as NVRAM, thereby decreasing network utilization costs that would be associated with using an EBS volume as the NVRAM. In yet another embodiment, high performance block storage resources such as one or more Azure Ultra Disks may be utilized as the NVRAM.

When a request to write data is received by a particular cloud computing instance 340a, 340b, 340n with local storage 330, 334, 338, the software daemon 328, 332, 336 may be configured to not only write the data to its own local storage 330, 334, 338 resources and any appropriate block storage 342, 344, 346 resources, but the software daemon 328, 332, 336 may also be configured to write the data to cloud-based object storage 348 that is attached to the particular cloud computing instance 340a, 340b, 340n. The cloud-based object storage 348 that is attached to the particular cloud computing instance 340a, 340b, 340n may be embodied, for example, as Amazon Simple Storage Service ('S3'). In other embodiments, the cloud computing instances 320, 322 that each include the storage controller application 324, 326 may initiate the storage of the data in the local storage 330, 334, 338 of the cloud computing instances 340a, 340b, 340n and the cloud-based object storage 348. In other embodiments, rather than using both the cloud computing instances 340a, 340b, 340n with local storage 330, 334, 338 (also referred to herein as 'virtual drives') and the cloud-based object storage 348 to store data, a persistent storage layer may be implemented in other ways. For example, one or more Azure Ultra disks may be used to persistently store data (e.g., after the data has been written to the NVRAM layer). In an embodiment where one or more Azure Ultra disks may be used to persistently store data, the usage of a cloud-based object storage 348 may be eliminated such that data is only stored persistently in the Azure Ultra disks without also writing the data to an object storage layer.

While the local storage 330, 334, 338 resources and the block storage 342, 344, 346 resources that are utilized by the cloud computing instances 340a, 340b, 340n may support block-level access, the cloud-based object storage 348 that is attached to the particular cloud computing instance 340a, 340b, 340n supports only object-based access. The software daemon 328, 332, 336 may therefore be configured to take blocks of data, package those blocks into objects, and write the objects to the cloud-based object storage 348 that is attached to the particular cloud computing instance 340a, 340b, 340n.

In some embodiments, all data that is stored by the cloud-based storage system 318 may be stored in both: 1) the cloud-based object storage 348, and 2) at least one of the local storage 330, 334, 338 resources or block storage 342, 344, 346 resources that are utilized by the cloud computing instances 340a, 340b, 340n. In such embodiments, the local storage 330, 334, 338 resources and block storage 342, 344, 346 resources that are utilized by the cloud computing instances 340a, 340b, 340n may effectively operate as cache that generally includes all data that is also stored in S3, such that all reads of data may be serviced by the cloud computing instances 340a, 340b, 340n without requiring the cloud computing instances 340a, 340b, 340n to access the cloud-based object storage 348. Readers will appreciate that in other embodiments, however, all data that is stored by the cloud-based storage system 318 may be stored in the cloud-based object storage 348, but less than all data that is stored by the cloud-based storage system 318 may be stored in at least one of the local storage 330, 334, 338 resources or block storage 342, 344, 346 resources that are utilized by the cloud computing instances 340a, 340b, 340n. In such an example, various policies may be utilized to determine which subset of the data that is stored by the cloud-based storage system 318 should reside in both: 1) the cloud-based object storage 348, and 2) at least one of the local storage 330, 334, 338 resources or block storage 342, 344, 346 resources that are utilized by the cloud computing instances 340a, 340b, 340n.

One or more modules of computer program instructions that are executing within the cloud-based storage system 318 (e.g., a monitoring module that is executing on its own EC2 instance) may be designed to handle the failure of one or more of the cloud computing instances 340a, 340b, 340n with local storage 330, 334, 338. In such an example, the monitoring module may handle the failure of one or more of the cloud computing instances 340a, 340b, 340n with local storage 330, 334, 338 by creating one or more new cloud computing instances with local storage, retrieving data that was stored on the failed cloud computing instances 340a, 340b, 340n from the cloud-based object storage 348, and storing the data retrieved from the cloud-based object storage 348 in local storage on the newly created cloud computing instances. Readers will appreciate that many variants of this process may be implemented.

Readers will appreciate that various performance aspects of the cloud-based storage system 318 may be monitored (e.g., by a monitoring module that is executing in an EC2 instance) such that the cloud-based storage system 318 can be scaled-up or scaled-out as needed. For example, if the cloud computing instances 320, 322 that are used to support the execution of a storage controller application 324, 326 are undersized and not sufficiently servicing the I/O requests that are issued by users of the cloud-based storage system 318, a monitoring module may create a new, more powerful cloud computing instance (e.g., a cloud computing instance of a type that includes more processing power, more memory, etc. . . . ) that includes the storage controller application such that the new, more powerful cloud computing instance can begin operating as the primary controller. Likewise, if the monitoring module determines that the cloud computing instances 320, 322 that are used to support the execution of a storage controller application 324, 326 are oversized and that cost savings could be gained by switching to a smaller, less powerful cloud computing instance, the monitoring module may create a new, less powerful (and less expensive) cloud computing instance that includes the storage controller application such that the new, less powerful cloud computing instance can begin operating as the primary controller.

The storage systems described above may carry out intelligent data backup techniques through which data stored in the storage system may be copied and stored in a distinct location to avoid data loss in the event of equipment failure or some other form of catastrophe. For example, the storage systems described above may be configured to examine each backup to avoid restoring the storage system to an undesirable state. Consider an example in which malware infects the storage system. In such an example, the storage system may include software resources 314 that can scan each backup to identify backups that were captured before the malware infected the storage system and those backups that were captured after the malware infected the storage system. In such an example, the storage system may restore itself from a backup that does not include the malware—or at least not restore the portions of a backup that contained the malware. In such an example, the storage system may include software resources 314 that can scan each backup to identify the presences of malware (or a virus, or some other undesirable), for example, by identifying write operations that were serviced by the storage system and originated from a network subnet that is suspected to have delivered the malware, by identifying write operations that were serviced by the storage system and originated from a user that is suspected to have delivered the malware, by identifying write operations that were serviced by the storage system and examining the content of the write operation against fingerprints of the malware, and in many other ways.

Readers will further appreciate that the backups (often in the form of one or more snapshots) may also be utilized to perform rapid recovery of the storage system. Consider an example in which the storage system is infected with ransomware that locks users out of the storage system. In such an example, software resources 314 within the storage system may be configured to detect the presence of ransomware and may be further configured to restore the storage system to a point-in-time, using the retained backups, prior to the point-in-time at which the ransomware infected the storage system. In such an example, the presence of ransomware may be explicitly detected through the use of software tools utilized by the system, through the use of a key (e.g., a USB drive) that is inserted into the storage system, or in a similar way. Likewise, the presence of ransomware may be inferred in response to system activity meeting a predetermined fingerprint such as, for example, no reads or writes coming into the system for a predetermined period of time.

Readers will appreciate that the various components described above may be grouped into one or more optimized computing packages as converged infrastructures. Such converged infrastructures may include pools of computers, storage and networking resources that can be shared by multiple applications and managed in a collective manner using policy-driven processes. Such converged infrastructures may be implemented with a converged infrastructure reference architecture, with standalone appliances, with a software driven hyper-converged approach (e.g., hyper-converged infrastructures), or in other ways.

Readers will appreciate that the storage systems described in this disclosure may be useful for supporting various types of software applications. In fact, the storage systems may be 'application aware' in the sense that the storage systems may obtain, maintain, or otherwise have access to information describing connected applications (e.g., applications that utilize the storage systems) to optimize the operation of the storage system based on intelligence about the applications and their utilization patterns. For example, the storage system may optimize data layouts, optimize caching behaviors, optimize 'QoS' levels, or perform some other optimization that is designed to improve the storage performance that is experienced by the application.

As an example of one type of application that may be supported by the storage systems describe herein, the storage system 306 may be useful in supporting artificial intelligence ('AI') applications, database applications, XOps projects (e.g., DevOps projects, DataOps projects, MLOps projects, ModelOps projects, PlatformOps projects), electronic design automation tools, event-driven software applications, high performance computing applications, simulation applications, high-speed data capture and analysis applications, machine learning applications, media production applications, media serving applications, picture archiving and communication systems ('PACS') applications, software development applications, virtual reality applications, augmented reality applications, and many other types of applications by providing storage resources to such applications.

In view of the fact that the storage systems include compute resources, storage resources, and a wide variety of other resources, the storage systems may be well suited to support applications that are resource intensive such as, for example, AI applications. AI applications may be deployed in a variety of fields, including: predictive maintenance in manufacturing and related fields, healthcare applications such as patient data & risk analytics, retail and marketing deployments (e.g., search advertising, social media advertising), supply chains solutions, fintech solutions such as business analytics & reporting tools, operational deployments such as real-time analytics tools, application performance management tools, IT infrastructure management tools, and many others.

Such AI applications may enable devices to perceive their environment and take actions that maximize their chance of success at some goal. Examples of such AI applications can include IBM Watson™, Microsoft Oxford™, Google DeepMind™, Baidu Minwa™, and others.

The storage systems described above may also be well suited to support other types of applications that are resource intensive such as, for example, machine learning applications. Machine learning applications may perform various types of data analysis to automate analytical model building. Using algorithms that iteratively learn from data, machine learning applications can enable computers to learn without being explicitly programmed. One particular area of machine learning is referred to as reinforcement learning, which involves taking suitable actions to maximize reward in a particular situation.

In addition to the resources already described, the storage systems described above may also include graphics processing units ('GPUs'), occasionally referred to as visual processing unit ('VPUs'). Such GPUs may be embodied as specialized electronic circuits that rapidly manipulate and alter memory to accelerate the creation of images in a frame buffer intended for output to a display device. Such GPUs may be included within any of the computing devices that are part of the storage systems described above, including as one of many individually scalable components of a storage system, where other examples of individually scalable components of such storage system can include storage components, memory components, compute components (e.g., CPUs, FPGAs, ASICs), networking components, software components, and others. In addition to GPUs, the storage systems described above may also include neural network processors ('NNPs') for use in various aspects of neural network processing. Such NNPs may be used in place of (or in addition to) GPUs and may also be independently scalable.

As described above, the storage systems described herein may be configured to support artificial intelligence applications, machine learning applications, big data analytics applications, and many other types of applications. The rapid growth in these sort of applications is being driven by three technologies: deep learning (DL), GPU processors, and Big Data. Deep learning is a computing model that makes use of massively parallel neural networks inspired by the human brain. Instead of experts handcrafting software, a deep learning model writes its own software by learning from lots of examples. Such GPUs may include thousands of cores that are well-suited to run algorithms that loosely represent the parallel nature of the human brain.

Advances in deep neural networks, including the development of multi-layer neural networks, have ignited a new wave of algorithms and tools for data scientists to tap into their data with artificial intelligence (AI). With improved algorithms, larger data sets, and various frameworks (including open-source software libraries for machine learning across a range of tasks), data scientists are tackling new use cases like autonomous driving vehicles, natural language processing and understanding, computer vision, machine reasoning, strong AI, and many others. Applications of AI techniques have materialized in a wide array of products include, for example, Amazon Echo's speech recognition technology that allows users to talk to their machines, Google Translate™ which allows for machine-based language translation, Spotify's Discover Weekly that provides recommendations on new songs and artists that a user may like based on the user's usage and traffic analysis, Quill's text generation offering that takes structured data and turns it into narrative stories, Chatbots that provide real-time, contextually specific answers to questions in a dialog format, and many others.

Data is the heart of modern AI and deep learning algorithms. Before training can begin, one problem that must be addressed revolves around collecting the labeled data that is crucial for training an accurate AI model. A full scale AI deployment may be required to continuously collect, clean, transform, label, and store large amounts of data. Adding additional high quality data points directly translates to more accurate models and better insights. Data samples may undergo a series of processing steps including, but not limited to: 1) ingesting the data from an external source into the training system and storing the data in raw form, 2) cleaning and transforming the data in a format convenient for training, including linking data samples to the appropriate label, 3) exploring parameters and models, quickly testing with a smaller dataset, and iterating to converge on the most promising models to push into the production cluster, 4) executing training phases to select random batches of input data, including both new and older samples, and feeding those into production GPU servers for computation to update model parameters, and 5) evaluating including using a holdback portion of the data not used in training in order to evaluate model accuracy on the holdout data. This lifecycle may apply for any type of parallelized machine learning, not just neural networks or deep learning. For example, standard machine learning frameworks may rely on CPUs instead of GPUs but the data ingest and training workflows may be the same. Readers will appreciate that a single shared storage data hub creates a coordination point throughout the lifecycle without the need for extra data copies among the ingest, preprocessing, and training stages. Rarely is the ingested data used for only one purpose, and shared storage gives the flexibility to train multiple different models or apply traditional analytics to the data.

Readers will appreciate that each stage in the AI data pipeline may have varying requirements from the data hub (e.g., the storage system or collection of storage systems). Scale-out storage systems must deliver uncompromising performance for all manner of access types and patterns—from small, metadata-heavy to large files, from random to sequential access patterns, and from low to high concurrency. The storage systems described above may serve as an ideal AI data hub as the systems may service unstructured workloads. In the first stage, data is ideally ingested and stored on to the same data hub that following stages will use, in order to avoid excess data copying. The next two steps can be done on a standard compute server that optionally includes a GPU, and then in the fourth and last stage, full training production jobs are run on powerful GPU-accelerated servers. Often, there is a production pipeline alongside an experimental pipeline operating on the same dataset. Further, the GPU-accelerated servers can be used independently for different models or joined together to train on one larger model, even spanning multiple systems for distributed training. If the shared storage tier is slow, then data must be copied to local storage for each phase, resulting in wasted time staging data onto different servers. The ideal data hub for the AI training pipeline delivers performance similar to data stored locally on the server node while also having the simplicity and performance to enable all pipeline stages to operate concurrently.

In order for the storage systems described above to serve as a data hub or as part of an AI deployment, in some embodiments the storage systems may be configured to provide DMA between storage devices that are included in the storage systems and one or more GPUs that are used in an AI or big data analytics pipeline. The one or more GPUs may be coupled to the storage system, for example, via NVMe-over-Fabrics ('NVMe-oF') such that bottlenecks such as the host CPU can be bypassed and the storage system (or one of the components contained therein) can directly access GPU memory. In such an example, the storage systems may leverage API hooks to the GPUs to transfer data directly to the GPUs. For example, the GPUs may be embodied as Nvidia™ GPUs and the storage systems may support GPUDirect Storage ('GDS') software, or have similar proprietary software, that enables the storage system to transfer data to the GPUs via RDMA or similar mechanism.

Although the preceding paragraphs discuss deep learning applications, readers will appreciate that the storage systems described herein may also be part of a distributed deep learning ('DDL') platform to support the execution of DDL algorithms. The storage systems described above may also be paired with other technologies such as TensorFlow, an open-source software library for dataflow programming across a range of tasks that may be used for machine learning applications such as neural networks, to facilitate the development of such machine learning models, applications, and so on.

The storage systems described above may also be used in a neuromorphic computing environment. Neuromorphic computing is a form of computing that mimics brain cells. To support neuromorphic computing, an architecture of interconnected "neurons" replace traditional computing models with low-powered signals that go directly between neurons for more efficient computation. Neuromorphic computing may make use of very-large-scale integration (VLSI) systems containing electronic analog circuits to mimic neuro-biological architectures present in the nervous system, as well as analog, digital, mixed-mode analog/digital VLSI, and software systems that implement models of neural systems for perception, motor control, or multisensory integration.

Readers will appreciate that the storage systems described above may be configured to support the storage or use of (among other types of data) blockchains and derivative items such as, for example, open source blockchains and related tools that are part of the IBM™ Hyperledger project, permissioned blockchains in which a certain number of trusted parties are allowed to access the block chain, blockchain products that enable developers to build their own distributed ledger projects, and others. Blockchains and the storage systems described herein may be leveraged to support on-chain storage of data as well as off-chain storage of data.

Off-chain storage of data can be implemented in a variety of ways and can occur when the data itself is not stored within the blockchain. For example, in one embodiment, a hash function may be utilized and the data itself may be fed into the hash function to generate a hash value. In such an example, the hashes of large pieces of data may be embedded within transactions, instead of the data itself. Readers will appreciate that, in other embodiments, alternatives to blockchains may be used to facilitate the decentralized storage of information. For example, one alternative to a blockchain that may be used is a blockweave. While conventional blockchains store every transaction to achieve validation, a blockweave permits secure decentralization without the usage of the entire chain, thereby enabling low cost on-chain storage of data. Such blockweaves may utilize a consensus mechanism that is based on proof of access (PoA) and proof of work (PoW).

The storage systems described above may, either alone or in combination with other computing devices, be used to support in-memory computing applications. In-memory computing involves the storage of information in RAM that is distributed across a cluster of computers. Readers will appreciate that the storage systems described above, especially those that are configurable with customizable amounts of processing resources, storage resources, and memory resources (e.g., those systems in which blades that contain configurable amounts of each type of resource), may be configured in a way so as to provide an infrastructure that can support in-memory computing. Likewise, the storage systems described above may include component parts (e.g., NVDIMMs, 3D crosspoint storage that provide fast random access memory that is persistent) that can actually provide for an improved in-memory computing environment as compared to in-memory computing environments that rely on RAM distributed across dedicated servers.

In some embodiments, the storage systems described above may be configured to operate as a hybrid in-memory computing environment that includes a universal interface to all storage media (e.g., RAM, flash storage, 3D crosspoint storage). In such embodiments, users may have no knowledge regarding the details of where their data is stored but they can still use the same full, unified API to address data. In such embodiments, the storage system may (in the background) move data to the fastest layer available—including intelligently placing the data in dependence upon various characteristics of the data or in dependence upon some other heuristic. In such an example, the storage systems may even make use of existing products such as Apache Ignite and GridGain to move data between the various storage layers, or the storage systems may make use of custom software to move data between the various storage layers. The storage systems described herein may implement various optimizations to improve the performance of in-memory computing such as, for example, having computations occur as close to the data as possible.

Readers will further appreciate that in some embodiments, the storage systems described above may be paired with other resources to support the applications described above. For example, one infrastructure could include primary compute in the form of servers and workstations which specialize in using General-purpose computing on graphics processing units ('GPGPU') to accelerate deep learning applications that are interconnected into a computation engine to train parameters for deep neural networks. Each system may have Ethernet external connectivity, InfiniBand external connectivity, some other form of external connectivity, or some combination thereof. In such an example, the GPUs can be grouped for a single large training or used independently to train multiple models. The infrastructure could also include a storage system such as those described above to provide, for example, a scale-out all-flash file or object store through which data can be accessed via high-performance protocols such as NFS, S3, and so on. The infrastructure can also include, for example, redundant top-of-rack Ethernet switches connected to storage and compute via ports in MLAG port channels for redundancy. The infrastructure could also include additional compute in the form of whitebox servers, optionally with GPUs, for data ingestion, pre-processing, and model debugging. Readers will appreciate that additional infrastructures are also be possible.

Readers will appreciate that the storage systems described above, either alone or in coordination with other computing machinery may be configured to support other AI related tools. For example, the storage systems may make use of tools like ONXX or other open neural network exchange formats that make it easier to transfer models written in different AI frameworks. Likewise, the storage systems may be configured to support tools like Amazon's Gluon that allow developers to prototype, build, and train deep learning models. In fact, the storage systems described above may be part of a larger platform, such as IBM™ Cloud Private for Data, that includes integrated data science, data engineering and application building services.

Readers will further appreciate that the storage systems described above may also be deployed as an edge solution. Such an edge solution may be in place to optimize cloud computing systems by performing data processing at the edge of the network, near the source of the data. Edge computing can push applications, data and computing power (i.e., services) away from centralized points to the logical extremes of a network. Through the use of edge solutions such as the storage systems described above, computational tasks may be performed using the compute resources provided by such storage systems, data may be storage using the storage resources of the storage system, and cloud-based services may be accessed through the use of various resources of the storage system (including networking resources). By performing computational tasks on the edge solution, storing data on the edge solution, and generally making use of the edge solution, the consumption of expensive cloud-based resources may be avoided and, in fact, performance improvements may be experienced relative to a heavier reliance on cloud-based resources.

While many tasks may benefit from the utilization of an edge solution, some particular uses may be especially suited for deployment in such an environment. For example, devices like drones, autonomous cars, robots, and others may require extremely rapid processing—so fast, in fact, that sending data up to a cloud environment and back to receive data processing support may simply be too slow. As an additional example, some IoT devices such as connected video cameras may not be well-suited for the utilization of cloud-based resources as it may be impractical (not only from a privacy perspective, security perspective, or a financial perspective) to send the data to the cloud simply because of the pure volume of data that is involved. As such, many tasks that really on data processing, storage, or communications may be better suited by platforms that include edge solutions such as the storage systems described above.

The storage systems described above may alone, or in combination with other computing resources, serves as a network edge platform that combines compute resources, storage resources, networking resources, cloud technologies and network virtualization technologies, and so on. As part of the network, the edge may take on characteristics similar to other network facilities, from the customer premise and backhaul aggregation facilities to Points of Presence (PoPs) and regional data centers. Readers will appreciate that network workloads, such as Virtual Network Functions (VNFs) and others, will reside on the network edge platform. Enabled by a combination of containers and virtual machines, the network edge platform may rely on controllers and schedulers that are no longer geographically co-located with the data processing resources. The functions, as microservices, may split into control planes, user and data planes, or even state machines, allowing for independent optimization and scaling techniques to be applied. Such user and data planes may be enabled through increased accelerators, both those residing in server platforms, such as FPGAs and Smart NICs, and through SDN-enabled merchant silicon and programmable ASICs.

The storage systems described above may also be optimized for use in big data analytics, including being leveraged as part of a composable data analytics pipeline where containerized analytics architectures, for example, make analytics capabilities more composable. Big data analytics may be generally described as the process of examining large and varied data sets to uncover hidden patterns, unknown correlations, market trends, customer preferences and other useful information that can help organizations make more-informed business decisions. As part of that process, semi-structured and unstructured data such as, for example, internet clickstream data, web server logs, social media content, text from customer emails and survey responses, mobile-phone call-detail records, IoT sensor data, and other data may be converted to a structured form.

The storage systems described above may also support (including implementing as a system interface) applications that perform tasks in response to human speech. For example, the storage systems may support the execution intelligent personal assistant applications such as, for example, Amazon's Alexa™, Apple Siri™, Google Voice™, Samsung Bixby™, Microsoft Cortana™, and others. While the examples described in the previous sentence make use of voice as input, the storage systems described above may also support chatbots, talkbots, chatterbots, or artificial conversational entities or other applications that are configured to conduct a conversation via auditory or textual methods. Likewise, the storage system may actually execute such an application to enable a user such as a system administrator to interact with the storage system via speech. Such applications are generally capable of voice interaction, music playback, making to-do lists, setting alarms, streaming podcasts, playing audiobooks, and providing weather, traffic, and other real time information, such as news, although in embodiments in accordance with the present disclosure, such applications may be utilized as interfaces to various system management operations.

The storage systems described above may also implement AI platforms for delivering on the vision of self-driving storage. Such AI platforms may be configured to deliver global predictive intelligence by collecting and analyzing large amounts of storage system telemetry data points to enable effortless management, analytics and support. In fact, such storage systems may be capable of predicting both capacity and performance, as well as generating intelligent advice on workload deployment, interaction and optimization. Such AI platforms may be configured to scan all incoming storage system telemetry data against a library of issue fingerprints to predict and resolve incidents in real-time, before they impact customer environments, and captures hundreds of variables related to performance that are used to forecast performance load.

The storage systems described above may support the serialized or simultaneous execution of artificial intelligence applications, machine learning applications, data analytics applications, data transformations, and other tasks that collectively may form an AI ladder. Such an AI ladder may effectively be formed by combining such elements to form a complete data science pipeline, where exist dependencies between elements of the AI ladder. For example, AI may require that some form of machine learning has taken place, machine learning may require that some form of analytics has taken place, analytics may require that some form of data and information architecting has taken place, and so on. As such, each element may be viewed as a rung in an AI ladder that collectively can form a complete and sophisticated AI solution.

The storage systems described above may also, either alone or in combination with other computing environments, be used to deliver an AI everywhere experience where AI permeates wide and expansive aspects of business and life. For example, AI may play an important role in the delivery of deep learning solutions, deep reinforcement learning solutions, artificial general intelligence solutions, autonomous vehicles, cognitive computing solutions, commercial UAVs or drones, conversational user interfaces, enterprise taxonomies, ontology management solutions, machine learning solutions, smart dust, smart robots, smart workplaces, and many others.

The storage systems described above may also, either alone or in combination with other computing environments, be used to deliver a wide range of transparently immersive experiences (including those that use digital twins of various "things" such as people, places, processes, systems, and so on) where technology can introduce transparency between people, businesses, and things. Such transparently immersive experiences may be delivered as augmented reality technologies, connected homes, virtual reality technologies, brain-computer interfaces, human augmentation technologies, nanotube electronics, volumetric displays, 4D printing technologies, or others.

The storage systems described above may also, either alone or in combination with other computing environments, be used to support a wide variety of digital platforms. Such digital platforms can include, for example, 5G wireless systems and platforms, digital twin platforms, edge computing platforms, IoT platforms, quantum computing platforms, serverless PaaS, software-defined security, neuromorphic computing platforms, and so on.

The storage systems described above may also be part of a multi-cloud environment in which multiple cloud computing and storage services are deployed in a single heterogeneous architecture. In order to facilitate the operation of such a multi-cloud environment, DevOps tools may be deployed to enable orchestration across clouds. Likewise, continuous development and continuous integration tools may be deployed to standardize processes around continuous integration and delivery, new feature rollout and provisioning cloud workloads. By standardizing these processes, a multi-cloud strategy may be implemented that enables the utilization of the best provider for each workload.

The storage systems described above may be used as a part of a platform to enable the use of crypto-anchors that may be used to authenticate a product's origins and contents to ensure that it matches a blockchain record associated with the product. Similarly, as part of a suite of tools to secure data stored on the storage system, the storage systems described above may implement various encryption technologies and schemes, including lattice cryptography. Lattice cryptography can involve constructions of cryptographic primitives that involve lattices, either in the construction itself or in the security proof. Unlike public-key schemes such as the RSA, Diffie-Hellman or Elliptic-Curve cryptosystems, which are easily attacked by a quantum computer, some lattice-based constructions appear to be resistant to attack by both classical and quantum computers.

A quantum computer is a device that performs quantum computing. Quantum computing is computing using quantum-mechanical phenomena, such as superposition and entanglement. Quantum computers differ from traditional computers that are based on transistors, as such traditional computers require that data be encoded into binary digits (bits), each of which is always in one of two definite states (0 or 1). In contrast to traditional computers, quantum computers use quantum bits, which can be in superpositions of states. A quantum computer maintains a sequence of qubits, where a single qubit can represent a one, a zero, or any quantum superposition of those two qubit states. A pair of qubits can be in any quantum superposition of 4 states, and three qubits in any superposition of 8 states. A quantum computer with n qubits can generally be in an arbitrary superposition of up to $2^n$ different states simultaneously, whereas a traditional computer can only be in one of these states at any one time. A quantum Turing machine is a theoretical model of such a computer.

The storage systems described above may also be paired with FPGA-accelerated servers as part of a larger AI or ML infrastructure. Such FPGA-accelerated servers may reside near (e.g., in the same data center) the storage systems described above or even incorporated into an appliance that includes one or more storage systems, one or more FPGA-accelerated servers, networking infrastructure that supports communications between the one or more storage systems and the one or more FPGA-accelerated servers, as well as other hardware and software components. Alternatively, FPGA-accelerated servers may reside within a cloud computing environment that may be used to perform compute-related tasks for AI and ML jobs. Any of the embodiments described above may be used to collectively serve as a FPGA-based AI or ML platform. Readers will appreciate that, in some embodiments of the FPGA-based AI or ML platform, the FPGAs that are contained within the FPGA-accelerated servers may be reconfigured for different types of ML models (e.g., LSTMs, CNNs, GRUs). The ability to reconfigure the FPGAs that are contained within the FPGA-accelerated servers may enable the acceleration of a ML or AI application based on the most optimal numerical precision and memory model being used. Readers will appreciate that by treating the collection of FPGA-accelerated servers as a pool of FPGAs, any CPU in the data center may utilize the pool of FPGAs as a shared hardware microservice, rather than limiting a server to dedicated accelerators plugged into it.

The FPGA-accelerated servers and the GPU-accelerated servers described above may implement a model of computing where, rather than keeping a small amount of data in a CPU and running a long stream of instructions over it as occurred in more traditional computing models, the machine learning model and parameters are pinned into the high-bandwidth on-chip memory with lots of data streaming though the high-bandwidth on-chip memory. FPGAs may even be more efficient than GPUs for this computing model, as the FPGAs can be programmed with only the instructions needed to run this kind of computing model.

The storage systems described above may be configured to provide parallel storage, for example, through the use of a parallel file system such as BeeGFS. Such parallel files systems may include a distributed metadata architecture. For example, the parallel file system may include a plurality of metadata servers across which metadata is distributed, as well as components that include services for clients and storage servers.

The systems described above can support the execution of a wide array of software applications. Such software applications can be deployed in a variety of ways, including container-based deployment models. Containerized applications may be managed using a variety of tools. For example, containerized applications may be managed using Docker Swarm, Kubernetes, and others. Containerized applications may be used to facilitate a serverless, cloud native computing deployment and management model for software applications. In support of a serverless, cloud native computing deployment and management model for software applications, containers may be used as part of an event handling mechanisms (e.g., AWS Lambdas) such that various events cause a containerized application to be spun up to operate as an event handler.

The systems described above may be deployed in a variety of ways, including being deployed in ways that support fifth generation ('5G') networks. 5G networks may support substantially faster data communications than previous generations of mobile communications networks and, as a consequence may lead to the disaggregation of data and computing resources as modern massive data centers may become less prominent and may be replaced, for example, by more-local, micro data centers that are close to the mobile-network towers. The systems described above may be included in such local, micro data centers and may be part of or paired to multi-access edge computing ('MEC') systems. Such MEC systems may enable cloud computing capabilities and an IT service environment at the edge of the cellular network. By running applications and performing related processing tasks closer to the cellular customer, network congestion may be reduced and applications may perform better.

The storage systems described above may also be configured to implement NVMe Zoned Namespaces. Through the use of NVMe Zoned Namespaces, the logical address space of a namespace is divided into zones. Each zone provides a logical block address range that must be written sequentially and explicitly reset before rewriting, thereby enabling the creation of namespaces that expose the natural boundaries of the device and offload management of internal mapping tables to the host. In order to implement NVMe Zoned Name Spaces ('ZNS'), ZNS SSDs or some other form of zoned block devices may be utilized that expose a namespace logical address space using zones. With the zones aligned to the internal physical properties of the device, several inefficiencies in the placement of data can be eliminated. In such embodiments, each zone may be mapped, for example, to a separate application such that functions like wear levelling and garbage collection could be performed on a per-zone or per-application basis rather than across the entire device. In order to support ZNS, the storage controllers described herein may be configured with to interact with zoned block devices through the usage of, for example, the Linux™ kernel zoned block device interface or other tools.

The storage systems described above may also be configured to implement zoned storage in other ways such as, for example, through the usage of shingled magnetic recording (SMR) storage devices. In examples where zoned storage is used, device-managed embodiments may be deployed where the storage devices hide this complexity by managing it in the firmware, presenting an interface like any other storage device. Alternatively, zoned storage may be implemented via a host-managed embodiment that depends on the operating system to know how to handle the drive, and only write sequentially to certain regions of the drive. Zoned storage may similarly be implemented using a host-aware embodiment in which a combination of a drive managed and host managed implementation is deployed.

The storage systems described herein may be used to form a data lake. A data lake may operate as the first place that an organization's data flows to, where such data may be in a raw format. Metadata tagging may be implemented to facilitate searches of data elements in the data lake, especially in embodiments where the data lake contains multiple stores of data, in formats not easily accessible or readable (e.g., unstructured data, semi-structured data, structured data). From the data lake, data may go downstream to a data warehouse where data may be stored in a more processed, packaged, and consumable format. The storage systems described above may also be used to implement such a data warehouse. In addition, a data mart or data hub may allow for data that is even more easily consumed, where the storage systems described above may also be used to provide the underlying storage resources necessary for a data mart or data hub. In embodiments, queries the data lake may require a schema-on-read approach, where data is applied to a plan or schema as it is pulled out of a stored location, rather than as it goes into the stored location.

The storage systems described herein may also be configured implement a recovery point objective ('RPO'), which may be establish by a user, established by an administrator, established as a system default, established as part of a storage class or service that the storage system is participating in the delivery of, or in some other way. A "recovery point objective" is a goal for the maximum time difference between the last update to a source dataset and the last recoverable replicated dataset update that would be correctly recoverable, given a reason to do so, from a continuously or frequently updated copy of the source dataset. An update is correctly recoverable if it properly takes into account all updates that were processed on the source dataset prior to the last recoverable replicated dataset update.

In synchronous replication, the RPO would be zero, meaning that under normal operation, all completed updates on the source dataset should be present and correctly recoverable on the copy dataset. In best effort nearly synchronous replication, the RPO can be as low as a few seconds. In snapshot-based replication, the RPO can be roughly calculated as the interval between snapshots plus the time to transfer the modifications between a previous already transferred snapshot and the most recent to-be-replicated snapshot.

If updates accumulate faster than they are replicated, then an RPO can be missed. If more data to be replicated accumulates between two snapshots, for snapshot-based replication, than can be replicated between taking the snapshot and replicating that snapshot's cumulative updates to the copy, then the RPO can be missed. If, again in snapshot-based replication, data to be replicated accumulates at a faster rate than could be transferred in the time between subsequent snapshots, then replication can start to fall further behind which can extend the miss between the expected recovery point objective and the actual recovery point that is represented by the last correctly replicated update.

The storage systems described above may also be part of a shared nothing storage cluster. In a shared nothing storage cluster, each node of the cluster has local storage and communicates with other nodes in the cluster through networks, where the storage used by the cluster is (in general) provided only by the storage connected to each individual node. A collection of nodes that are synchronously replicating a dataset may be one example of a shared nothing storage cluster, as each storage system has local storage and communicates to other storage systems through a network, where those storage systems do not (in general) use storage from somewhere else that they share access to through some kind of interconnect. In contrast, some of the storage systems described above are themselves built as a shared-storage cluster, since there are drive shelves that are shared by the paired controllers. Other storage systems described above, however, are built as a shared nothing storage cluster, as all storage is local to a particular node (e.g., a blade) and all communication is through networks that link the compute nodes together.

In other embodiments, other forms of a shared nothing storage cluster can include embodiments where any node in the cluster has a local copy of all storage they need, and where data is mirrored through a synchronous style of replication to other nodes in the cluster either to ensure that the data isn't lost or because other nodes are also using that storage. In such an embodiment, if a new cluster node needs some data, that data can be copied to the new node from other nodes that have copies of the data.

In some embodiments, mirror-copy-based shared storage clusters may store multiple copies of all the cluster's stored data, with each subset of data replicated to a particular set of nodes, and different subsets of data replicated to different sets of nodes. In some variations, embodiments may store all of the cluster's stored data in all nodes, whereas in other variations nodes may be divided up such that a first set of nodes will all store the same set of data and a second, different set of nodes will all store a different set of data.

Readers will appreciate that RAFT-based databases (e.g., etcd) may operate like shared-nothing storage clusters where all RAFT nodes store all data. The amount of data stored in a RAFT cluster, however, may be limited so that extra copies don't consume too much storage. A container server cluster might also be able to replicate all data to all cluster nodes, presuming the containers don't tend to be too large and their bulk data (the data manipulated by the applications that run in the containers) is stored elsewhere such as in an S3 cluster or an external file server. In such an example, the container storage may be provided by the cluster directly through its shared-nothing storage model, with those containers providing the images that form the execution environment for parts of an application or service.

Figure 3D:
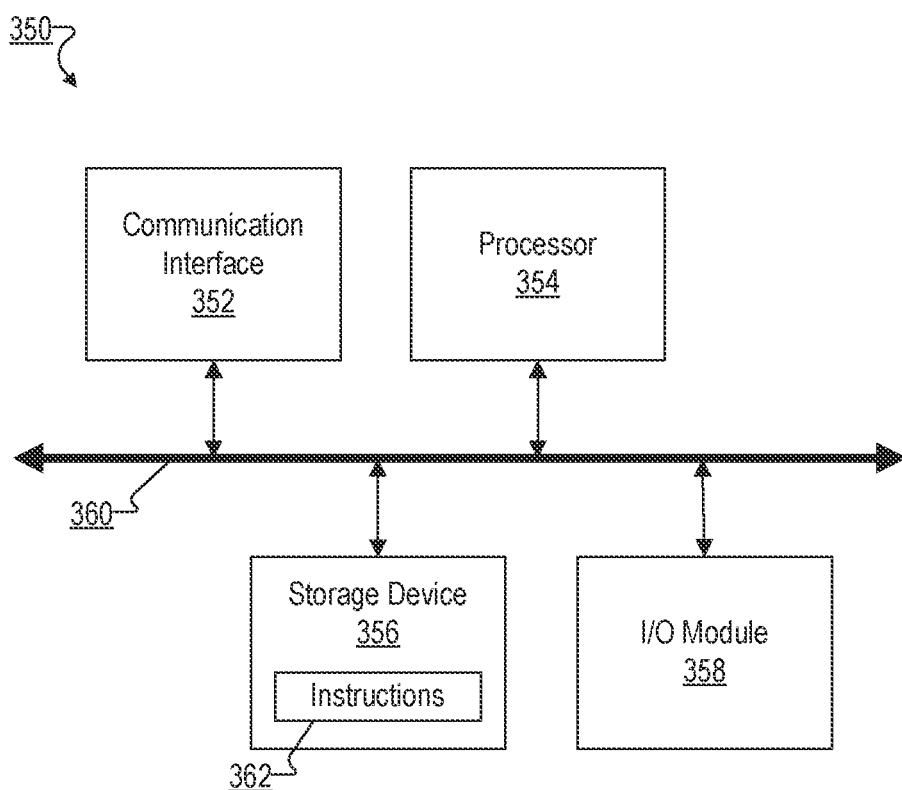
FIG. 3D illustrates an example computing device that may be specifically configured to perform one or more of the processes described herein.

For further explanation, FIG. 3D illustrates an exemplary computing device 350 that may be specifically configured to perform one or more of the processes described herein. As shown in FIG. 3D, computing device 350 may include a communication interface 352, a processor 354, a storage device 356, and an input/output ("I/O") module 358 communicatively connected one to another via a communication infrastructure 360. While an exemplary computing device 350 is shown in FIG. 3D, the components illustrated in FIG. 3D are not intended to be limiting. Additional or alternative components may be used in other embodiments. Components of computing device 350 shown in FIG. 3D will now be described in additional detail.

Communication interface 352 may be configured to communicate with one or more computing devices. Examples of communication interface 352 include, without limitation, a wired network interface (such as a network interface card), a wireless network interface (such as a wireless network interface card), a modem, an audio/video connection, and any other suitable interface.

Processor 354 generally represents any type or form of processing unit capable of processing data and/or interpreting, executing, and/or directing execution of one or more of the instructions, processes, and/or operations described herein. Processor 354 may perform operations by executing computer-executable instructions 362 (e.g., an application, software, code, and/or other executable data instance) stored in storage device 356.

Storage device 356 may include one or more data storage media, devices, or configurations and may employ any type, form, and combination of data storage media and/or device. For example, storage device 356 may include, but is not limited to, any combination of the non-volatile media and/or volatile media described herein. Electronic data, including data described herein, may be temporarily and/or permanently stored in storage device 356. For example, data representative of computer-executable instructions 362 configured to direct processor 354 to perform any of the operations described herein may be stored within storage device 356. In some examples, data may be arranged in one or more databases residing within storage device 356.

I/O module 358 may include one or more I/O modules configured to receive user input and provide user output. I/O module 358 may include any hardware, firmware, software, or combination thereof supportive of input and output capabilities. For example, I/O module 358 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 358 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 358 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 350.

Figure 3E:
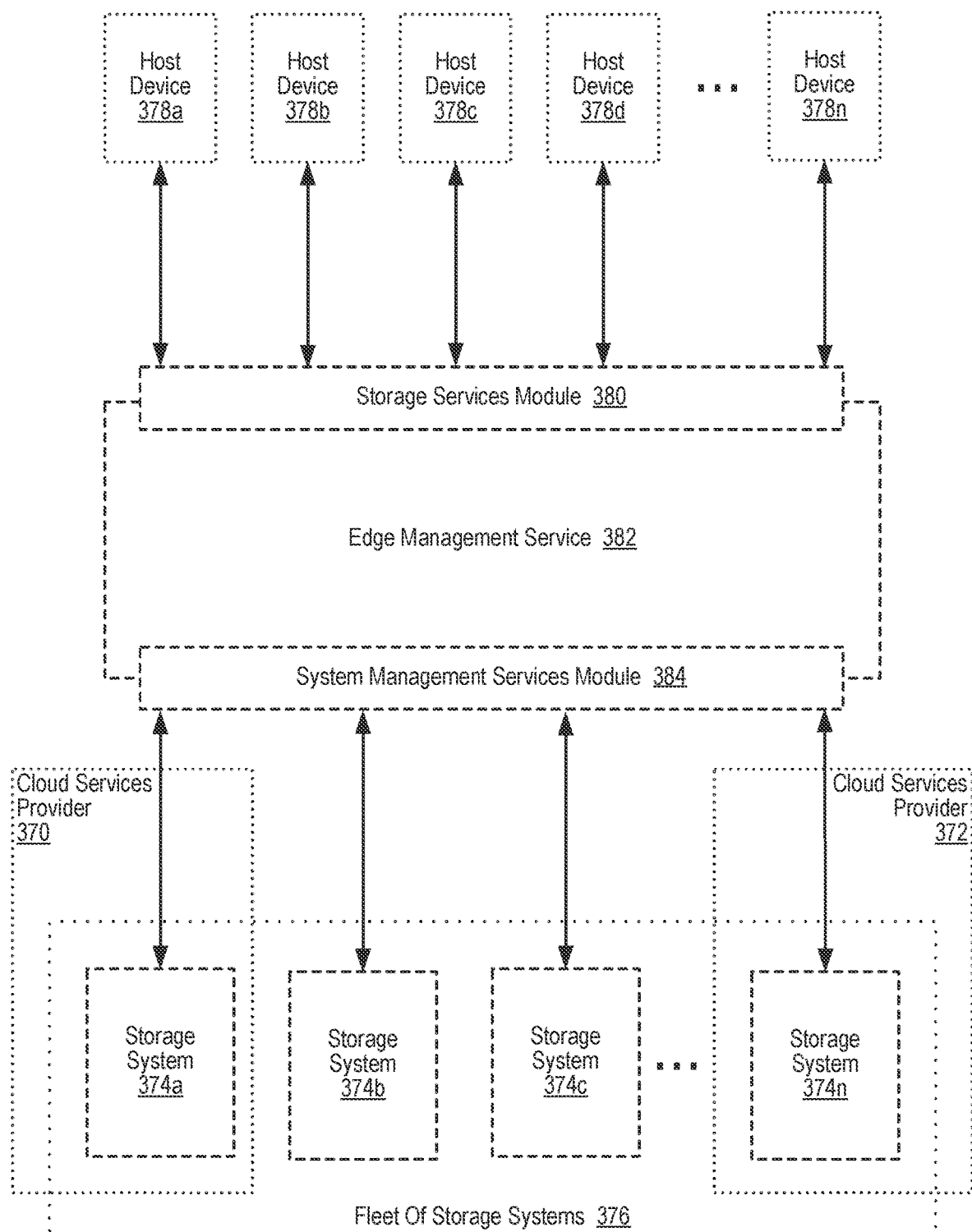
FIG. 3E illustrates an example of a fleet of storage systems for providing storage services in accordance with some embodiments of the present disclosure.

For further explanation, FIG. 3E illustrates an example of a fleet of storage systems 376 for providing storage services (also referred to herein as 'data services'). The fleet of storage systems 376 depicted in FIG. 3E includes a plurality of storage systems 374a, 374b, 374c, through 374n that may each be similar to the storage systems described herein. The storage systems 374a, 374b, 374c, through 374n in the fleet of storage systems 376 may be embodied as identical storage systems or as different types of storage systems. For example, two of the storage systems 374a, 374n depicted in FIG. 3E are depicted as being cloud-based storage systems, as the resources that collectively form each of the storage systems 374a, 374n are provided by distinct cloud services providers 370, 372. For example, the first cloud services provider 370 may be Amazon AWS™ whereas the second cloud services provider 372 is Microsoft Azure™, although in other embodiments one or more public clouds, private clouds, or combinations thereof may be used to provide the underlying resources that are used to form a particular storage system in the fleet of storage systems 376.

The example depicted in FIG. 3E includes an edge management service 366 for delivering storage services in accordance with some embodiments of the present disclosure. The storage services (also referred to herein as 'data services') that are delivered may include, for example, services to provide a certain amount of storage to a consumer, services to provide storage to a consumer in accordance with a predetermined service level agreement, services to provide storage to a consumer in accordance with predetermined regulatory requirements, and many others.

The edge management service 366 depicted in FIG. 3E may be embodied, for example, as one or more modules of computer program instructions executing on computer hardware such as one or more computer processors. Alternatively, the edge management service 366 may be embodied as one or more modules of computer program instructions executing on a virtualized execution environment such as one or more virtual machines, in one or more containers, or in some other way. In other embodiments, the edge management service 366 may be embodied as a combination of the embodiments described above, including embodiments where the one or more modules of computer program instructions that are included in the edge management service 366 are distributed across multiple physical or virtual execution environments.

The edge management service 366 may operate as a gateway for providing storage services to storage consumers, where the storage services leverage storage offered by one or more storage systems 374a, 374b, 374c, through 374n. For example, the edge management service 366 may be configured to provide storage services to host devices 378a, 378b, 378c, 378d, 378n that are executing one or more applications that consume the storage services. In such an example, the edge management service 366 may operate as a gateway between the host devices 378a, 378b, 378c, 378d, 378n and the storage systems 374a, 374b, 374c, through 374n, rather than requiring that the host devices 378a, 378b, 378c, 378d, 378n directly access the storage systems 374a, 374b, 374c, through 374n.

The edge management service 366 of FIG. 3E exposes a storage services module 364 to the host devices 378a, 378b, 378c, 378d, 378n of FIG. 3E, although in other embodiments the edge management service 366 may expose the storage services module 364 to other consumers of the various storage services. The various storage services may be presented to consumers via one or more user interfaces, via one or more APIs, or through some other mechanism provided by the storage services module 364. As such, the storage services module 364 depicted in FIG. 3E may be embodied as one or more modules of computer program instructions executing on physical hardware, on a virtualized execution environment, or combinations thereof, where executing such modules causes enables a consumer of storage services to be offered, select, and access the various storage services.

The edge management service 366 of FIG. 3E also includes a system management services module 368. The system management services module 368 of FIG. 3E includes one or more modules of computer program instructions that, when executed, perform various operations in coordination with the storage systems 374a, 374b, 374c, through 374n to provide storage services to the host devices 378a, 378b, 378c, 378d, 378n. The system management services module 368 may be configured, for example, to perform tasks such as provisioning storage resources from the storage systems 374a, 374b, 374c, through 374n via one or more APIs exposed by the storage systems 374a, 374b, 374c, through 374n, migrating datasets or workloads amongst the storage systems 374a, 374b, 374c, through 374n via one or more APIs exposed by the storage systems 374a, 374b, 374c, through 374n, setting one or more tunable parameters (i.e., one or more configurable settings) on the storage systems 374a, 374b, 374c, through 374n via one or more APIs exposed by the storage systems 374a, 374b, 374c, through 374n, and so on. For example, many of the services described below relate to embodiments where the storage systems 374*a*, 374*b*, 374*c*, through 374*n* are configured to operate in some way. In such examples, the system management services module 368 may be responsible for using APIs (or some other mechanism) provided by the storage systems 374*a*, 374*b*, 374*c*, through 374*n* to configure the storage systems 374*a*, 374*b*, 374*c*, through 374*n* to operate in the ways described below.

In addition to configuring the storage systems 374*a*, 374*b*, 374*c*, through 374*n*, the edge management service 366 itself may be configured to perform various tasks required to provide the various storage services. Consider an example in which the storage service includes a service that, when selected and applied, causes personally identifiable information ('PII') contained in a dataset to be obfuscated when the dataset is accessed. In such an example, the storage systems 374*a*, 374*b*, 374*c*, through 374*n* may be configured to obfuscate PII when servicing read requests directed to the dataset. Alternatively, the storage systems 374*a*, 374*b*, 374*c*, through 374*n* may service reads by returning data that includes the PII, but the edge management service 366 itself may obfuscate the PII as the data is passed through the edge management service 366 on its way from the storage systems 374*a*, 374*b*, 374*c*, through 374*n* to the host devices 378*a*, 378*b*, 378*c*, 378*d*, 378*n*.

The storage systems 374*a*, 374*b*, 374*c*, through 374*n* depicted in FIG. 3E may be embodied as one or more of the storage systems described above with reference to FIGS. 1A-3D, including variations thereof. In fact, the storage systems 374*a*, 374*b*, 374*c*, through 374*n* may serve as a pool of storage resources where the individual components in that pool have different performance characteristics, different storage characteristics, and so on. For example, one of the storage systems 374*a* may be a cloud-based storage system, another storage system 374*b* may be a storage system that provides block storage, another storage system 374*c* may be a storage system that provides file storage, another storage system 374*d* may be a relatively high-performance storage system while another storage system 374*n* may be a relatively low-performance storage system, and so on. In alternative embodiments, only a single storage system may be present.

The storage systems 374*a*, 374*b*, 374*c*, through 374*n* depicted in FIG. 3E may also be organized into different failure domains so that the failure of one storage system 374*a* should be totally unrelated to the failure of another storage system 374*b*. For example, each of the storage systems may receive power from independent power systems, each of the storage systems may be coupled for data communications over independent data communications networks, and so on. Furthermore, the storage systems in a first failure domain may be accessed via a first gateway whereas storage systems in a second failure domain may be accessed via a second gateway. For example, the first gateway may be a first instance of the edge management service 366 and the second gateway may be a second instance of the edge management service 366, including embodiments where each instance is distinct, or each instance is part of a distributed edge management service 366.

As an illustrative example of available storage services, storage services may be presented to a user that are associated with different levels of data protection. For example, storage services may be presented to the user that, when selected and enforced, guarantee the user that data associated with that user will be protected such that various recovery point objectives ('RPO') can be guaranteed. A first available storage service may ensure, for example, that some dataset associated with the user will be protected such that any data that is more than 5 seconds old can be recovered in the event of a failure of the primary data store whereas a second available storage service may ensure that the dataset that is associated with the user will be protected such that any data that is more than 5 minutes old can be recovered in the event of a failure of the primary data store.

An additional example of storage services that may be presented to a user, selected by a user, and ultimately applied to a dataset associated with the user can include one or more data compliance services. Such data compliance services may be embodied, for example, as services that may be provided to consumers (i.e., a user) the data compliance services to ensure that the user's datasets are managed in a way to adhere to various regulatory requirements. For example, one or more data compliance services may be offered to a user to ensure that the user's datasets are managed in a way so as to adhere to the General Data Protection Regulation ('GDPR'), one or data compliance services may be offered to a user to ensure that the user's datasets are managed in a way so as to adhere to the Sarbanes-Oxley Act of 2002 ('SOX'), or one or more data compliance services may be offered to a user to ensure that the user's datasets are managed in a way so as to adhere to some other regulatory act. In addition, the one or more data compliance services may be offered to a user to ensure that the user's datasets are managed in a way so as to adhere to some non-governmental guidance (e.g., to adhere to best practices for auditing purposes), the one or more data compliance services may be offered to a user to ensure that the user's datasets are managed in a way so as to adhere to a particular clients or organizations requirements, and so on.

In order to provide this particular data compliance service, the data compliance service may be presented to a user (e.g., via a GUI) and selected by the user. In response to receiving the selection of the particular data compliance service, one or more storage services policies may be applied to a dataset associated with the user to carry out the particular data compliance service. For example, a storage services policy may be applied requiring that the dataset be encrypted prior to be stored in a storage system, prior to being stored in a cloud environment, or prior to being stored elsewhere. In order to enforce this policy, a requirement may be enforced not only requiring that the dataset be encrypted when stored, but a requirement may be put in place requiring that the dataset be encrypted prior to transmitting the dataset (e.g., sending the dataset to another party). In such an example, a storage services policy may also be put in place requiring that any encryption keys used to encrypt the dataset are not stored on the same system that stores the dataset itself. Readers will appreciate that many other forms of data compliance services may be offered and implemented in accordance with embodiments of the present disclosure.

The storage systems 374*a*, 374*b*, 374*c*, through 374*n* in the fleet of storage systems 376 may be managed collectively, for example, by one or more fleet management modules. The fleet management modules may be part of or separate from the system management services module 368 depicted in FIG. 3E. The fleet management modules may perform tasks such as monitoring the health of each storage system in the fleet, initiating updates or upgrades on one or more storage systems in the fleet, migrating workloads for loading balancing or other performance purposes, and many other tasks. As such, and for many other reasons, the storage systems 374*a*, 374*b*, 374*c*, through 374*n* may be coupled to each other via one or more data communications links in order to exchange data between the storage systems 374a, 374b, 374c, through 374n.

The storage systems described herein may support various forms of data replication. For example, two or more of the storage systems may synchronously replicate a dataset between each other. In synchronous replication, distinct copies of a particular dataset may be maintained by multiple storage systems, but all accesses (e.g., a read) of the dataset should yield consistent results regardless of which storage system the access was directed to. For example, a read directed to any of the storage systems that are synchronously replicating the dataset should return identical results. As such, while updates to the version of the dataset need not occur at exactly the same time, precautions must be taken to ensure consistent accesses to the dataset. For example, if an update (e.g., a write) that is directed to the dataset is received by a first storage system, the update may only be acknowledged as being completed if all storage systems that are synchronously replicating the dataset have applied the update to their copies of the dataset. In such an example, synchronous replication may be carried out through the use of I/O forwarding (e.g., a write received at a first storage system is forwarded to a second storage system), communications between the storage systems (e.g., each storage system indicating that it has completed the update), or in other ways.

In other embodiments, a dataset may be replicated through the use of checkpoints. In checkpoint-based replication (also referred to as 'nearly synchronous replication'), a set of updates to a dataset (e.g., one or more write operations directed to the dataset) may occur between different checkpoints, such that a dataset has been updated to a specific checkpoint only if all updates to the dataset prior to the specific checkpoint have been completed. Consider an example in which a first storage system stores a live copy of a dataset that is being accessed by users of the dataset. In this example, assume that the dataset is being replicated from the first storage system to a second storage system using checkpoint-based replication. For example, the first storage system may send a first checkpoint (at time t=0) to the second storage system, followed by a first set of updates to the dataset, followed by a second checkpoint (at time t=1), followed by a second set of updates to the dataset, followed by a third checkpoint (at time t=2). In such an example, if the second storage system has performed all updates in the first set of updates but has not yet performed all updates in the second set of updates, the copy of the dataset that is stored on the second storage system may be up-to-date until the second checkpoint. Alternatively, if the second storage system has performed all updates in both the first set of updates and the second set of updates, the copy of the dataset that is stored on the second storage system may be up-to-date until the third checkpoint. Readers will appreciate that various types of checkpoints may be used (e.g., metadata only checkpoints), checkpoints may be spread out based on a variety of factors (e.g., time, number of operations, an RPO setting), and so on.

In other embodiments, a dataset may be replicated through snapshot-based replication (also referred to as 'asynchronous replication'). In snapshot-based replication, snapshots of a dataset may be sent from a replication source such as a first storage system to a replication target such as a second storage system. In such an embodiment, each snapshot may include the entire dataset or a subset of the dataset such as, for example, only the portions of the dataset that have changed since the last snapshot was sent from the replication source to the replication target. Readers will appreciate that snapshots may be sent on-demand, based on a policy that takes a variety of factors into consideration (e.g., time, number of operations, an RPO setting), or in some other way.

The storage systems described above may, either alone or in combination, by configured to serve as a continuous data protection store. A continuous data protection store is a feature of a storage system that records updates to a dataset in such a way that consistent images of prior contents of the dataset can be accessed with a low time granularity (often on the order of seconds, or even less), and stretching back for a reasonable period of time (often hours or days). These allow access to very recent consistent points in time for the dataset, and also allow access to access to points in time for a dataset that might have just preceded some event that, for example, caused parts of the dataset to be corrupted or otherwise lost, while retaining close to the maximum number of updates that preceded that event. Conceptually, they are like a sequence of snapshots of a dataset taken very frequently and kept for a long period of time, though continuous data protection stores are often implemented quite differently from snapshots. A storage system implementing a data continuous data protection store may further provide a means of accessing these points in time, accessing one or more of these points in time as snapshots or as cloned copies, or reverting the dataset back to one of those recorded points in time.

Over time, to reduce overhead, some points in the time held in a continuous data protection store can be merged with other nearby points in time, essentially deleting some of these points in time from the store. This can reduce the capacity needed to store updates. It may also be possible to convert a limited number of these points in time into longer duration snapshots. For example, such a store might keep a low granularity sequence of points in time stretching back a few hours from the present, with some points in time merged or deleted to reduce overhead for up to an additional day. Stretching back in the past further than that, some of these points in time could be converted to snapshots representing consistent point-in-time images from only every few hours.

Although some embodiments are described largely in the context of a storage system, readers of skill in the art will recognize that embodiments of the present disclosure may also take the form of a computer program product disposed upon computer readable storage media for use with any suitable processing system. Such computer readable storage media may be any storage medium for machine-readable information, including magnetic media, optical media, solid-state media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps described herein as embodied in a computer program product. Persons skilled in the art will recognize also that, although some of the embodiments described in this specification are oriented to software installed and executing on computer hardware, nevertheless, alternative embodiments implemented as firmware or as hardware are well within the scope of the present disclosure.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g., a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

One or more embodiments may be described herein with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

While particular combinations of various functions and features of the one or more embodiments are expressly described herein, other combinations of these features and functions are likewise possible. The present disclosure is not limited by the particular examples disclosed herein and expressly incorporates these other combinations.

In some embodiments, one or more storage systems or one or more elements of storage systems (e.g., features, services, operations, components, etc. of storage systems), such as any of the illustrative storage systems or storage system elements described herein, may be implemented in one or more container systems. A container system may include any system that supports execution of one or more containerized applications. A containerized application may include a software application and an entire runtime environment of the software application bundled into a single image. For example, the containerized application may include source code of the software application and various dependencies, libraries, and/or other components used by the software application to operate. As a result, the containerized application may be abstracted away from a host operating system as a lightweight and portable package, where the containerized application may be uniformly deployed and consistently executed on different computing environments that use different operating systems or different infrastructures. In some embodiments, a containerized application shares a kernel with a host computer system and executes as an isolated user space within an operating system of the host computer system. When executed, a containerized application may provide one or more containerized workloads and/or services.

The container system may include and/or utilize a cluster of nodes. For example, the container system may be configured to manage deployment and execution of containerized applications on one or more nodes in a cluster. The containerized applications may utilize resources of the nodes, such as processing and/or storage resources provided and/or accessed by the nodes. The storage resources may include any of the illustrative storage resources described herein and may include on-node resources (i.e., storage resources that are locally accessible at the node), off-node resources (i.e., storage resources that are not locally accessible at the node but, for example, may be locally accessible at other nodes), or both on-node and off-node resources.

In some embodiments, the container system may include a container orchestration system (which may also be referred to as a container orchestrator, a container orchestration platform, etc.) configured to automatically deploy, scale, and manage containerized applications. In some embodiments, the container system may include a storage management system configured to provision and manage storage resources (e.g., virtual volumes) for use by cluster nodes and/or containerized applications. The storage management system (also referred to as a container storage system) may be implemented, for instance, as a containerized application (e.g., a privileged containerized application that is endowed with privileges not afforded to other containerized applications so as to allow the container storage system to carry out storage-related tasks in kernel space of the node), as a non-containerized application executing on the node, or in any other suitable form.

In certain embodiments, a controller for containerized application deployment across clusters is provided. As described herein, as part of deploying a containerized application, a controller may select a cluster from among multiple clusters such as dozens or hundreds of clusters that may be geographically distributed (e.g., around the world, including across fault zones, geographic regions, countries, or municipalities). In some implementations, individual clusters may be provided by distinct cloud service providers.

The controller may be configured to deploy a containerized application to a given cluster based on the given cluster satisfying resource specifications for the containerized application and based on the given cluster satisfying one or more deployment policies. The controller may also redeploy a containerized application after a deployment based on a cluster on which the containerized application is currently deployed no longer satisfying one or more resource specifications or no longer satisfying at least one policy within one or more deployment policies. In some implementations, the controller may redeploy a containerized application even if the cluster on which the containerized application is currently deployed is satisfying all resource specifications and satisfying all deployment policies. For example, the controller may redeploy the containerized application based on an analysis (e.g., a cost analysis) of continuing to execute the containerized application on a current cluster in comparison to some other available cluster. Illustrative examples of resource specifications for the containerized application and deployment policies, as well as the use of the resource specifications and deployment polices by the controller to selectively deploy and/or redeploy the containerized application to a cluster selected from multiple clusters are described in detail herein.

Figure 4A:
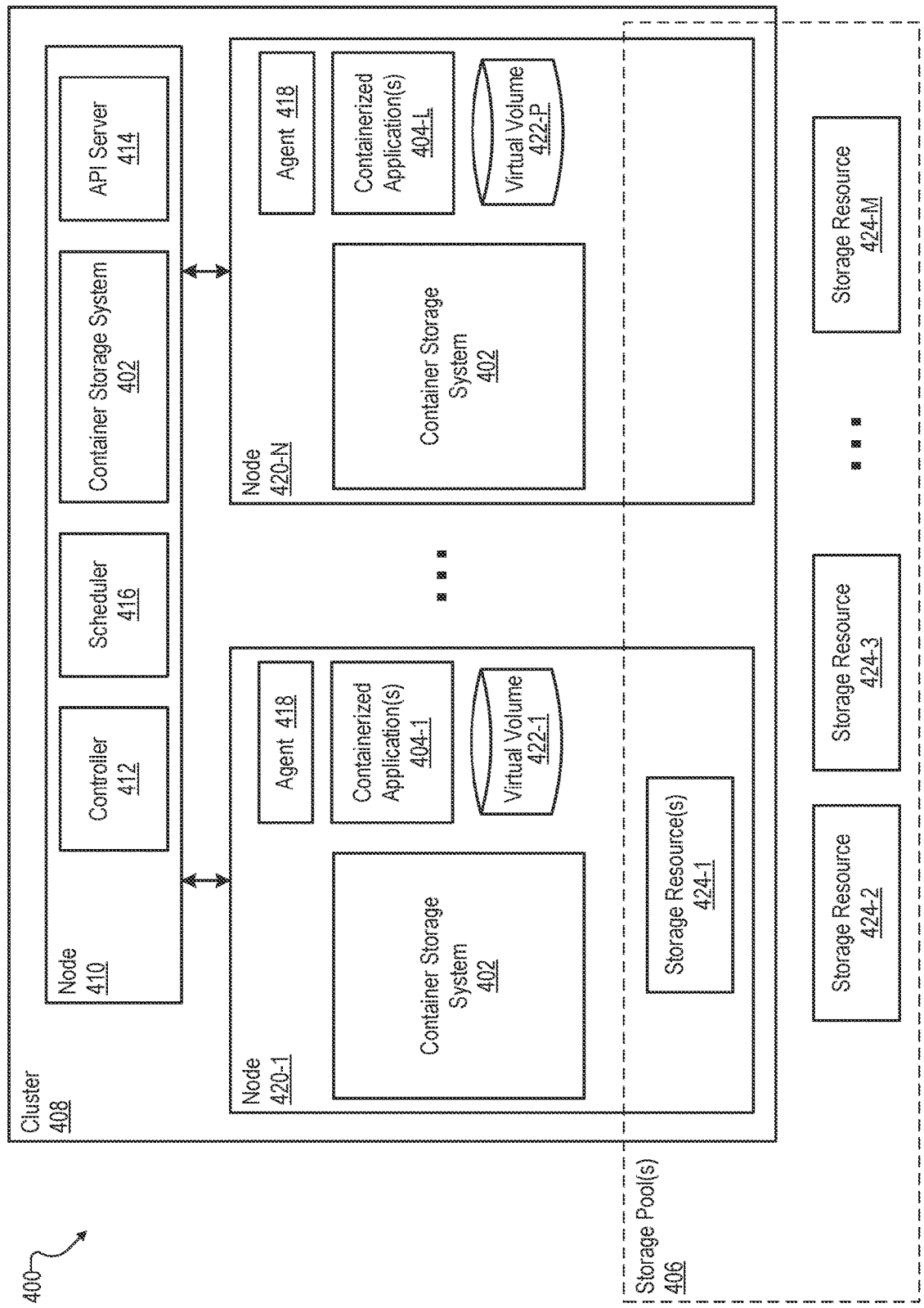
FIG. 4A illustrates an example container storage system in accordance with some embodiments of the present disclosure.
Figure 4B:
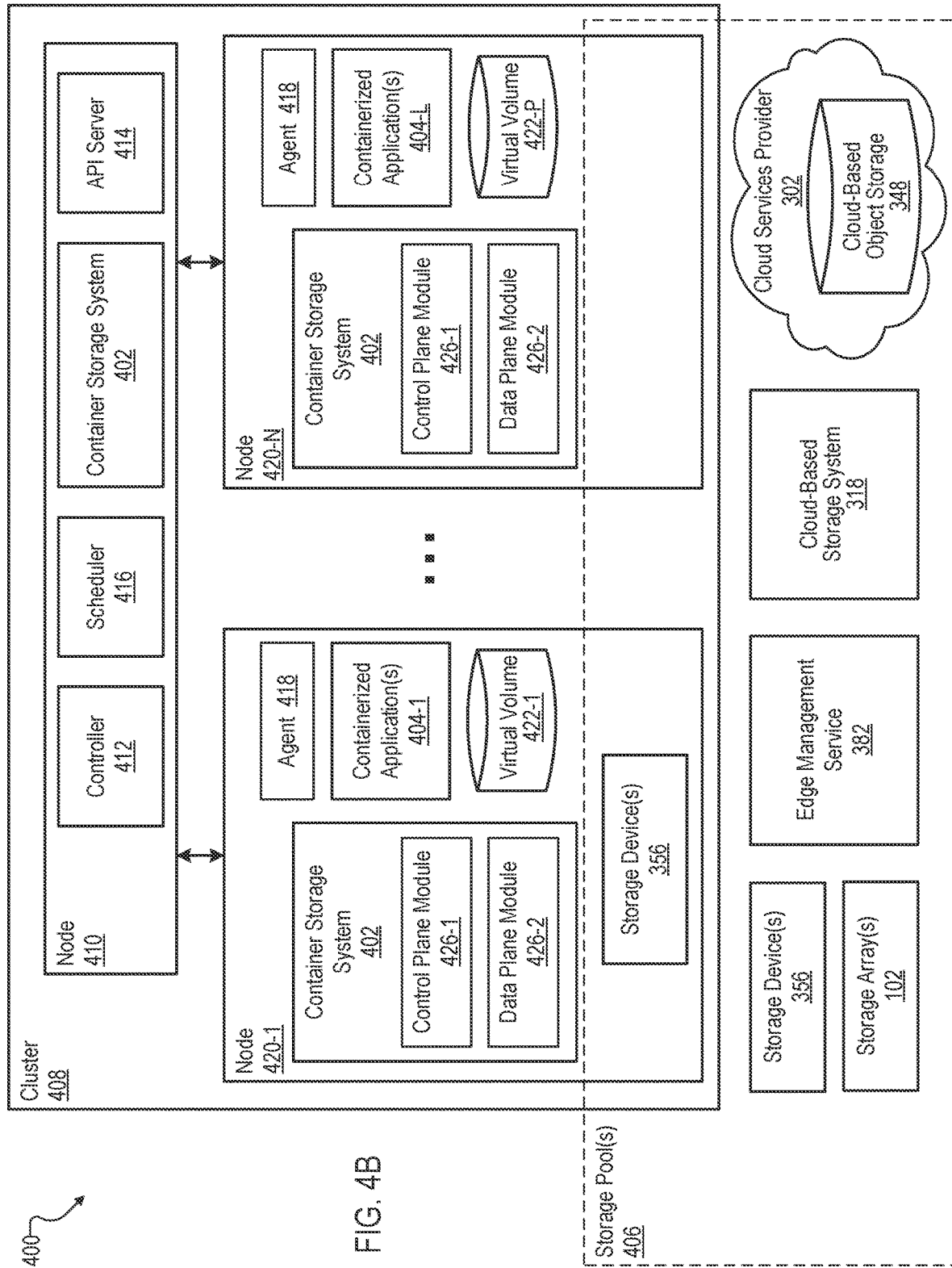
FIG. 4B illustrates another example container storage system in accordance with some embodiments of the present disclosure.

FIGS. 4A and 4B illustrate an example container system 400. In some embodiments, a controller configured to selectively deploy containerized applications to available clusters may be implemented in the container system 400 (e.g., on one or more nodes of a cluster of the container system 400). In other embodiments, such a controller may be implemented external to the container system 400, or at least external to a cluster of the container system 400, and may be configured to selectively deploy containerized applications across clusters of the container system 400. In certain embodiments, the container system 400 may include a container storage system 402 configured to perform one or more operations to provide storage to one or more containerized applications 404-1 through 404-L of the container system 400, as described herein.

The container system 400 may include or be implemented by one or more container orchestration systems, including Kubernetes™, Mesos™, Docker Swarm™, among others. The container orchestration system may manage the container system 400 running on a cluster 408 through services implemented by a control node, depicted as 410.

A control plane of the container system 400 may implement services that include: deploying applications via a controller 412, monitoring applications via the controller 412, providing an interface via an API server 414, and scheduling deployments via scheduler 416. In some examples, controller 412, scheduler 416, API server 414, and container storage system 402 are implemented by a single node, node 410. In other examples, for resiliency, the control plane may be implemented by multiple, redundant nodes, where if a node that is providing management services for the container system 400 fails, then another, redundant node may provide management services for the cluster 408.

A data plane of the container system 400 may include a set of nodes that provides container runtimes for executing containerized applications. An individual node within the cluster 408 may execute a container runtime, such as Docker™, and execute a container manager, or node agent, such as a kubelet in Kubernetes (not depicted) that communicates with the control plane via a network proxy, such as an agent 418. The agent 418 may route network traffic to and from containers using, for example, Internet Protocol (IP) port numbers. For example, a containerized application may request a storage class from the control plane, where the request is handled by the container manager, and the container manager communicates the request to the control plane using the agent 418.

Cluster 408 may include a set of nodes that run containerized applications. A node may be a virtual or physical machine. A virtual machine is an emulation of a computer system, including a kernel, operating system, and namespace, where the emulated computer system may be managed by a virtual machine manager that executes on a host computer system. A virtual machine may be implemented by a compute instance within a cloud-based computing environment or by a physical machine. A process or application executing within a virtual machine does not communicate directly with a host computer system or host kernel, rather a process within a virtual machine communicates with the kernel and operating system of the emulated computer system, and kernel and operating system operations of the emulated computer system are handled by the virtual machine manager, which communicates with a host computer system. By contrast, a containerized application may share a kernel with a host computer system and may execute as an isolated user space within an operating system of a host system. A host system may be a node.

The container storage system 402 may orchestrate storage resources to provide storage to the container system 400. For example, the container storage system 402 may provide persistent storage to the containerized applications 404 using the storage pool 406. The container storage system 402 may be deployed as a containerized application by a container orchestration system. For example, the container storage system 402 application may be deployed within cluster 408 and perform management functions for providing storage to the containerized applications 404. Management functions may include determining one or more storage pools from available storage resources, provisioning virtual volumes on one or more nodes, replicating data, and/or handling storage operations. The storage pool 406 may include storage resources from one or more local or remote sources, where the storage resources may be different types of storage.

The container storage system 402 may also be deployed on a set of nodes for which persistent storage may be provided by the container orchestration system. In some examples, the container storage system 402 may be deployed on all nodes in a cluster 408 using, for example, a DaemonSet. In this example, nodes 420-1 through 420-N provide a container runtime where container storage system 402 executes. In other examples, some, but not all nodes in a cluster may execute the container storage system 402.

The container storage system 402 may handle storage on a node and communicate with the control plane of container system 400, to provide dynamic volumes, including persistent volumes. A persistent volume may be mounted on a node as a virtual volume, such as virtual volumes 422-1 and 422-P. After a virtual volume 422 is mounted, containerized applications may request and use storage provided by the virtual volume 422. In some implementations, the container storage system 402 may install a driver on a kernel of a node, where the driver handles storage operations directed to the virtual volume. The driver may receive a storage operation directed to a virtual volume, and in response, the driver may perform the storage operation on one or more storage resources within the storage pool 406.

The container storage system 402 may, in response to being deployed, determine available storage resources. For example, storage resources 424-1 through 424-M may include local storage, remote storage, or both local and remote storage. The storage resources 424-1 through 424-M may include any type(s) and/or configuration(s) of storage resources (e.g., any of the illustrative storage resources described above), and the container storage system 402 may be configured to determine the available storage resources in any suitable way, including based on a configuration file. For example, a configuration file may specify account and authentication information for cloud-based object storage 348 or for a cloud-based storage system 318. The container storage system 402 may also determine availability of one or more storage devices 356 or one or more storage arrays 102. An aggregate amount of storage from one or more of storage device(s) 356, storage array(s) 102, cloud-based storage system(s) 318, edge management services 382, cloud-based object storage 348, or any other storage resources, or any combination or sub-combination of such storage resources may be used to provide the storage pool 406. The storage pool 406 is used to provision storage for the one or more virtual volumes 422 mounted on one or more of the nodes 420 within cluster 408.

In some implementations, the container storage system 402 may create multiple storage pools. For example, the container storage system 402 may aggregate storage resources of a same type into an individual storage pool. In this example, a storage type may be one of: a storage device 356, a storage array 102, a cloud-based storage system 318, storage via an edge management service 366, or a cloud-based object storage 348.

The container storage system 402 may execute within the cluster 408, where instances of the container storage system 402 may operate on different nodes within the cluster 408. In some examples, the container storage system 402 may operate with the container orchestration system of the container system 400 to handle storage operations, mount virtual volumes to provide storage to a node, aggregate available storage into a storage pool 406, provision storage for a virtual volume from a storage pool 406, generate backup data, among other storage system operations. In some examples, the container storage system 402 may provide storage services across multiple clusters operating in distinct computing environments. For example, other storage system operations may include storage system operations described above with respect to FIGS. 1-3. Persistent storage provided by the container storage system 402 may be used to implement stateful and/or resilient containerized applications.

FIG. 4B illustrates an example configuration of the container system 400 in which the container storage system 402 may include modules 426 that provide control plane and data plane services for storage operations provided by the container storage system 402. The control plane module 426-1 and the data plane module 426-2 may communicate over the cluster 408 using various communication protocols, such as gRPC, HTTP, among others.

In some implementations, the control plane module 426-1 may handle one or more of: clustering, provisioning, or scheduling interactions with the container system 400. For example, various ones of the nodes 420 may be organized into clusters, where an individual cluster may share one or more storage pools. The control plane module 426-1 may store membership information of nodes, and configuration for one or more volumes of a storage pool, where the membership and configuration information may be stored in a database, such as a key-value database.

The control plane module 426-1 may receive metrics from each node to use to determine scheduling of storage operations. In some implementations, the metrics may include one or more of: node health information, I/O loads, CPU loads, memory loads, among others. The control plane module 426-1 may determine provisioning of storage and data placement within a storage pool based on one or more of: numbers of replicas specified by a configuration setting, storage pool categories or types, specified storage pools, or topology constraints.

The data plane module 426-2 may handle storage operations and communication with storage resources(s) 424. For example, the data plane module 426-2 may include an I/O queue, a write-through cache, a timestamp log of storage operations, an I/O dispatcher, device queues, and logic for replicating stored data.

In the configuration of the container system 400 shown in FIG. 4B, examples of storage resources 424 that may be included in the storage pool 406 are illustrated. For example, storage pool 406 may include one or more storage resources 424 (e.g., storage resources 424-1 through 424-M) that comprise the storage pool 406. The storage resources 424 may include one or more of local and/or remote storage devices such as storage device(s) 356, storage device(s) 256, storage array(s) 102, cloud-based object storage 348, and/or edge management service 366. Such storage devices may include one or more of: solid-state non-volatile memory, non-mechanical storage device(s) such as solid-state non-volatile memory, mechanical storage devices such as hard-disk drives, and/or any other devices that provide resources for data storage. The one or more storage arrays 102 may be implemented as described with reference to FIG. 1. Cloud-based object storage 348 may be implemented as described with respect to FIGS. 3A-3C. An edge management service 366 may provide storage services as described with respect to FIG. 3E.

The cluster 408 shown in FIGS. 4A-4B illustrates an example of a cluster that may be included in a plurality of clusters. Other clusters in the plurality of clusters may be the same as, similar to, or different from the cluster 408. The plurality of clusters may include any grouping of clusters, which grouping may not include the illustrative cluster 408 or may include any number of the illustrative cluster 408. The clusters in the grouping may be geographically distributed in any manner, including across fault zones, geographic regions, countries, or municipalities.

Figure 4C:
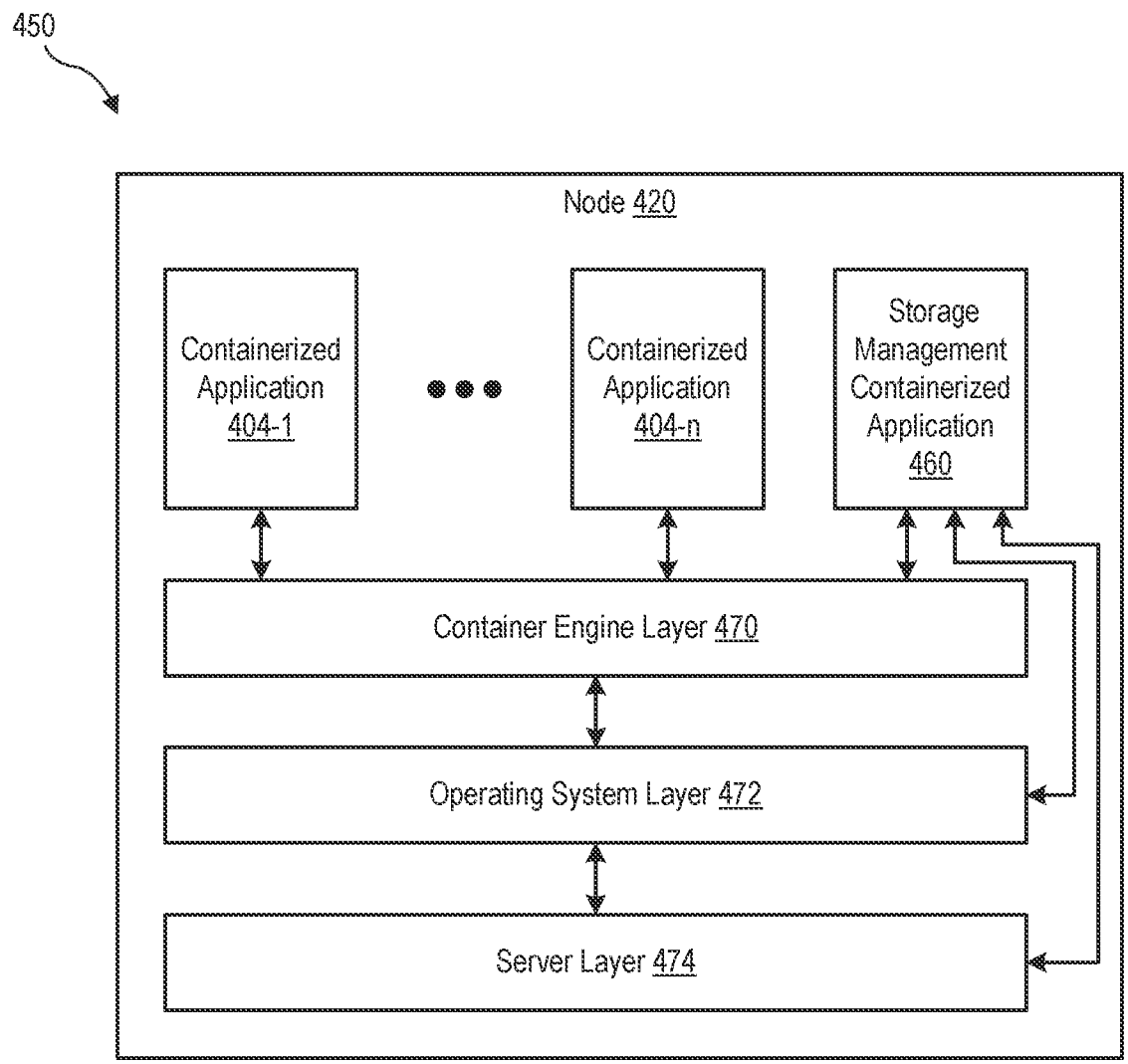
FIG. 4C illustrates an example node in a container storage system in accordance with some embodiments of the present disclosure.

FIG. 4C depicts a diagram 450 illustrating an example structure model of a node 420 within cluster 408. In some embodiments, node 420 may include one or more infrastructure layers. For example, node 420 may include a container engine layer 470, an operating system (OS) layer 472, and a server layer 474 as depicted in FIG. 4C. As illustrated in FIG. 4C, node 420 may also include one or more containerized applications 404-1 . . . 404-*n* (commonly referred to herein as containerized applications 404) and a storage management containerized application 460 that are implemented using the infrastructure layers. In some embodiments, node 420 may be a computing machine (e.g., a physical machine or a virtual machine) and may be implemented on one or more computing devices (e.g., one or more physical servers).

Container engine layer 470 may provide a standardized interface for implementing containerized applications 404. For example, container engine layer 470 may abstract various tasks related to data storage, networking, resource management, and/or other operations from the operating system and provide a set of APIs to perform these tasks. Container engine layer 470 may be implemented in any suitable way, including as an OS virtualization layer, a virtualization layer, or a hypervisor configured to provide an interface for implementing containerized applications 404.

OS layer 472 may provide a standardized interface for container engine layer 470 to interact with server layer 474. The standardized interface for communicating with server layer 474 may be based on the OS (e.g., Linux, Microsoft Windows, etc.) of the physical machine or the virtual machine implementing node 420. In some embodiments, OS layer 472 may also perform other OS-related functionalities.

Server layer 474 may manage various hardware components (memory, storage devices 356, storage arrays 102, communication unit, etc.) of one or more physical computing devices on which node 420 resides. Server layer 474 may also provide a standardized interface for OS layer 472 to interact with these hardware components.

In some embodiments, the separation of the computing environment of node 420 into multiple infrastructure layers (e.g., container engine layer 470, OS layer 472, server layer 474, etc.) may facilitate the configuration of such computing environment and also facilitate the interactions of containerized applications 404 with the computing environment at different levels in the structure model of node 420. Accordingly, containerized applications 404 may be flexibly deployed and executed on different nodes 420 even if these nodes 420 have different OS and/or different hardware infrastructure.

As depicted in FIG. 4C, node 420 may operate one or more containerized applications 404 corresponding to one or more software applications. In some embodiments, containerized application 404 may be granted a limited permission that allows containerized application 404 to directly communicate only with container engine layer 470 using a standardized interface provided by container engine layer 470. Container engine layer 470 may then relay such communication to OS layer 472 and/or to other containerized applications 404.

As depicted in FIG. 4C, node 420 may also include storage management containerized application 460. In some embodiments, storage management containerized application 460 may be a specialized containerized application configured to perform one or more operations of container storage system 402 that manages a storage system of cluster 408 in which node 420 participates. The storage system of cluster 408 may include storage resources of storage pool 406 contributed by one or more nodes 420. In some embodiments, while containerized applications 404 may be allowed to communicate only with container engine layer 470 as described above, storage management containerized application 460 may be allowed to communicate with container engine layer 470, OS layer 472, server layer 474, and/or the hardware components of the one or more physical computing devices on which node 420 resides. With such privileged permission, storage management containerized application 460 may be able to interact with various infrastructure layers at different levels to efficiently manage operations on the storage system of cluster 408.

As an example, a containerized application 404 on node 420 may initiate a write request to write a data item on a virtual volume 422 in the storage system of cluster 408. Containerized application 404 may transmit the write request to container engine layer 470 using the standardized interface provided by container engine layer 470, and container engine layer 470 may forward the write request to storage management containerized application 460. Based on the write request, storage management containerized application 460 may interact with one or more storage devices (e.g., storage devices 356) of node 420 that correspond to the virtual volume 422 and/or interact with other nodes 420 that have their storage devices (e.g., storage devices 356) corresponding to the virtual volume to execute the write request.

In some embodiments, storage management containerized application 460 may operate as an agent that monitors one or more containerized applications 404 implemented on node 420. To monitor a containerized application 404, storage management containerized application 460 may communicate with the infrastructure layers of node 420 and collect various information associated with containerized application 404 from different infrastructure layers at different levels. For example, storage management containerized application 460 may obtain operation metadata describing one or more operations of containerized application 404 from container engine layer 470 at the container level, from OS layer 472 at the OS level, from server layer 474 at the hardware level, etc. Thus, due to its privileged permission, storage management containerized application 460 may obtain comprehensive information about the operations of containerized application 404 at different levels in the structure model of node 420, even though storage management containerized application 460 may be configured to operate at the storage level to manage the storage system of cluster 408. In some embodiments, storage management containerized application 460 may be considered an agent associated with the storage system of cluster 408 and may be referred to as a storage management agent or a storage agent of cluster 408. While storage management containerized application 460 is an example embodiment of the agent associated with the storage system of cluster 408, other implementations of the agent associated with the storage system of cluster 408 are also possible and contemplated.

Figure 5A:
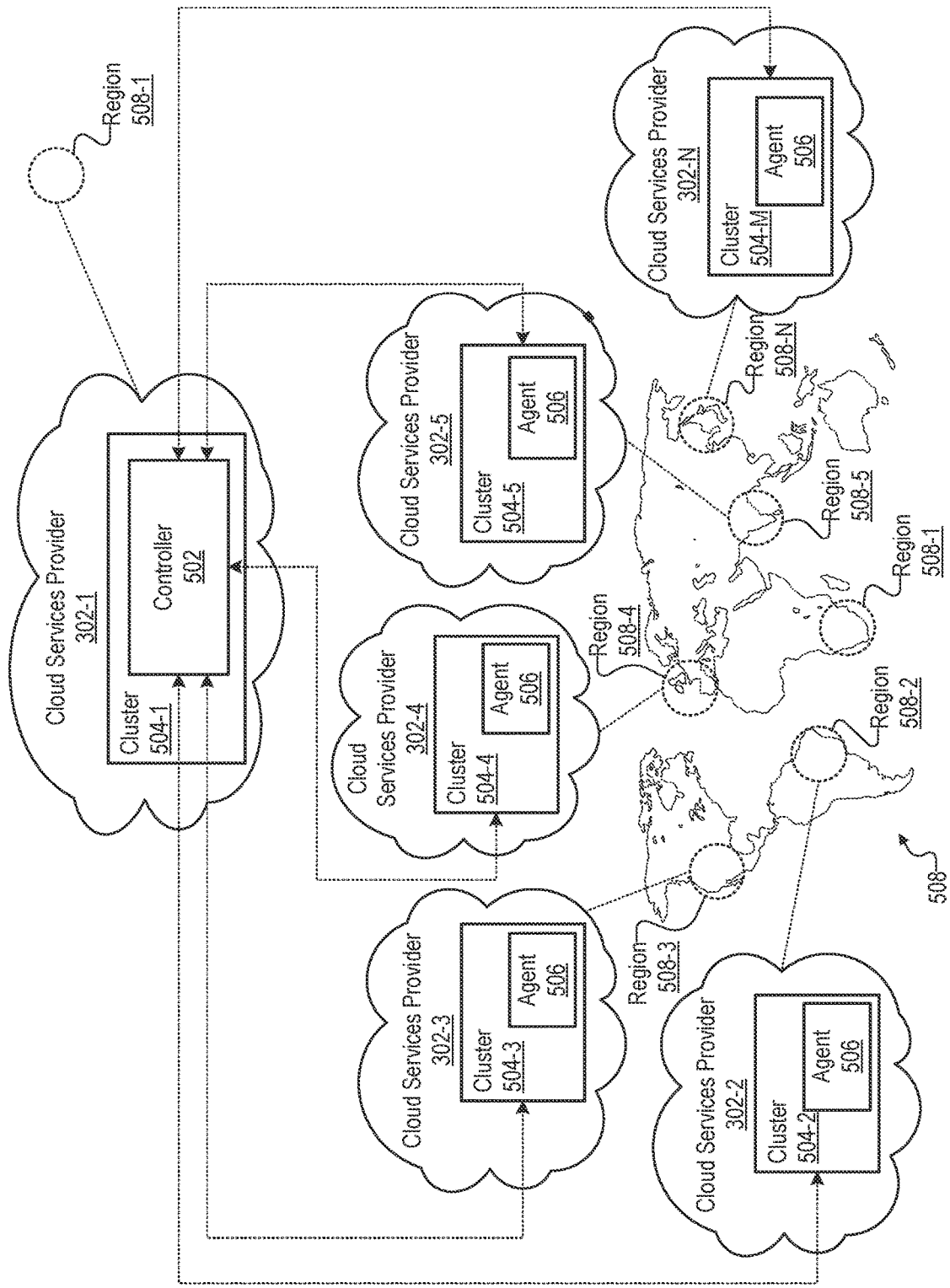
FIG. 5A illustrates an example controller configured to deploy a containerized application to one or more clusters among a plurality of clusters, in accordance with some embodiments of the present disclosure.

FIG. 5A illustrates a controller 502 configured to selectively deploy containerized applications across a plurality of clusters, such as by selectively deploying a containerized application to one or more clusters among the plurality of clusters, in accordance with some embodiments.

The controller 502 may operate within any suitable computing environment that is connected over one or more computer networks to the plurality of clusters. The computing environment may be within one or more of the clusters included in the plurality of clusters or may be external to the plurality of clusters. In this example, the computing environment is a cluster 504-1 provided by a cloud services provider 302-1. The controller 502 may be implemented as a containerized application, such as a containerized application instantiated and running on one or more nodes of the cluster 504-1. In other examples, the computing environment of the controller 502 may be a data center, one or more on-premises computing devices or servers, a mobile device, one or more other clusters in the plurality of clusters, among other computing environments. In such other computing environments, the controller 502 may be implemented as a containerized application, a traditional application, a distributed application, or in any other suitable way.

In certain implementations, the controller 502 may operate as part of a control plane that is at an abstraction layer independent from the respective individual control planes of the clusters onto which a containerized application may be deployed or redeployed. In some embodiments, individual control planes for an individual cluster among the multiple clusters may be implemented as the control planes described with respect to FIGS. 4A and 4B. The control planes described with respect to FIGS. 4A and 4B include a control plane for the container system 400 and a container storage system 402 control plane.

A given cluster among a plurality of clusters 504-2 through 504-M may be implemented similarly to cluster 408, described with respect to FIGS. 4A and 4B. In some implementations, a given cluster in the plurality of clusters 504-2 through 504-M may include a container storage system 402 or may not include a container storage system 402. The plurality of clusters 504-2 through 504-M may include clusters that are distributed across the world. As depicted in FIG. 5A, one or more clusters among the plurality of clusters 504-2 through 504-M may be in one or more geographic regions 508. A given cluster may be determined to be within one or more geographic regions based on the given cluster being implemented on at least some portion of physical hardware that is physically located within the one or more geographic regions.

The plurality of clusters 504-2 through 504-M may include a respective agent 506 operating on a respective cluster. The agent 506 may operate within a cluster 504 to determine telemetry data that describes one or more of: available resources on the cluster, status of one or more resources, utilization of one or more resources, among other telemetry data that may describe hardware or software characteristics of a cluster 504. The agent 506 may provide telemetry data to the controller 502.

The agent 506 may provide telemetry data periodically, in response to a request from the controller 502, or in response to an event on a given cluster. An event on a cluster may include one or more of: a change in status of a resource on the cluster, a change in resource capacity, a change in resource utilization, a configuration change, among other types of changes to the resources of a cluster.

The computing environment for a given cluster 504 may be physically located within a given geographic region. The computing environments for the plurality of clusters may be in multiple regions 508 and on various continents. The clusters 504 may be provided by one or more cloud service providers, such as Amazon AWS™, Google Cloud Platform™, Microsoft Azure™, among others.

In some implementations, the controller 502 may select, from among a plurality of clusters such as the plurality of clusters 504-2 through 504-M a particular cluster on which to deploy a containerized application. The selection may be made based on cluster resources for the particular cluster satisfying one or more resource specifications for the containerized application. Accordingly, the containerized application may be deployed to and operate within the particular cluster and may have access to cluster resources that allow for operation that may satisfy a service level agreement, a user preference, or some other parameter. In addition, the selection may be made based on the particular cluster having cluster attributes that satisfy a deployment policy. Accordingly, the containerized application may be deployed to and operate within the particular cluster in compliance with specified regulations, data privacy, security, or other deployment policy specifications.

Cluster resources may include any resources of a cluster, such as storage resources, network resources, processing resources, performance capabilities, container runtime environments or platforms, container orchestrators, supported protocols, supported data formats, supported communication formats. Such resources may be defined or determined with respect to capacity (e.g., capacity of a resource), utilization (e.g., utilization of a resource), availability (e.g., availability of a resource), capability (e.g., capability of a resource), performance (e.g., performance of a resource), and/or in any other suitable way. In certain implementations, one or more cluster resources may be indicated by telemetry data received from the agent 506 of a cluster. Telemetry data may indicate, for example, storage resources, storage capacity, network bandwidth, performance characteristics, compute loads, among other cluster resources.

A resource specification for a containerized application may include data indicating one or more resource parameters for storage and/or operation of the containerized application when deployed and/or executing. For example, a resource specification for a containerized application may specify one or more storage resources, network resources, I/O operations per second (IOPS), I/O latency threshold(s), data recovery time objectives (RTO), data recovery point objectives (RPO), a number of machines in a cluster (including virtual or physical), a number of CPU cores, amounts and/or types of memory, a number of members in an etcd cluster, workloads, processing resources, performance capabilities, container runtime environments or platforms, container orchestrators, protocols, data formats, communication formats, and/or any other resources required or desired for use by the containerized application. Such resources may be defined in the resource specification with respect to capacity (e.g., capacity of a resource), utilization (e.g., utilization of a resource), availability (e.g., availability of a resource), capability (e.g., capability of a resource), performance (e.g., performance of a resource), and/or in any other suitable way.

A resource specification for a containerized application may be determined by the controller 502 in any suitable way. In some implementations, a resource specification for a containerized application may be determined by the controller 502 based on one or more indications from a user interface, command line, or configuration file. In some implementations, a user interface may provide, for a resource specification, a list of options from which one or more selections may be made by a user to select one or more options to be included in the resource specification. For example, the user interface may provide selectable options for use by the user to select parameters to be included in the resource specification, such as a location requirement, a storage size requirement, a minimum IOPS requirement, and so on. With respect to a command line, one or more parameters may be parsed from a command line command, where each respective parameter may be included in a respective resource specification. With respect to a configuration file, the controller 502 may associate one or more fields or tokens within the configuration file with a resource specification. In certain implementations, a configuration file may be similar to a deployment for a containerized application within a container system 400, where the configuration file may comprise a respective field and a respective field value for a resource specification for the containerized application. In certain examples, a resource specification for a containerized application may specify parameters received via one or more of a user interface selection, a command line parameter, or configuration file.

A deployment policy for a containerized application may include data indicating one or more policies for deployment and/or operation of the containerized application on a cluster. The policies may be cluster-level policies specifying one or more cluster attributes that are required or desired of a cluster in order for the containerized application to be deployed to the cluster. For example, a deployment policy for a containerized application may specify a geographic region, one or more applicable governmental regulations, a latency value, financial costs, a security attribute, a privacy attribute, an energy consumption attribute (e.g., an energy level or certification), an operator attribute, and/or any other attributes that are required or desired in a cluster to which the containerized application may be deployed.

Cluster attributes may include any attributes of a cluster. The cluster attributes may be different from the cluster resources of the cluster described above. For example, cluster attributes may specify a geographic region of a cluster, one or more applicable governmental regulations associated with a cluster, one or more latency values associated with a geographic distance of the cluster relative to one or more other geographic locations (e.g., geographic locations for one or more users), financial costs associated with a cluster, a security attribute of the cluster, a privacy attribute of the cluster, an energy consumption attribute of the cluster (e.g., an energy level or certification of the cluster), an operator attribute of the cluster, among others.

In some implementations, a deployment policy for a containerized application may be specified similarly to a resource specification for the containerized application. For example, a deployment policy may be determined by the controller 502 based on one or more selections within a user interface, one or more parameter specifications of a command line, or one or more fields and associated field values specified by a configuration file. In certain examples, a deployment policy for a containerized application may specify parameters received via one or more of a user interface selection, a command line parameter, or a configuration file.

The controller 502 may be associated with a plurality of clusters that are to be considered by the controller 502 as candidates for deployment of containerized applications. The association may be made in any suitable way that allows the controller 502 to identify the plurality of clusters. In some implementations, the plurality of available clusters may be determined by the controller 502 using one or more of: one or more selections within a user interface, one or more parameter specifications of a command line, or one or more fields and associated field values specified by a configuration file. In this example, the plurality of available clusters is indicated by the plurality of clusters 504-2 through 504-M.

In some implementations, the controller 502 may detect a request to deploy a containerized application and determine an associated resource specification and an associated deployment policy for the containerized application. For example, the controller 502 may detect a request to deploy a containerized application based on a user interface interaction. In this example, the user interface may display a user interface element associated with a command to deploy a containerized application. As another example, the controller 502 may be invoked by a command line deployment command. The command line deployment command may indicate one or more parameters indicating one or more resource specification and one or more parameters indicating one or more deployment policies. An example of the controller 502 using a resource specification and a deployment policy to deploy a containerized application among a plurality of clusters 504-2 through 504-M is described in greater detail with respect to FIG. 5B.

Figure 5B:
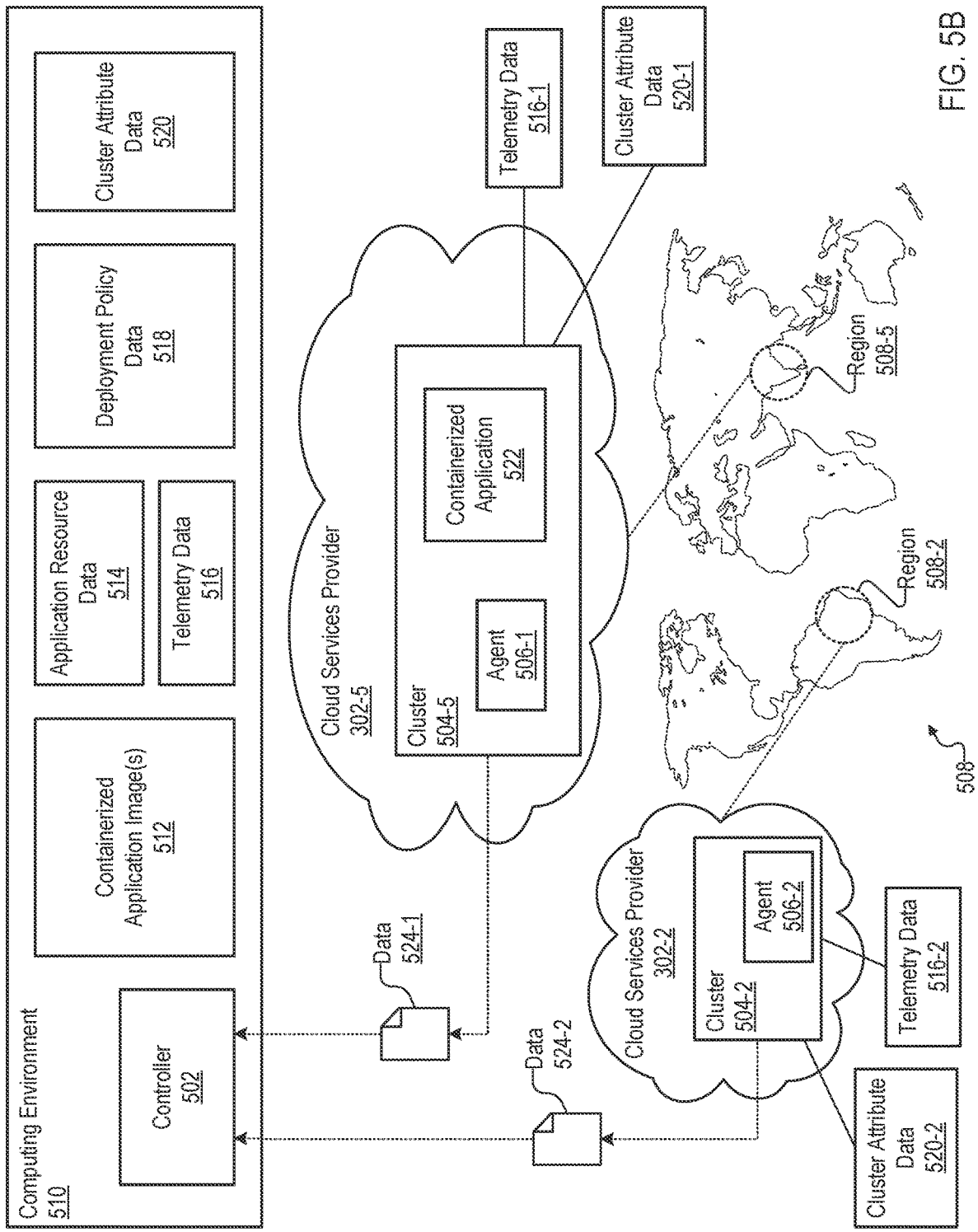
FIG. 5B illustrates another example controller configured to deploy a containerized application to one or more clusters among a plurality of clusters, in accordance with some embodiments of the present disclosure.

FIG. 5B shows another illustration of the controller 502 that is configured to deploy a containerized application to one or more clusters among a plurality of clusters, in accordance with some embodiments.

In this example, the controller 502 is implemented within a computing environment 510. In some implementations, the computing environment 510 may be a cloud computing environment such as cloud computing environment 316, described with respect to FIGS. 3A-3E. Within the computing environment 510, the controller 502 may store and access one or more containerized application images 512, application resource data 514, telemetry data 516, deployment policy data 518, cluster attribute data 520, among other types of data usable to deploy or redeploy a containerized application.

A containerized application may include a software application and an entire runtime environment of the software application bundled into a given container image. The given container image may be one of the one or more containerized application image(s) 512. For example, a containerized application may include source code of the software application and various dependencies, libraries, or other components used by the containerized application to operate.

Application resource data 514 may indicate, for a given containerized application, application resources that the given containerized application uses to operate. For example, the application resource data 514, for a given containerized application, may specify a resource specification of the containerized application, as described above with respect to FIG. 5A. The application resource data 514 may specify resource parameters (e.g., usage parameters) for each containerized application or for a given type of containerized application.

Telemetry data 516 may indicate telemetry data for a plurality of clusters such as clusters 504-2 and 504-5 shown in FIG. 5B. The telemetry data 516 may be used by the controller 502 to determine whether resources of a cluster satisfy a resource specification of a containerized application, where a resource specification may be indicated by application resource data 514. In certain examples, the telemetry data 516 may include indications of resource availability, resource usage, or resource status. For example, telemetry data 516 may include one or more indications for resource availability, resource usage, or resource status for one or more of the specifications described above with respect to a resource specification. The controller 502 may receive the telemetry data from agents 506 and store the telemetry data 516 in the computing environment 510.

In some implementations, the telemetry data 516 may be provided to the controller 502 by an agent 506 that is executing on a given cluster. For example, an agent 506-1 may determine telemetry data 516-1 associated with cluster 504-5 and transmit the telemetry data 516-1 to the controller 502. Further in this example, an agent 506-2 may determine telemetry data 516-2 associated with cluster 504-2 and transmit the telemetry data 516-2 to the controller 502. Telemetry data 516 may be determined by one or more monitoring tools that are executing within the container system 400. As one example among various container orchestration systems, Kubernetes provides information about application resource usage and metrics associated with a given containerized application, one or more pods, one or more services, among other characteristics of a cluster.

In the example of FIG. 5B, data 524-1 may include one or more of the telemetry data 516-1, the cluster attribute data 520-1, or other data associated with the cluster 504-5, a cloud services provider, or a region. Similarly, data 524-2 may include one or more of the telemetry data 516-2, the cluster attribute data 520-2, or other data associated with the cluster 504-2, a cloud services provider, or a region.

Deployment policy data 518 may indicate one or more deployment policies associated with a given containerized application. A deployment policy may specify one or more cluster attributes associated with the containerized application, such as a cluster attribute that is required or desired for deployment of the containerized application to a cluster. In certain examples, attributes of a cluster may be based on a region in which a cluster is physically located, based on a cloud services provider that provides the cluster, or on one or more other attributes that are not based on hardware or software specifications. In certain examples, a deployment policy for a given containerized application may be specified by a user. For example, the controller 502 may provide a user interface though which a user may specify one or more deployment policies associated with a given containerized application, or with a type or category of containerized application. The deployment policy data 518 may be received and stored by the controller 502.

Cluster attribute data 520 may indicate one or more attributes of clusters in a plurality of clusters. For example, cluster attribute data 520 may be specified as described above with respect to FIG. 5B. The controller 502 may receive and store the cluster attribute data 520. In certain examples, a government indicated by the cluster attribute data 520 may be representative of a municipal authority, state authority, national authority, or a treaty between parties that is associated with a geographic region. A financial parameter indicated by the cluster attribute data 520 may indicate one or more costs for one or more cluster resources, such as cluster resources described with respect to telemetry data 516. A data privacy regulation indicated by the cluster attribute data 520 may be a legal or other binding obligation that specifies storing or managing data that is transmitted through or is stored within a given geographic region. A security regulation indicated by the cluster attribute data 520 may be a legal or other binding obligation that specifies encrypting, a level of encryption, or authenticating data that is stored within or that is transmitted through a given geographic region.

The cluster attribute data 520 may be provided to the controller 502 in multiple ways. As a first example, the cluster attribute data 520 may be sent from an agent 506 to the controller 502, where the agent may access a database, configuration file, or other stored data file that includes the cluster attribute data 520. As a second example, the cluster attribute data 520 may be determined through a user interface provided by the controller 502. As a third example, the cluster attribute data 520 may be provided by a cloud services provider 302.

To selectively deploy a containerized application 522, the controller 502 may select a cluster from among a plurality of clusters 504-2 through 504-M. The plurality of clusters 504-2 through 504-M may be distributed across one or more geographic regions 508. The cluster may be selected by the controller 502 based on the cluster satisfying resource specifications for the containerized application 522 and based on the cluster satisfying a deployment policy associated with the containerized application 522.

Deployment of the containerized application 522 may depend on a container system 400 implementation. For example, to deploy a containerized application in Kubernetes, a yaml file may be used to specify a desired state, replica information, container image location, port information, among other standard deployment specifications.

In the example illustrated in FIG. 5B, for simplicity, the plurality of clusters includes clusters 504-2 and 504-5 from which the controller 502 selects a cluster to which to deploy the containerized application 522. In other examples, the plurality of clusters may include more clusters, as depicted within FIG. 5A. Cluster 504-5 is implemented within region 508-5, is provided by cloud services provider 302-5, and includes an agent 506-1 that communicates with the controller 502. Cluster 504-2 is implemented within region 508-2, is provided by cloud services provider 302-2, and includes an agent 506-2 that communicates with the controller 502.

As noted above, a cluster on which to deploy a containerized application may be selected by the controller 502 based on the cluster satisfying resource specifications for the containerized application 522 and based on the cluster satisfying a deployment policy associated with the containerized application 522. To select a cluster, the controller 502 may determine a first subset of clusters that satisfy resource specifications for the containerized application 522 and determine a second subset of clusters that satisfy a deployment policy associated with the containerized application 522. In this example, a given cluster that is in the first subset of clusters and in the second subset of clusters may be a candidate cluster for the controller 502 to deploy the containerized application.

Continuing this example, the controller 502 may determine the first subset of clusters based on the first subset of clusters having node resources that satisfy a resource specification of the containerized application 522. For example, the containerized application 522 may be associated with application resource data that indicates X TB of storage space, Y IOPS, and Z CPU usage. Each of the clusters of the plurality of clusters 504-2 through 504-M that has more than or equal to X TB of storage space, provides more than or equal to Y IOPS, and more than or equal to Z CPU usage may be determined to satisfy the resource specification for the containerized application 522. As described above, a containerized application may be associated with additional resource specifications. However, in this example, for simplicity, a small number of resource specifications are used, where additional resource specifications may be considered similarly to those used here.

The controller 502 may access and use application resource data 514 to determine which clusters among the plurality of clusters 504-2 through 504-M have resources that satisfy the resource specification(s) of the containerized application 522. Each of the clusters among the plurality of clusters 504-2 through 504-M that satisfy the resource specification(s) of the containerized application 522 may be determined to be the first subset of clusters.

Continuing this example, the controller 502 may determine the second subset of clusters based on the second subset of clusters having attribute data that satisfies a deployment policy of the containerized application 522. For example, the containerized application 522 may be associated with a deployment policy that indicates one or more geographic regions that are allowable, a maximum latency threshold associated with a geographic distance of a cluster relative to a user location, and a maximum financial cost. As described above, a containerized application may be associated with additional deployment policy attributes. However, in this example, for simplicity, a small number of deployment policy attributes are used, where additional deployment policy attributes may be considered similarly to those used here.

The controller 502 may access and use the deployment policy to determine which of the clusters of the plurality of clusters 504-2 through 504-M is in a region that is one of the one or more geographic regions specified by the deployment policy, which of the clusters of the plurality of clusters 504-2 through 504-M is associated with a communication latency that is less than or equal to the maximum latency threshold associated with a geographic distance of a cluster relative to a user location, and which of the clusters of the plurality of clusters 504-2 through 504-M is associated with costs that satisfy the maximum financial cost specified by the deployment policy for the containerized application 522. For each remaining cluster attribute, the controller 502 may continue to select clusters that satisfy each of the cluster attributes specified by the deployment policy. The clusters among the plurality of clusters 504-2 through 504-M that satisfy each of the deployment policy attributes specified by the deployment policy for the containerized application 522 may be determined to be the second subset of clusters.

In some examples, there may be shared clusters that are indicated by both the first subset of clusters and the second subset of clusters. To select a single cluster on which to deploy the containerized application, the controller 502 may prioritize the shared clusters based on one or more criteria. To illustrate, the controller 502 may rank each of the shared clusters according to one or more aspects of telemetry data. For example, the shared clusters may include a first candidate cluster and a second candidate cluster. The first candidate cluster may have higher performance, lower workloads, or higher storage availability and may rank higher than the second candidate cluster that may have relatively lower performance, higher workloads, or lower storage availability. The controller 502 may select the highest-ranking cluster for deployment of the containerized application 522.

In certain embodiments, the first subset and the second subset may be determined in any suitable order. As an example, the first subset may be determined before the second subset in some implementations. In other implementations, the second subset may be determined before the first subset. In implementations in which different subsets are determined in serial order, a subset of clusters that is determined first may be used as the plurality of clusters from which the next subset of clusters is determined. In other embodiments, the two subsets may be determined in parallel, or at least partly in parallel.

Given a selected cluster, the controller 502 may deploy the containerized application 522 using established methods for deploying a containerized application within a container system. Examples of deploying a containerized application within a container system 400 are described above with respect to FIGS. 4A, 4B, and 5A.

After deployment of the containerized application 522 to the selected cluster, the controller 502 may selectively redeploy the containerized application 522 to another cluster in some conditions. For example, the controller 502 may receive updated telemetry data from one or more of the plurality of clusters. If the cluster on which the containerized application 522 is currently deployed fails to satisfy either application resources associated with the containerized application 522 or a deployment policy attribute associated with the containerized application 522, the controller 502 may redeploy the containerized application 522 to another cluster. The other cluster on which to redeploy the containerized application 522 may be selected similarly to the selection of the cluster on which the containerized application 522 is currently operating.

In some implementations, the controller 502 may redeploy a containerized application based on projected cost savings for operating the containerized application. For example, the containerized application 522 may be operating on a first cluster, at a cost of X dollars per a first time period. In this example, the cost of operating the containerized application 522 on a second cluster that also satisfies resource specifications for the containerized application 522 and satisfies a deployment policy associated with the containerized application 522 may be Y dollars per the first time period. If the difference between X and Y is greater than a specified threshold amount over the first time period, then the controller 502 may redeploy the containerized application 522. A time period may be any time period, such as a week, a month, a quarter, a time period associated with a current version of the containerized application 522, among other time periods.

In some implementations, the telemetry data received from the agents 506 may be used to train a machine learning model, where the model may be used to predict changes in resources for a given cluster. During operation, the controller 502 may use the model to predict that a cluster may fail to satisfy a resource specification associated with a containerized application. In response, the controller 502 may generate a recommendation to redeploy the containerized application before the predicted change in resource availability on the given cluster occurs.

Figure 6:
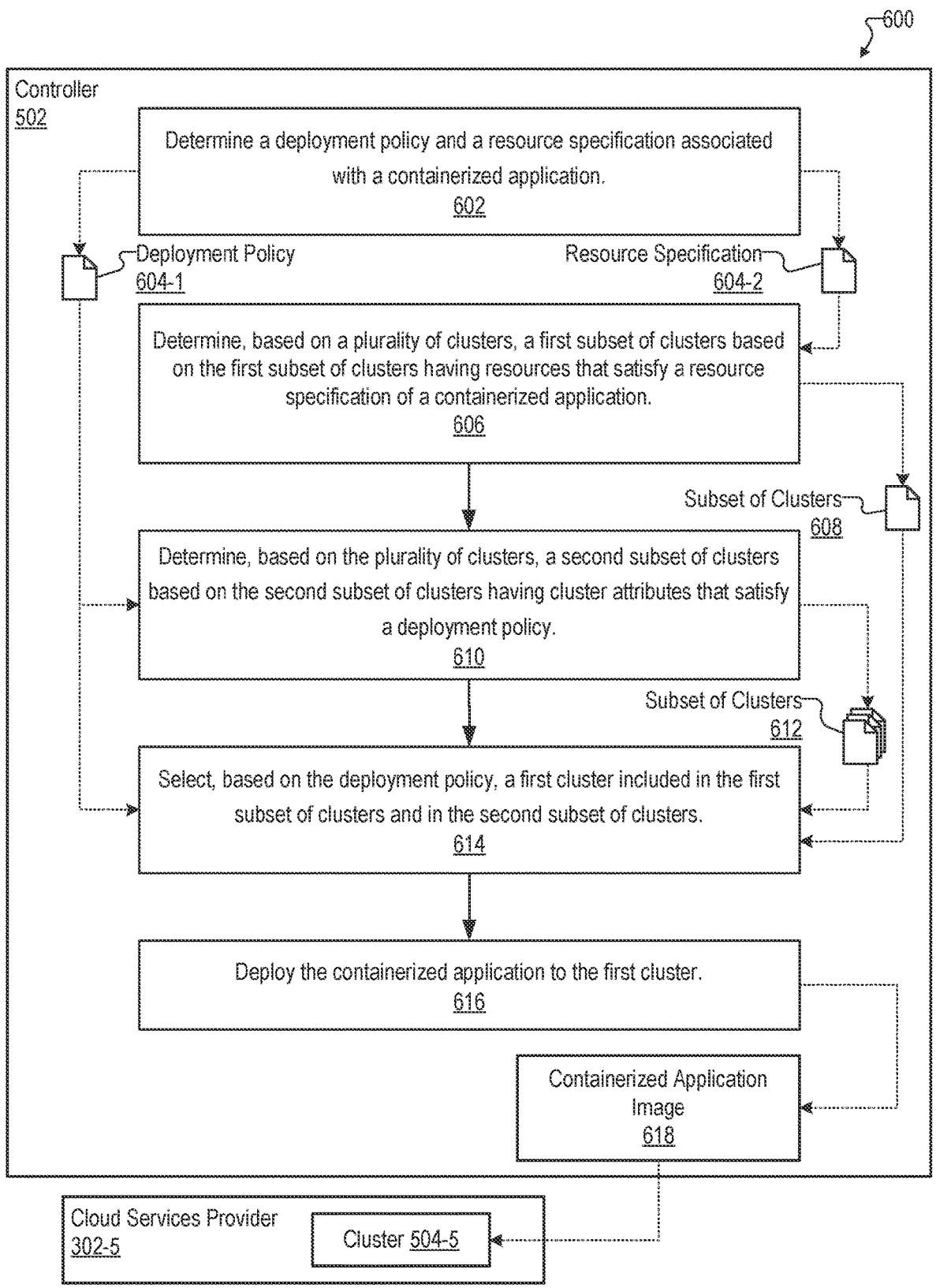
FIG. 6 depicts a flow diagram illustrating an example method using a controller for containerized application deployment, in accordance with some embodiments of the present disclosure.

FIG. 6 depicts a flow diagram 600 illustrating an example method using a controller for containerized application deployment, in accordance with some embodiments of the present disclosure.

As described with respect to FIGS. 5A and 5B, a controller 502 may deploy or redeploy a containerized application to a cluster selected from a plurality of clusters that may be geographically distributed across one or more regions. The controller 502 may be used to deploy the containerized application to a given cluster based on the given cluster satisfying resource specifications for the containerized application and based on the given cluster satisfying one or more deployment policies.

The example method includes, at 602, determining a deployment policy 604-1 and a resource specification 604-2 associated with a containerized application. The deployment policy 604-1 may specify one or more attributes to be satisfied by a given cluster among a plurality of clusters. The resource specification 604-2 may specify resource parameters for storage and/or operation of the containerized application when deployed and executing. For example, a user may specify a containerized application to be deployed. The controller 502 may access one or more deployment policies 604-1 and one or more resource specifications 604-2 that are associated with the containerized application. If there are no deployment policies associated with the containerized application, the controller 502 may request from a user a specification of one or more cluster attributes for a deployment policy to be created for the containerized application.

The example method includes, at 606, determining, based on the plurality of clusters, a first subset of clusters 608 based on the first subset of clusters 608 having resources that satisfy a resource specification of the containerized application. Examples of determining a first subset of clusters based on the first subset of clusters having resources that satisfy a resource specification of the containerized application are described with respect to FIG. 5B.

The example method includes, at 610, determining, based on the plurality of clusters, a second subset of clusters 612 based on the second subset of clusters 612 having cluster attributes that satisfy a deployment policy. Examples of determining a second subset of clusters based on the second subset of clusters having cluster attributes that satisfy a deployment policy are described with respect to FIG. 5B.

The example method includes, at 614, selecting, based on the deployment policy 604-1, a first cluster 504-5 included in the first subset of clusters 608 and in the second subset of clusters 612. Examples of selecting the first cluster 504-5 based on the deployment policy 604-1 from among one or more clusters that are in both the first subset of clusters 608 and the second subset of clusters 612 are described with respect to FIG. 5B. In this example, the first cluster 504-5 is implemented by cloud services provider 302-5.

The example method includes, at 616, deploying the containerized application to the first cluster. Examples of deploying the containerized application to the first cluster are described with respect to FIG. 5B. In this example, the controller 502 may provide a containerized application image 618 and a configuration file for deploying the containerized application to cluster 504-5.

In some implementations, as an optimization, the controller 502 may select a cluster using fewer steps or operations, without determining multiple subsets of candidate clusters, for instance. For example, the controller 502 may use selection criteria that include specifications from a deployment policy and specifications from a resource specification associated with a containerized application to be deployed.

Using the selection criteria, the controller 502 may determine, in a single pass through the plurality of clusters, a single subset of clusters that satisfies specifications in the deployment policy and that satisfies specifications in the resource specification. This subset may include one or more clusters that satisfy the specifications. If the subset includes only a single cluster, that cluster is selected by the controller 502 to host a deployment of the containerized application. If the subset includes multiple candidate clusters, the controller 502 may select, based on the deployment policy, a cluster from the subset based on a prioritization or ranking of the clusters.

Figure 7:
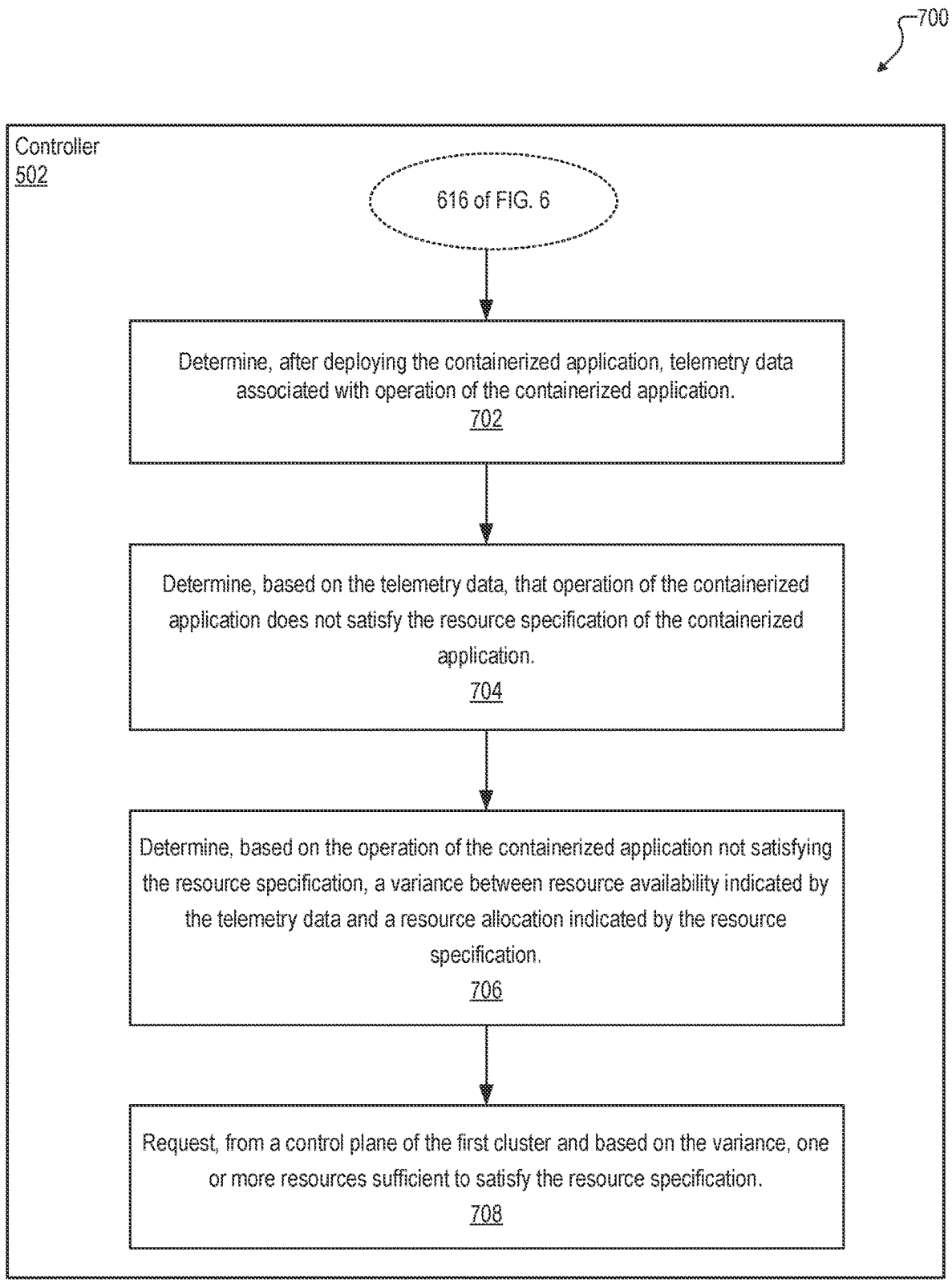
FIG. 7 depicts a flow diagram illustrating another example method using a controller for containerized application deployment, in accordance with some embodiments of the present disclosure.

FIG. 7 depicts a flow diagram 700 illustrating an example method using a controller for containerized application deployment, in accordance with some embodiments of the present disclosure.

As described with respect to FIGS. 5A and 5B, a controller 502 may deploy or redeploy a containerized application to a cluster selected from a plurality of clusters. The controller 502 may be used to deploy the containerized application to a given cluster based on the given cluster satisfying resource specifications for the containerized application and based on the given cluster satisfying one or more deployment policies.

In this example method, before the controller 502 redeploys an application from a first cluster to a second cluster based on the first cluster not providing resources specified by a resource specification for the application, the controller 502 attempts to request additional resources from the first cluster to satisfy a resource allocation of the application. The request for the resources is an attempt by the controller 502 to continue execution of the containerized application on the current cluster if the cluster can provide resources that satisfy the resource specification for the containerized application. This example method may continue from 616 described with respect to FIG. 6.

The example method includes, at 702, determining, after deploying the containerized application, telemetry data associated with operation of the containerized application. For example, the controller 502 may receive telemetry data 516 as described with respect to FIGS. 5A and 5B. The telemetry data 516 may describe one or more of: status or operation of the containerized application, status or operation of the first cluster, or status or operation of resources of the first cluster.

The example method includes, at 704, determining, based on the telemetry data, that operation of the containerized application does not satisfy the resource specification of the containerized application. For example, similar to determining whether the first cluster satisfied the resource specifications for the containerized application to determine initial deployment of the containerized application to the first cluster, as described with respect to FIG. 5B, the controller 502 may determine whether the first cluster satisfies resource specifications for the containerized application at a time after deployment. In some examples, the controller 502 may delay redeployment for a period of time to allow for the first cluster to recover from any temporary resource constraints.

The example method includes, at 706, determining, based on the operation of the containerized application not satisfying the resource specification, a variance between resource availability indicated by the telemetry data and a resource allocation indicated by the resource specification. For example, a resource specification may indicate the resource allocation for the containerized application to be X TBs of storage. In this example, the first cluster may lose availability of a quantity of storage that reduces available storage to the containerized application from X TBs to less than X TBs. The variance may indicate a difference between a current resource availability of storage within the first cluster and the resource allocation indicated by the resource specification. For other resource allocations specified in the resource specification, the variance may similarly be used as a basis to determine a request from the controller 502 to provision resources that are sufficient to satisfy the resource specification for the containerized application.

The example method includes, at 708, requesting, from a control plane of the first cluster and based on the variance, one or more resources sufficient to satisfy the resource specification. In this example, based on the variance, the one or more resources requested may be a difference between the resource specification X TBs and the loss of storage available to the containerized application. In response to the request, the control plane of the container system 400 may attempt to provision additional storage, for example, block or object storage from a cloud services provider. In some implementations, if the controller 502 determines that the control plane of the container system 400 is unable to provision the requested additional storage, or unable to do so within a threshold interval of time, the controller 502 may determine to redeploy the containerized application from the first cluster to a second cluster. Redeployment of a containerized application is described above with respect to FIGS. 5A and 5B.

Figure 8:
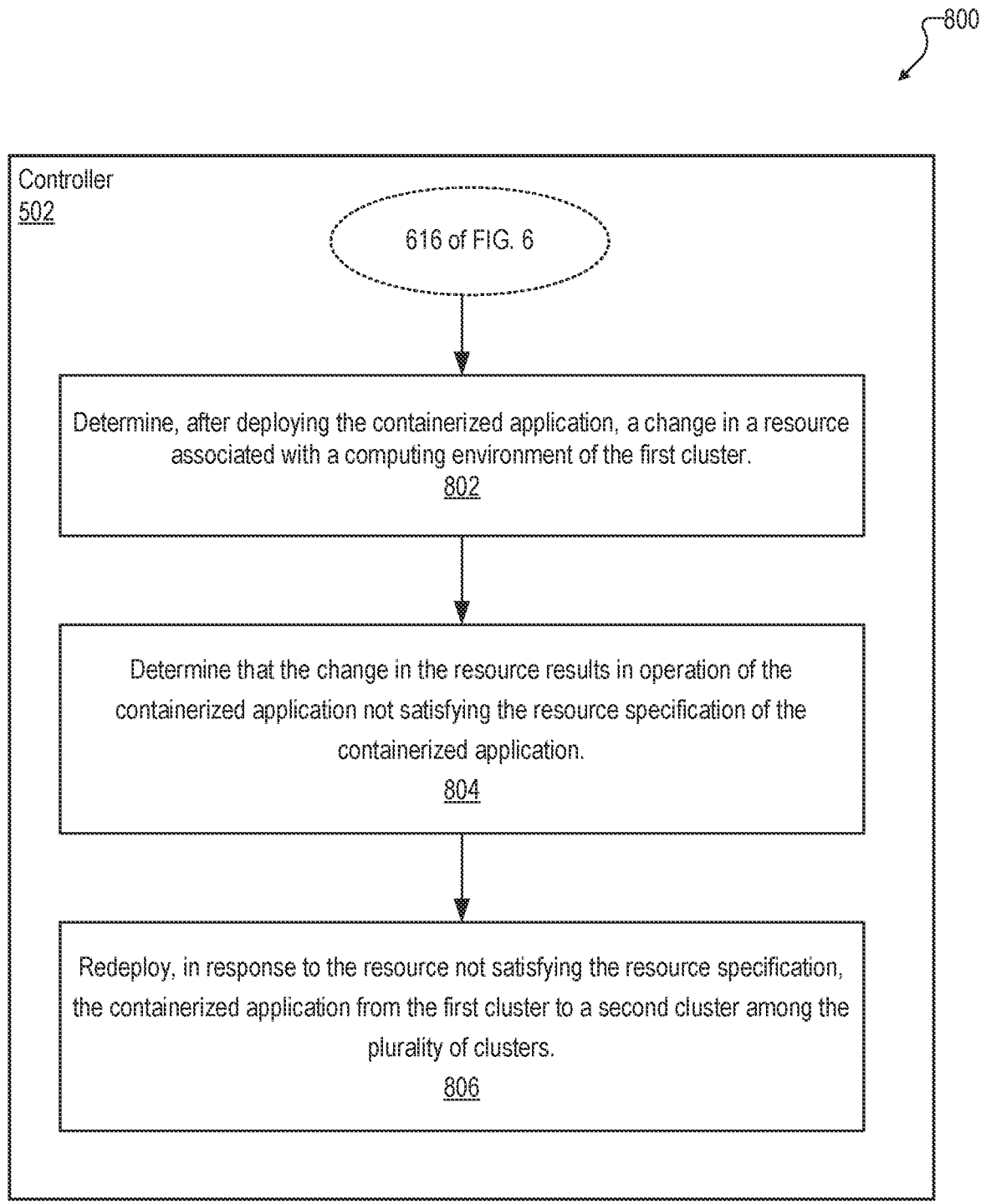
FIG. 8 depicts a flow diagram illustrating another example method using a controller for containerized application deployment, in accordance with some embodiments of the present disclosure.

FIG. 8 depicts a flow diagram 800 illustrating an example method using a controller for containerized application deployment, in accordance with some embodiments of the present disclosure.

As described with respect to FIGS. 5A and 5B, a controller 502 may deploy or redeploy a containerized application to a cluster selected from a plurality of clusters. In this example, based on a first cluster failing to satisfy a resource specification for the containerized application, the controller 502 redeploys the application from a first cluster to a second cluster. This example method may continue from 616 described with respect to FIG. 6.

The example method includes, at 802, determining, after deploying the containerized application, a change in a resource associated with a computing environment of the first cluster. For example, the controller 502 may receive telemetry data 516 as described with respect to FIGS. 5A and 5B. Telemetry data is described above with respect to FIGS. 5A and 5B. Based on the telemetry data, the controller 502 may identify the change in the resource associated with the computing environment of the first cluster.

The example method includes, at 804, determining that the change in the resource results in operation of the containerized application not satisfying the resource specification of the containerized application. For example, similar to determining whether the first cluster satisfied the resource specifications for the containerized application to determine initial deployment of the containerized application to the first cluster, as described with respect to FIG. 5B, the controller 502 may determine whether the first cluster satisfies resource specifications for the containerized application at a time after deployment.

The example method includes, at 806, redeploying, in response to the resource not satisfying the resource specification, the containerized application from the first cluster to a second cluster among the plurality of clusters. The second cluster on which to redeploy the containerized application may be selected similarly to the selection of the cluster on which the containerized application 522 is currently operating. Redeployment of the containerized application onto the second cluster may be performed similarly to deploying the containerized application to the first cluster.

Figure 9:
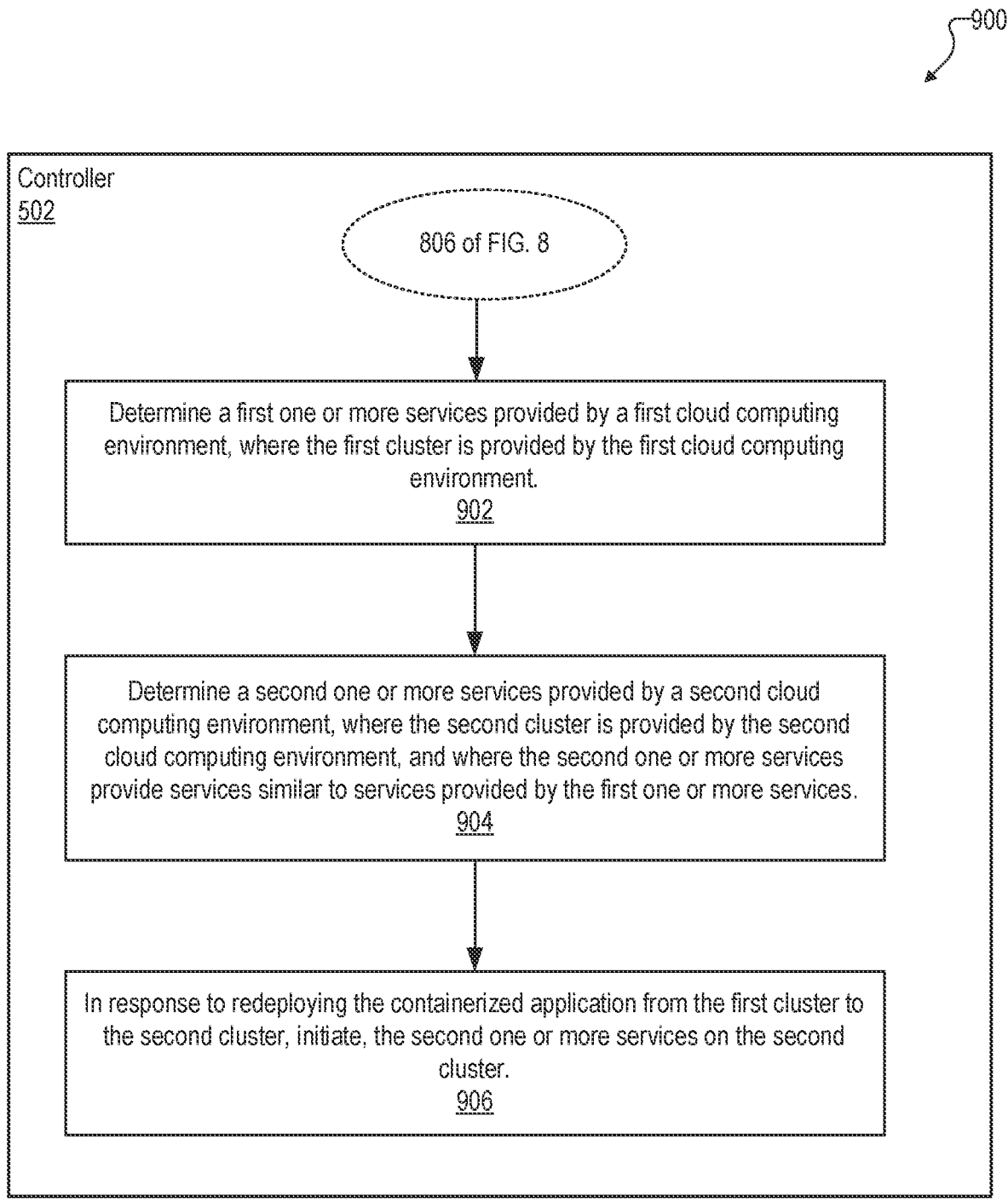
FIG. 9 depicts a flow diagram illustrating another example method using a controller for containerized application deployment, in accordance with some embodiments of the present disclosure.

FIG. 9 depicts a flow diagram 900 illustrating an example method using a controller for containerized application deployment, in accordance with some embodiments of the present disclosure.

As described with respect to FIGS. 5A and 5B, a controller 502 may deploy or redeploy a containerized application to a cluster selected from a plurality of clusters. In this example, based on redeploying the containerized application from the first cluster to the second cluster, the controller 502 also deploys any supporting applications used by the containerized application to the second cluster. This example method may continue from 806 described with respect to FIG. 8.

The example method includes, at 902, determining a first one or more services provided by a first cloud computing environment, where the first cluster is provided by the first cloud computing environment, and where the first one or more services are used by the containerized application. For example, the controller 502 may have, in addition to a resource specification associated with a containerized application, a list of services or applications used by the containerized application. The first cloud computing environment may be provided by a first cloud services provider.

The example method includes, at 904, determining a second one or more services provided by a second cloud computing environment, where the second cluster is provided by the second cloud computing environment, and where the second one or more services provide similar services to services provided by the first one or more services. For example, if the first cluster and the second cluster are both provided by a same cloud services provider, then the services or applications used by the containerized application and available on the second cluster may be identical as on the first cluster. Otherwise, if the first cluster and the second cluster do not have an identical set of support services or applications, the controller 502 may deploy services or applications that are similar to the services or applications used by the containerized application on the first cluster. For example, the controller 502 may have access to a configuration file that lists, for services by a first cloud services provider, similar services provided by one or more other cloud services providers.

The example method includes, at 906, in response to redeploying (806 of FIG. 8) the containerized application from the first cluster to the second cluster, initiating, the second one or more services on the second cluster. Further, a configuration file for deploying the containerized application may also specify communication endpoints for using the second one or more services.

Advantages and features of the present disclosure can be further described by the following statements:

1. A method comprising: receiving, by a controller associated with a plurality of clusters and from a user, a disaster recovery policy of a containerized application deployed on a first cluster in the plurality of clusters; determining, by the controller, a cluster profile of each second cluster among one or more second clusters that are distinct from the first cluster in the plurality of clusters; identifying, by the controller and from the one or more second clusters, a particular cluster based on the disaster recovery policy of the containerized application and the cluster profile of each second cluster; and assigning, by the controller, the particular cluster to be a disaster recovery cluster for the containerized application.

2. The method of the preceding statement, wherein: the disaster recovery policy of the containerized application includes one or more of a resource requirement of the containerized application, an operation requirement of the containerized application, or a cluster requirement of the containerized application that are specified by the user.

3. The method of any of the preceding statements, further comprising: generating, by the controller, a disaster recovery profile of the containerized application; and wherein the identifying of the particular cluster is further based on the disaster recovery profile of the containerized application.

4. The method of any of the preceding statements, wherein the generating of the disaster recovery profile of the containerized application comprises: receiving, from an agent associated with a storage system of the first cluster, application information associated with one or more operations of the containerized application; and generating the disaster recovery profile of the containerized application based on the application information.

5. The method of any of the preceding statements, wherein the agent is configured to: obtain operation metadata describing the one or more operations of the containerized application from one or more infrastructure layers of a node that operates the containerized application in the first cluster.

6. The method of any of the preceding statements, wherein the receiving of the disaster recovery policy from the user comprises: generating, by the controller, a disaster recovery profile of the containerized application, the disaster recovery profile including one or more requirements of the containerized application; presenting, to the user, a subset of the one or more requirements included in the disaster recovery profile; and receiving, from the user, a user input that adjusts the subset of the one or more requirements to establish the disaster recovery policy for the containerized application.

7. The method of any of the preceding statements, further comprising: receiving, from the user, an additional user input that specifies one or more additional requirements of the containerized application to be included in the disaster recovery policy.

8. The method of any of the preceding statements, wherein: the disaster recovery policy specifies one or more of an isolation level of the containerized application within a cluster that operates the containerized application, an attribute of a hardware component associated with the cluster, or a geographic region of the cluster.

9. The method of any of the preceding statements, wherein the identifying of the particular cluster includes: evaluating the cluster profile of each second cluster against the disaster recovery policy of the containerized application; computing a cluster score for each second cluster based on the evaluating; and identifying, from the one or more second clusters, the particular cluster for the containerized application based on the cluster score of each second cluster.

10. The method of any of the preceding statements, wherein the identifying of the particular cluster includes: determining that none of the one or more second clusters satisfies the disaster recovery policy of the containerized application; creating, in response to the determining that none of the one or more second clusters satisfies the disaster recovery policy of the containerized application, an additional second cluster that satisfies the disaster recovery policy of the containerized application; and identifying the additional second cluster to be the particular cluster for the containerized application.

11. The method of any of the preceding statements, wherein the disaster recovery cluster is configured to: determine that the first cluster is subjected to an operation disruption; and take over, in response to the determining that the first cluster is subjected to the operation disruption, a task of operating the containerized application from the first cluster.

12. A controller system associated with a plurality of clusters, the controller system comprising: a memory storing instructions; and one or more processors communicatively coupled to the memory and configured to execute the instructions to perform a process comprising: receiving, from a user, a disaster recovery policy of a containerized application deployed on a first cluster in the plurality of clusters; determining a cluster profile of each second cluster among one or more second clusters that are distinct from the first cluster in the plurality of clusters; identifying, from the one or more second clusters, a particular cluster based on the disaster recovery policy of the containerized application and the cluster profile of each second cluster; and assigning the particular cluster to be a disaster recovery cluster for the containerized application.

13. The controller system of the preceding statement 12, wherein: the disaster recovery policy of the containerized application includes one or more of a resource requirement of the containerized application, an operation requirement of the containerized application, or a cluster requirement of the containerized application that are specified by the user.

14. The controller system of any of the preceding statements 12-13, wherein the process further comprises: generating a disaster recovery profile of the containerized application; and wherein the identifying of the particular cluster is further based on the disaster recovery profile of the containerized application.

15. The controller system of any of the preceding statements 12-14, wherein the generating of the disaster recovery profile of the containerized application comprises: receiving, from an agent associated with a storage system of the first cluster, application information associated with one or more operations of the containerized application; and generating the disaster recovery profile of the containerized application based on the application information.

16. The controller system of any of the preceding statements 12-15, wherein the agent is configured to: obtain operation metadata describing the one or more operations of the containerized application from one or more infrastructure layers of a node that operates the containerized application in the first cluster.

17. The controller system of any of the preceding statements 12-16, wherein the receiving of the disaster recovery policy from the user comprises: generating, by the controller, a disaster recovery profile of the containerized application, the disaster recovery profile including one or more requirements of the containerized application; presenting, to the user, a subset of the one or more requirements included in the disaster recovery profile; and receiving, from the user, a user input that adjusts the subset of the one or more requirements to establish the disaster recovery policy for the containerized application.

18. The controller system of any of the preceding statements 12-17, wherein the identifying of the particular cluster includes; evaluating the cluster profile of each second cluster against the disaster recovery policy of the containerized application; computing a cluster score for each second cluster based on the evaluating; and identifying, from the one or more second clusters, the particular cluster for the containerized application based on the cluster score of each second cluster.

19. The controller system of any of the preceding statements 12-18, wherein the identifying of the particular cluster includes: determining that none of the one or more second clusters satisfies the disaster recovery policy of the containerized application; creating, in response to the determining that none of the one or more second clusters satisfies the disaster recovery policy of the containerized application, an additional second cluster that satisfies the disaster recovery policy of the containerized application; and identifying the additional second cluster to be the particular cluster for the containerized application.

20. A non-transitory computer-readable medium storing instructions that, when executed, direct a processor of a controller system associated with a plurality of clusters to perform a process comprising: receiving, from a user, a disaster recovery policy of a containerized application deployed on a first cluster in the plurality of clusters; determining a cluster profile of each second cluster among one or more second clusters that are distinct from the first cluster in the plurality of clusters; identifying, from the one or more second clusters, a particular cluster based on the disaster recovery policy of the containerized application and the cluster profile of each second cluster; and assigning the particular cluster to be a disaster recovery cluster for the containerized application.

Thus, controller 502 may manage the deployment of containerized application 522 on one or more clusters 504 of the computing environment as described above. In some embodiments, containerized application 522 may be an entire logical unit including various components (e.g., a frontend user interface, a backend database, a data storage, a cache memory, metadata, runtime data, etc.) that are used to provide functionalities and/or services of a service provider. The service provider may be a customer of the computing environment and the functionalities and/or services provided by containerized application 522 may include functionalities and/or services of a single software application (e.g., an online shopping application) or multiple software applications (e.g., an online shopping application, an inventory management application, a virtual agent application, etc.) that the service provider provides to its end users.

In some embodiments, in addition to or instead of managing the deployment of containerized application 522, controller 502 may manage disaster recovery operations for containerized application 522. For example, controller 502 may selectively identify a disaster recovery cluster for containerized application 522 among the plurality of clusters 504 in the computing environment. In some embodiments, the disaster recovery cluster may take over the task of operating containerized application 522 when a cluster 504 that currently operates containerized application 522 is subjected to an operation disruption such as a disruption caused by a disaster. The disaster that causes the operation disruption of cluster 504 may be a natural disaster (e.g., fire, flood, earthquake, etc.), a power outage, a software and/or hardware failure, a security attack, and/or another type of disaster event.

In some embodiments, to take over the task of operating containerized application 522, the disaster recovery cluster may receive from cluster 504 various information (e.g., application data, runtime data, configuration settings, etc.) associated with a first instance of containerized application 522 on cluster 504. The disaster recovery cluster may use such information to instantiate a second instance of containerized application 522 on the disaster recovery cluster that is identical to the first instance of containerized application 522 on cluster 504. In some embodiments, while the second instance of containerized application 522 may be ready to handle various requests associated with containerized application 522, the second instance of containerized application 522 may remain passive on the disaster recovery cluster as a standby backup instance of the containerized application 522. For example, the second instance of containerized application 522 on the disaster recovery cluster may not communicate with user devices and may not process requests associated with containerized application 522 while cluster 504 is still up and running.

In some embodiments, the disaster recovery cluster may be configured to detect an operation disruption of cluster 504. For example, cluster 504 may periodically communicate with the disaster recovery cluster at a predefined interval (e.g., every 5 s) via a communication channel therebetween. In some embodiments, if the disaster recovery cluster does not receive any communication from cluster 504 through the communication channel during a predetermined time period, the disaster recovery cluster may determine that cluster 504 is subjected to an operation disruption. In response to the determining that cluster 504 is subjected to an operation disruption, the disaster recovery cluster may take over the task of operating containerized application 522 from cluster 504. For example, the disaster recovery cluster may switch the second instance of containerized application 522 on the disaster recovery cluster from a passive mode to an active mode. After being switched to the active mode, the second instance of containerized application 522 on the disaster recovery cluster may process various workloads that the first instance of containerized application 522 on cluster 504 has not yet completed. Incoming requests of containerized application 522 may also be directed to and handled by the second instance of containerized application 522 on the disaster recovery cluster.

Thus, the disaster recovery cluster may take over the operating of containerized application 522 from cluster 504 when cluster 504 is subjected to an operation disruption. However, it is challenging to identify, from multiple clusters 504, a particular cluster that is adequate and/or optimal to be the disaster recovery cluster for a containerized application such as containerized application 522. Systems and methods described herein are capable of generating a disaster recovery profile of containerized application 522 (or any other containerized application) and objectively identifying a disaster recovery cluster for containerized application 522 based on the disaster recovery profile of containerized application 522.

Figure 10:
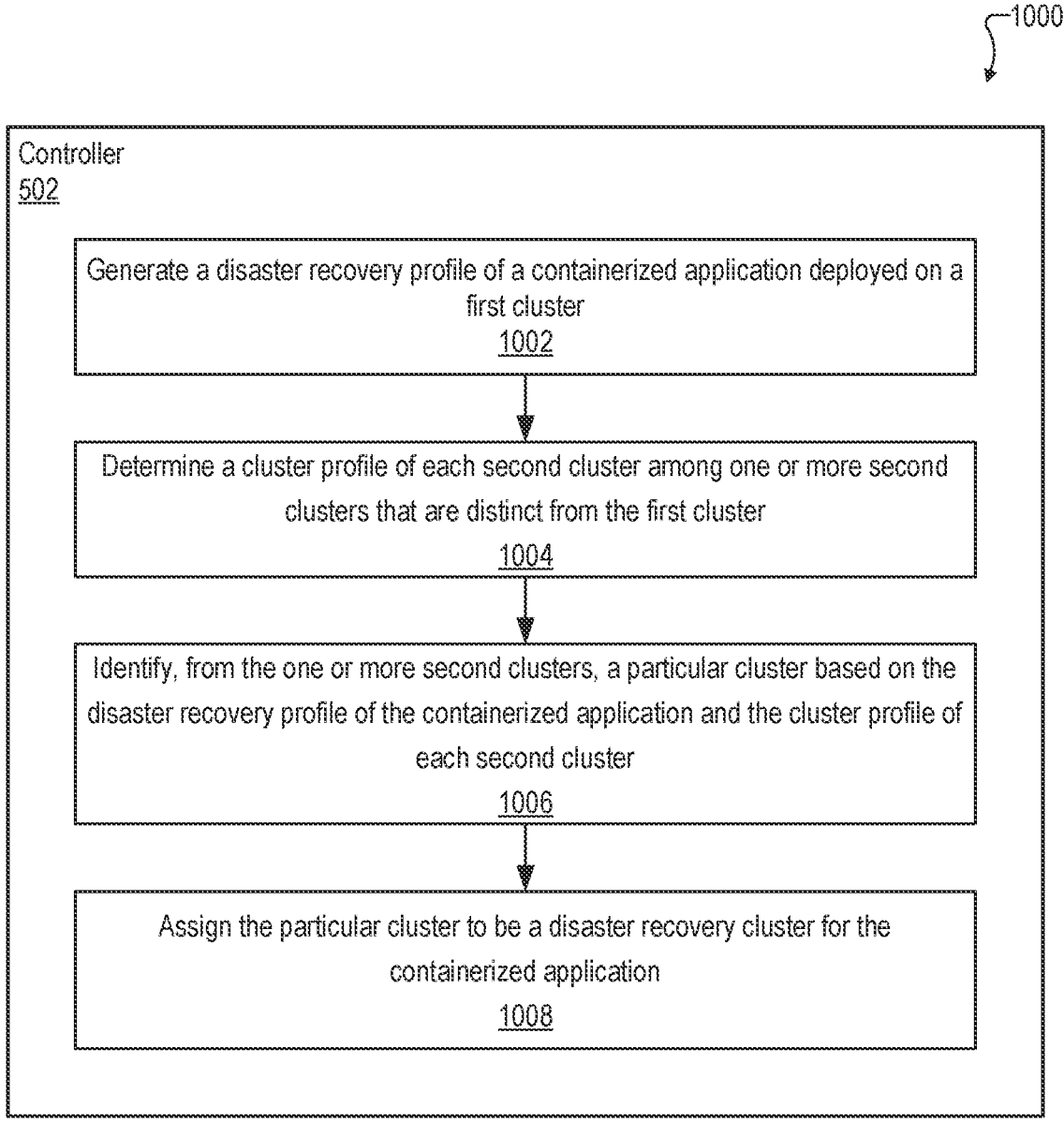
FIG. 10 depicts a flow diagram illustrating an example method for identifying a disaster recovery cluster for a containerized application in accordance with some embodiments of the present disclosure.

To illustrate, FIG. 10 shows an exemplary method 1000 that may be performed by controller 502 and/or by any implementation thereof. Method 1000 may be used alone or in combination with other methods described herein.

At operation 1002, controller 502 may generate a disaster recovery profile of containerized application 522 deployed on a first cluster in the plurality of clusters 504. The disaster recovery profile may include one or more requirements (e.g., resource requirements, operation requirements, cluster requirements, etc.) that are required or desired to be satisfied in order for a disaster recovery cluster to successfully take over the operating of containerized application 522 from the first cluster when the first cluster is subjected to an operation disruption. In some embodiments, the requirements in the disaster recovery profile of containerized application 522 may be determined by a system component such as controller 502 and/or a storage agent associated with the first cluster on which containerized application 522 is currently operated.

In some embodiments, to generate the disaster recovery profile of containerized application 522, controller 502 may receive application information associated with operations of containerized application 522, and generate the disaster recovery profile of containerized application 522 based on the application information. For example, controller 502 may receive the application information of containerized application 522 from the storage agent associated with the first cluster on which containerized application 522 is currently operated. The application information may include operation metadata describing one or more operations of containerized application 522 on the first cluster. In some embodiments, controller 502 may determine one or more requirements of containerized application 522 based on the operation metadata descriptive of actual operations of containerized application 522 on the first cluster, and include the one or more requirements of containerized application 522 in the disaster recovery profile of containerized application 522. Thus, the one or more requirements of containerized application 522 that are included in the disaster recovery profile may be determined by a system component such as controller 502 and may not be provided by a user (e.g., an authorized manager). In other words, the one or more requirements in the disaster recovery profile of containerized application 522 may be system-generated (based on actual operations of containerized application 522 on the first cluster) and not user-defined.

At operation 1004, controller 502 may determine a cluster profile of each second cluster among one or more second clusters that are distinct from the first cluster in the plurality of clusters 504. For example, for each second cluster distinct from the first cluster, controller 502 may receive the cluster profile describing various aspects of the second cluster from agent 506 associated with the second cluster. In some embodiments, the cluster profile of the second cluster may include cluster resource data describing one or more resources (e.g., a computing resource, a storage resource, a network resource, etc.) of the second cluster, one or more operations metrics of the second cluster (e.g., response time, I/O latency, network latency), and/or one or more cluster attributes of the second cluster (e.g., application isolation level, geographic region). Other types of data in the cluster profile of the second cluster are also possible and contemplated.

At operation 1006, controller 502 may identify a particular cluster based on the disaster recovery profile of containerized application 522 and the cluster profile of each second cluster. For example, controller 502 may evaluate the cluster profile of each second cluster against the disaster recovery profile of containerized application 522, and compute a cluster score for each second cluster based on the evaluating. The cluster score of each second cluster may indicate a level at which the cluster profile of the second cluster satisfies the disaster recovery profile of containerized application 522, and therefore indicate a level at which the second cluster satisfies the requirements of containerized application 522 that are determined by a component system such as controller 502 and/or the storage agent of the first cluster.

In some embodiments, controller 502 may identify the particular cluster for containerized application 522 based on the cluster score of each second cluster. For example, controller 502 may identify the particular cluster to be a second cluster that has a highest cluster score among the second clusters. Additionally or alternatively, controller 502 may identify one or more second clusters that have their cluster score satisfying (e.g., higher than) a cluster score threshold, and present a list of the one or more second clusters to a user (e.g., an authorized manager) as a recommendation of disaster recovery clusters for containerized application 522. In some embodiments, controller 502 may receive from the user a user input selecting a second cluster among the one or more second clusters, and identify the selected second cluster to be the particular cluster for containerized application 522.

At operation 1008, controller 502 may assign the particular cluster to be a disaster recovery cluster for containerized application 522. As the disaster recovery cluster of containerized application 522, the particular cluster may be configured to detect an operation disruption of the first cluster as described herein. In response to detecting an operation disruption of the first cluster, the particular cluster may take over the operating of containerized application 522 from the first cluster. For example, the particular cluster may switch an instance of containerized application 522 on the particular cluster to the active mode. After being switched to the active mode, the instance of containerized application 522 on the particular cluster may start processing uncompleted workloads and handling incoming requests of containerized application 522 as described herein.

Thus, controller 502 may identify a particular cluster to be the disaster recovery cluster for containerized application 522 based on the disaster recovery profile of containerized application 522. As described herein, the disaster recovery profile may include one or more requirements of containerized application 522 that are required or desired to be satisfied so that the disaster recovery cluster may successfully take over the operating of containerized application 522 from the first cluster where containerized application 522 is currently operated. In some embodiments, the disaster recovery profile may include one or more resource requirements of containerized application 522, one or more operation requirements of containerized application 522, and/or one or more cluster requirements of containerized application 522 that are determined by a system component such as controller 502 and/or the storage agent of the first cluster. Examples of such requirements will now be described in additional detail. Other types of requirements are also possible and contemplated.

A resource requirement of containerized application 522 may correspond to a particular resource (e.g., a computing resource, a storage resource, a network resource, etc.) and may specify a required or desired amount of the resource to operate containerized application 522. Additionally or alternatively, the resource requirement may specify a required or desired attribute of the resource being used for containerized application 522. As an example, a storage resource requirement of containerized application 522 may specify a storage capacity for operating containerized application 522. Another storage resource requirement of containerized application 522 may specify that the storage resource being used for containerized application 522 is provided by one or more SSD devices. As another example, a network resource requirement of containerized application 522 may specify a network bandwidth for operating containerized application 522. Another network resource requirement of containerized application 522 may specify that the network resource being used for containerized application 522 is provided on a Virtual Private Network (VPN) connection. In some embodiments, the resource requirements of containerized application 522 may also include other requirements specified in the resource specification of containerized application 522 described herein.

An operation requirement of containerized application 522 may specify a required or desired aspect (e.g., a metric threshold, a configuration, etc.) associated with the operations of containerized application 522. For example, the operation requirements of containerized application 522 may specify one or more of a response time threshold of containerized application 522, an I/O latency threshold of containerized application 522, a network latency threshold of containerized application 522, an uptime threshold of containerized application 522, a downtime threshold of containerized application 522, an error rate of containerized application 522, etc. Additionally or alternatively, the operation requirements of containerized application 522 may also specify a threshold number of requests to be processed by containerized application 522 during a predefined time duration, which indicates the amount of workload that containerized application 522 is required or expected to handle. In some embodiments, the operation requirements of containerized application 522 may include other requirements related to the operations of containerized application 522 that are specified in the deployment policy of containerized application 522 described herein.

A cluster requirement of containerized application 522 may specify a required or desired attribute of a cluster 504 to operate as the disaster recovery cluster of containerized application 522. For example, the cluster requirements of containerized application 522 may specify an isolation level of containerized application 522 within cluster 504 (e.g., containerized application 522 is implemented on a node 420 of cluster 504 without other containerized applications being implemented on the same node 420), an attribute of a hardware component associated with cluster 504 (e.g., cluster 504 includes a specific type of hardware device such as SSD, MDRAM, GPU, etc.), a geographic region of cluster 504, etc. In some embodiments, the cluster requirements of containerized application 522 may also include other requirements related to cluster 504 that are specified in the deployment policy of containerized application 522 described herein.

As described herein, to generate the disaster recovery profile of containerized application 522, controller 502 may receive the application information associated with one or more operations of containerized application 522. In some embodiments, the application information may include the operation metadata describing the operations of containerized application 522. Additionally or alternatively, the application information may include one or more requirements of containerized application 522 that are determined based on the operation metadata of containerized application 522. Other types of application information are also possible and contemplated.

In some embodiments, controller 502 may receive at least some of the application information of containerized application 522 from an agent associated with the storage system of the first cluster on which containerized application 522 is currently operated. As described herein, the agent may be implemented at the storage level and may be configured to perform one or more operations of container storage system 402 that manages the storage system of the first cluster. Thus, the agent may be referred to as the storage agent of the first cluster and may be implemented in the form of a containerized application such as storage management containerized application 460 depicted in FIG. 4C. As described herein with reference to FIG. 4C, the storage agent such as storage management containerized application 460 may be granted the privileged permission to communicate with various infrastructure layers (container engine layer 470, OS layer 472, server layer 474, etc.) of node 420 on which containerized application 522 is operated in the first cluster. As a result, the storage agent may collect the operation metadata describing various aspects of the operations performed by containerized application 522 from different infrastructure layers at different levels, such as from one or more of container engine layer 470, operating system layer 472 (from a kernel of an operating system), and/or server layer 474, for example. With this implementation, the storage agent may be able to obtain comprehensive information about the operations of different containerized applications implemented on node 420, even if the containerized applications may be different from one another in terms of application provider or service provider, configuration setting, hardware structure, and/or other application aspects. In some implementations, the storage agent may be configured to obtain information about the operation of containerized application 522 from an IO data path and/or a control plane of a storage system.

In some embodiments, the storage agent may not only collect the operation metadata of containerized application 522 from different infrastructure layers of node 420, but may also determine one or more requirements of containerized application 522 based on the operation metadata of containerized application 522.

As an example, the operation metadata of containerized application 522 may include a resource metric indicating an amount of a resource being consumed by containerized application 522 and may also include a resource attribute indicating an attribute of the resource being used for containerized application 522. The storage agent may reference the resource metric and the resource attribute associated with containerized application 522 and determine the resource requirements of containerized application 522 for the resource accordingly. For example, the storage agent may determine a required or desired amount of the resource for operating containerized application 522 to be higher than the amount of the resource actually consumed by containerized application 522 by a predefined amount. The storage agent may also determine a required or desired attribute of the resource to be the attribute of the resource actually used for containerized application 522.

Similarly, the storage agent may reference an operation metric in the operation metadata of containerized application 522 and determine a corresponding operation requirement of containerized application 522 accordingly. For example, the storage agent may determine an upper threshold for the operation metric of containerized application 522 to be higher than the actual operation metric of containerized application 522 by a first predefined amount. The storage agent may also determine a lower threshold for the operation metric of containerized application 522 to be lower than the actual operation metric of containerized application 522 by a second predefined amount.

In some embodiments, the storage agent may transmit the application information associated with the operations of containerized application 522 to controller 502. For example, the storage agent may transmit the operation metadata of containerized application 522 to controller 502. Additionally or alternatively, the storage agent may transmit the requirements of containerized application 522 that are determined by the storage agent based on the operation metadata to controller 502.

In some embodiments, after receiving the application information from the storage agent of the first cluster, controller 502 may generate the disaster recovery profile of containerized application 522 based on the application information.

As an example, controller 502 may receive the application information including the operation metadata of containerized application 522 from the storage agent of the first cluster as described above. In this case, controller 502 may determine one or more requirements (e.g., the resource requirements, the operation requirements, the cluster requirements, etc.) of containerized application 522 based on the operation metadata of containerized application 522. For example, controller 502 may determine the requirements of containerized application 522 based on the operation metadata of containerized application 522 in a manner similar to the manner in which the storage agent determines the requirements of containerized application 522 based on the operation metadata of containerized application 522 described above. Controller 502 may then include the one or more requirements of containerized application 522 in the disaster recovery profile of containerized application 522.

As another example, controller 502 may receive the application information including one or more requirements of containerized application 522 from the storage agent of the first cluster. The one or more requirements may be determined by the storage agent based on the operation metadata of containerized application 522 as described above. In this case, controller 502 may include one or more of the requirements of containerized application 522 that are determined by the storage agent in the disaster recovery profile of containerized application 522.

In some embodiments, in addition to the application information received from the storage agent of the first cluster, controller 502 may also generate the disaster recovery profile of containerized application 522 based on other information. For example, controller 502 may analyze the cluster attribute data of each cluster 504 on which containerized application 522 is operated, and determine one or more cluster requirements of containerized application 522 accordingly. For example, based on the cluster attribute data of multiple clusters 504 on which containerized application 522 is operated, controller 502 may identify one or more cluster attributes that are common among these clusters 504, and determine the cluster requirements of containerized application 522 based on the identified cluster attributes.

As an example, controller 502 may determine that in each cluster 504 that operates containerized application 522, containerized application 522 may reside on a node 420 without other containerized applications being implemented on the same node 420. Accordingly, controller 502 may include in the disaster recovery profile of containerized application 522 a cluster requirement requiring that containerized application 522 be isolated from other containerized applications in a cluster 504 that operates as the disaster recovery cluster of containerized application 522. As another example, controller 502 may determine that all clusters 504 on which containerized application 522 is implemented are within a particular geographic region. In this case, controller 502 may include in the disaster recovery profile of containerized application 522 a cluster requirement requiring that a cluster 504 that operates as the disaster recovery cluster of containerized application 522 is also within the particular geographic region.

Thus, the disaster recovery profile of containerized application 522 may include one or more requirements (e.g., the resource requirements, the operation requirements, the cluster requirements) of containerized application 522 that are determined by controller 502 and/or by the storage agent of the first cluster on which containerized application 522 is currently operated. Accordingly, the disaster recovery profile of containerized application 522 may be considered system-generated and not user-defined.

As described herein, controller 502 may also determine a cluster profile for each second cluster distinct from the first cluster on which containerized application 522 is currently operated. The cluster profile of each second cluster may describe various aspects of the second cluster. In some embodiments, the cluster profile of a second cluster may include cluster resource data of the second cluster, one or more operation metrics of the second cluster, and/or one or more cluster attributes of the second cluster. Other types of data in the cluster profile of the second cluster are also possible and contemplated.

In some embodiments, the cluster resource data of the second cluster may describe various resources of the second cluster. For each resource (e.g., a computing resource, a storage resource, a network resource, etc.), the cluster resource data may indicate a total capacity of the resource on the second cluster, a current available amount of the resource on the second cluster at a current timestamp, one or more historical available amounts of the resource on the second cluster at one or more past timestamps, and/or an average available amount of the resource on the second cluster. The average available amount of the resource on the second cluster may be an average value of multiple available amounts of the resource on the second cluster at multiple timestamps during a predefined time duration. In some embodiments, the cluster resource data may also include one or more resource attributes of the resource of the second cluster. For example, the cluster resource data may indicate a type of storage device (e.g., SSD, HDD, etc.) that provides the storage resource of the second cluster, a type of network connection (e.g., 5G connection, VPN connection, etc.) that provides the network resource of the second cluster, etc. In some embodiments, the cluster resource data may also include other types of data related to the resources of the second cluster in telemetry data 516 of the second cluster described herein.

In some embodiments, the operation metrics of the second cluster may include various metrics associated with the operations of the second cluster. The operation metrics of the second cluster may include one or more current operation metrics of the second cluster, one or more historical operation metrics of the second cluster, and/or one or more average operation metrics of the second cluster.

The current operation metrics of the second cluster may describe a current operation condition of the second cluster at a current timestamp. For example, the current operation metrics may include a current response time of the second cluster at the current timestamp, a current I/O latency of the second cluster at a current timestamp, a current network latency of the second cluster at a current timestamp, a number of requests being received by the second cluster during a current time window (the current time window may have a predefined duration and may have an end point matching the current timestamp), a number of requests being processed by the second cluster during the current time window, etc. Other types of current operation metrics of the second cluster are also possible and contemplated.

The historical operation metrics of the second cluster may describe a historical operation condition of the second cluster at a past timestamp. For example, the historical operation metrics may include a historical response time of the second cluster at the past timestamp, a historical I/O latency of the second cluster at the past timestamp, a historical network latency of the second cluster at the past timestamp, a number of requests being received by the second cluster during a past time window (the past time window may have a predefined duration and may have an end point preceding the current timestamp), a number of requests being processed by the second cluster during the past time window, etc. Other types of historical operation metrics of the second cluster are also possible and contemplated. In some embodiments, the operation metrics of the second cluster may include the historical operation metrics of the second cluster at multiple past timestamps.

The average operation metrics of the second cluster may describe an average operation condition of the second cluster. For example, the average operation metrics may include an average response time of the second cluster, an average I/O latency of the second cluster, an average network latency of the second cluster, an average number of requests being received by the second cluster during a predefined time duration, and/or an average number of requests being processed by the second cluster during the predefined time duration. In some embodiments, the average operation metrics may also include an average uptime of the second cluster, an average downtime of the second cluster, and/or a request pattern in which the requests arrive at the second cluster (e.g., peak hour, heavy-traffic time window, light-traffic time window, etc.). Other types of average operation metrics of the second cluster are also possible and contemplated. In some embodiments, an average operation metric of the second cluster may be an average value of one or more corresponding historical operation metrics of the second cluster at one or more past timestamps. Additionally or alternatively, the average operation metric of the second cluster may be an average value of a corresponding current operation metric of the second cluster at the current timestamp and one or more corresponding historical operation metrics of the second cluster at one or more past timestamps.

In some embodiments, in addition to the current operation metrics of the second cluster, the historical operation metrics of the second cluster, and/or the average operation metrics of the second cluster, the operation metrics of the second cluster may also include other types of data related to the operations of the second cluster in telemetry data 516 of the second cluster described herein.

In some embodiments, the cluster attributes of the second cluster may describe various aspects of the second cluster. For example, the cluster attributes may indicate a geographic region of the second cluster, a number of nodes 420 in the second cluster, a number of containerized applications operated on each node 420 of the second cluster, a security policy implemented on the second cluster, a backup policy implemented on the second cluster, etc. Other types of cluster attributes of the second cluster are also possible and contemplated. In some embodiments, the cluster attributes of the second cluster may also include other cluster attributes included in cluster attribute data 520 of the second cluster described herein.

In some embodiments, controller 502 may receive the cluster profile of each second cluster from agent 506 (also referred to as the cluster agent) of the second cluster. For example, the cluster agent of the second cluster may aggregate various types of data (e.g., the cluster resource data, the operation metrics, the cluster attributes, etc.) of the second cluster into the cluster profile of the second cluster, and transmit the cluster profile of the second cluster to controller 502. In some embodiments, cluster agent 506 may update the cluster profile of the second cluster at a predefined interval (e.g., every hour) and transmit the updated cluster profile of the second cluster to controller 502. Thus, controller 502 may remain up to date on various aspects (e.g., cluster resources, operation metrics, cluster attributes, etc.) of the second cluster.

In some embodiments, after generating the disaster recovery profile of containerized application 522 and determining the cluster profile of each second cluster distinct from the first cluster on which containerized application 522 is currently operated, controller 502 may identify a particular cluster to be the disaster recovery cluster of containerized application 522 based on the disaster recovery profile of containerized application 522 and the cluster profile of each second cluster. For example, controller 502 may evaluate the cluster profile of each second cluster against the disaster recovery profile of containerized application 522, and compute a cluster score for each second cluster based on the evaluating. Controller 502 may then identify from the second clusters a particular cluster to be the disaster recovery cluster of containerized application 522 based on the cluster score of each second cluster.

In some embodiments, to evaluate the cluster profile of a second cluster against the disaster recovery profile of containerized application 522, for each requirement in the disaster recovery profile of containerized application 522, controller 502 may determine whether a corresponding aspect of the second cluster satisfies the requirement and assign a score value to the second cluster for the requirement accordingly.

As a first example, for a resource requirement associated with a resource (e.g., storage resource) in the disaster recovery profile of containerized application 522, controller 502 may determine whether a current available amount of the resource on the second cluster satisfies (e.g., is higher than) a required or desired amount of the resource specified in the resource requirement. Controller 502 may also determine whether an average available amount of the resource on the second cluster satisfies (e.g., is higher than) the required or desired amount of the resource specified in the resource requirement. In some embodiments, the average available amount of the resource on the second cluster may be computed based at least on one or more historical available amounts of the resource on the second cluster as described herein.

In some embodiments, if the current available amount of the resource on the second cluster and the average available amount of the resource on the second cluster satisfy the required or desired amount of the resource specified in the resource requirement, controller 502 may compute a first ratio between the current available amount of the resource on the second cluster and the required or desired amount of the resource specified in the resource requirement. Controller 502 may also compute a second ratio between the average available amount of the resource on the second cluster and the required or desired amount of the resource specified in the resource requirement. Controller 502 may then assign to the second cluster a score value for the resource requirement that is proportional (e.g., directly proportional) to the first ratio and the second ratio.

On the other hand, if the current available amount of the resource on the second cluster or the average available amount of the resource on the second cluster does not satisfy the required or desired amount of the resource specified in the resource requirement, controller 502 may determine that the second cluster does not have a sufficient amount of the resource to satisfy the resource requirement. In this case, controller 502 may assign to the second cluster a default score value (e.g., zero) for the resource requirement. Other implementations to determine a score value of the second cluster for the resource requirement are also possible and contemplated.

Thus, as illustrated in the first example, controller 502 may take into consideration not only the current available amount of the resource on the second cluster, but also the average available amount of the resource on the second cluster when identifying a particular cluster to be the disaster recovery cluster of containerized application 522 as described above. This implementation is advantageous, because it increases a likelihood that the particular cluster being selected may have a sufficient amount of the resource to operate containerized application 522 at the time the particular cluster takes over containerized application 522 from the first cluster.

As a second example, an operation requirement in the disaster recovery profile of containerized application 522 may specify a response time threshold of containerized application 522. For this operation requirement, controller 502 may determine whether a current response time of the second cluster satisfies (e.g., is lower than) the response time threshold specified in the operation requirement. Controller 502 may also determine whether an average response time of the second cluster satisfies (e.g., is lower than) the response time threshold specified in the operation requirement.

In some embodiments, if the current response time and the average response time of the second cluster satisfy the response time threshold specified in the operation requirement, controller 502 may assign to the second cluster a score value for the operation requirement that is proportional (e.g., inversely proportional) to the current response time and the average response time of the second cluster. On the other hand, if the current response time or the average response time of the second cluster does not satisfy the response time threshold specified in the operation requirement, controller 502 may determine that the second cluster does not meet the response time requirement of containerized application 522. In this case, controller 502 may assign to the second cluster a default score value (e.g., zero) for the operation requirement. Other implementations to determine a score value of the second cluster for the operation requirement are also possible and contemplated.

As a third example, an operation requirement in the disaster recovery profile of containerized application 522 may specify a threshold number of requests to be processed by containerized application 522 during a predefined time duration. For this operation requirement, controller 502 may determine whether an average number of requests being processed by the second cluster during the predefined time duration satisfies (e.g., is higher than) the threshold number of requests specified in the operation requirement. The average number of requests being processed by the second cluster during the predefined time duration may be referred to as the average number of requests associated with the second cluster.

In some embodiments, if the average number of requests associated with the second cluster satisfies the threshold number of requests specified in the operation requirement, controller 502 may assign to the second cluster a score value for the operation requirement that is proportional (e.g., directly proportional) to an absolute difference between the average number of requests associated with the second cluster and the threshold number of requests specified in the operation requirement. On the other hand, if the average number of requests associated with the second cluster does not satisfy the threshold number of requests specified in the operation requirement, controller 502 may determine that the second cluster usually processes fewer requests than the number of requests expected to be handled by containerized application 522. In this case, controller 502 may assign to the second cluster a default score value (e.g., zero) for the operation requirement. Other implementations to determine a score value of the second cluster for the operation requirement are also possible and contemplated.

Thus, as illustrated in the second example and the third example, controller 502 may take into consideration not only the current operation metrics but also the average operation metrics of the second cluster when identifying a particular cluster to be the disaster recovery cluster of containerized application 522 as described above. This implementation is advantageous, because it increases a likelihood that the particular cluster being selected may be in an operation condition that satisfies the operation requirements of containerized application 522 at the time the particular cluster takes over containerized application 522 from the first cluster.

As a fourth example, for a cluster requirement in the disaster recovery profile of containerized application 522, controller 502 may determine whether a corresponding cluster attribute of the second cluster satisfies the cluster requirement. In some embodiments, if the corresponding cluster attribute of the second cluster satisfies the cluster requirement, controller 502 may assign to the second cluster a default score value (e.g., one) for the resource requirement. On the other hand, if the corresponding cluster attribute of the second cluster does not satisfy the cluster requirement, controller 502 may assign to the second cluster another default score value (e.g., zero) for the resource requirement. Other implementations for determining a score value of the second cluster for the cluster requirement are also possible and contemplated.

In some embodiments, controller 502 may assign different weight values for different requirements in the disaster recovery profile of containerized application 522. For example, containerized application 522 may be implemented to operate a website and therefore containerized application 522 may have a significant amount of incoming and outgoing network traffic. In this case, the requirements that are related to the network aspects (e.g., the network resource requirement, the network latency threshold, etc.) of containerized application 522 may have higher weight values as compared to other requirements in the disaster recovery profile of containerized application 522.

In some embodiments, after the score values of the second cluster for various requirements in the disaster recovery profile of containerized application 522 are determined, controller 502 may compute a cluster score for the second cluster based on the score value of the second cluster for each requirement and the corresponding weight value of the requirement. For example, controller 502 may compute a weighted average of the score values of the second cluster for the requirements in the disaster recovery profile of containerized application 522, and determine the cluster score of the second cluster to be the weighted average of the score values of the second cluster. To compute the weighted average of the score values of the second cluster, controller 502 may calculate a product of each score value of the second cluster for a requirement in the disaster recovery profile of containerized application 522 and a corresponding weight value of the requirement. Controller 502 may then calculate a sum of all the products divided by a sum of all the weight values to be the weighted average of the score values of the second cluster.

In some embodiments, controller 502 may use a machine learning model to determine a cluster score for each second cluster. For example, controller 502 may input into the machine learning model the cluster profile of the second cluster and the disaster recovery profile of containerized application 522. The machine learning model may then output a cluster score of the second cluster based on the input.

In some embodiments, the machine learning model may be implemented using one or more supervised and/or unsupervised learning algorithms. For example, the machine learning model may be implemented in the form of a linear regression model, a logistic regression model, a Support Vector Machine (SVM) model, and/or other learning models. Additionally or alternatively, the machine learning model may be implemented in the form of a neural network including an input layer, one or more hidden layers, and an output layer. Non-limiting examples of the neural network include, but are not limited to, Convolutional Neural Network (CNN), Recurrent Neural Network (RNN), Long Short-Term Memory (LSTM) neural network, etc. Other learning model architectures for implementing the machine learning model are also possible and contemplated.

In some embodiments, to compute the cluster score for the second cluster, the machine learning model may be subjected to a training process performed by a training system. The training system may be implemented by controller 502, cluster 504, and/or another computing device. An example training system 1100 for training the machine learning model is illustrated in FIG. 11.

Figure 11:
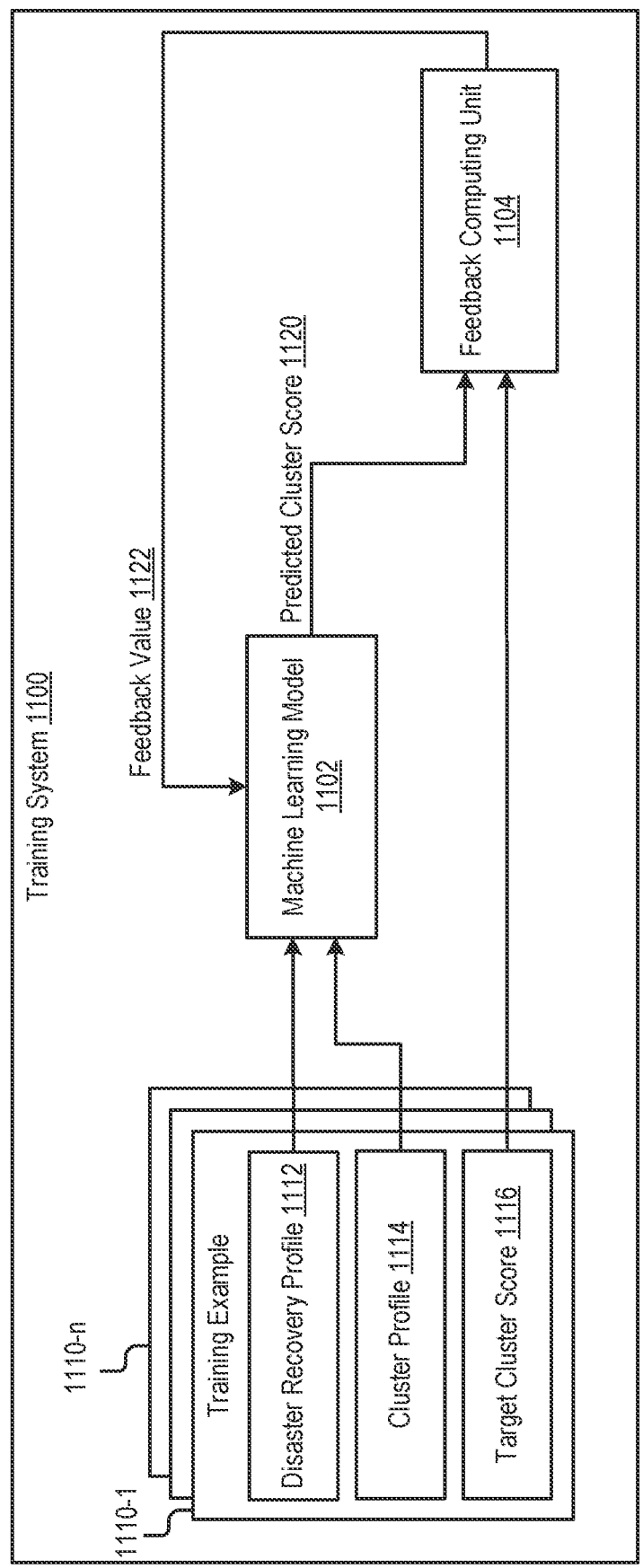
FIG. 11 depicts an example training stage of a machine learning model in accordance with some embodiments of the present disclosure.

As depicted in FIG. 11, training system 1100 may include the machine learning model such as a machine learning model 1102 and a feedback computing unit 1104. In some embodiments, machine learning model 1102 may be trained with a plurality of training examples 1110-1 . . . 1110-$n$ (commonly referred to herein as training examples 1110). Each training example 1110 may correspond to a containerized application 522 and a cluster 504. As depicted in FIG. 11, each training example 1110 may include a disaster recovery profile 1112 of containerized application 522, a cluster profile 1114 of cluster 504, and a target cluster score 1116 of cluster 504. Target cluster score 1116 of cluster 504 may indicate an actual level at which cluster 504 satisfies the requirements of containerized application 522 and may be considered a ground truth. In some embodiments, target cluster score 1116 of cluster 504 may be computed in a manner similar to the manner in which controller 502 computes the cluster score for the second cluster described above. Other implementations for computing target cluster score 1116 for cluster 504 are also possible and contemplated.

In some embodiments, to train machine learning model 1102 with a training example 1110 in a training cycle, training system 1100 may use machine learning model 1102 to compute a predicted cluster score 1120 for cluster 504 in training example 1110. Predicted cluster score 1120 may indicate a level at which cluster 504 satisfies the requirements of containerized application 522 as predicted by machine learning model 1102. As depicted in FIG. 11, training system 1100 may provide disaster recovery profile 1112 of containerized application 522 and cluster profile 1114 of cluster 504 to machine learning model 1102. Accordingly, machine learning model 1102 may compute predicted cluster score 1120 based on the data describing the requirements of containerized application 522 in disaster recovery profile 1112 and the data describing cluster 504 in cluster profile 1114.

In some embodiments, training system 1100 may compute a feedback value 1122 based on predicted cluster score 1120 and target cluster score 1116. For example, as depicted in FIG. 11, training system 1100 may input predicted cluster score 1120 computed by machine learning model 1102 and target cluster score 1116 included in training example 1110 into feedback computing unit 1104. As described herein, predicted cluster score 1120 may indicate a level at which cluster 504 satisfies the requirements of containerized application 522 as predicted by machine learning model 1102, and target cluster score 1116 may indicate an actual level at which cluster 504 satisfies the requirements of containerized application 522 as specified in training example 1110.

In some embodiments, feedback computing unit 1104 may compute feedback value 1122 based on predicted cluster score 1120 and target cluster score 1116. For example, feedback value 1122 may be a difference value or a mean squared error between predicted cluster score 1120 predicted by machine learning model 1102 and target cluster score 1116 included in training example 1110. Other implementations for computing feedback value 1122 are also possible and contemplated.

In some embodiments, training system 1100 may adjust one or more model parameters of machine learning model 1102 based on feedback value 1122. For example, as depicted in FIG. 11, training system 1100 may back-propagate feedback value 1122 computed by feedback computing unit 1104 to machine learning model 1102, and adjust the model parameters of machine learning model 1102 based on feedback value 1122. For example, training system 1100 may adjust one or more values assigned to one or more coefficients of machine learning model 1102 based on feedback value 1122.

In some embodiments, training system 1100 may determine whether the model parameters of machine learning model 1102 have been sufficiently adjusted. For example, training system 1100 may determine that machine learning model 1102 has been subjected to a predetermined number of training cycles. Therefore, training system 1100 may determine that machine learning model 1102 has been trained with a predetermined number of training examples, and thus determine that the model parameters of machine learning model 1102 have been sufficiently adjusted.

Additionally or alternatively, training system 1100 may determine that feedback value 1122 satisfies a predetermined feedback value threshold, and thus determine that the model parameters of machine learning model 1102 have been sufficiently adjusted.

Additionally or alternatively, training system 1100 may determine that feedback value 1122 remains substantially unchanged for a predetermined number of training cycles (e.g., a difference between the feedback values computed in sequential training cycles satisfying a difference threshold), and thus determine that the model parameters of machine learning model 1102 have been sufficiently adjusted.

In some embodiments, based on the determination that the model parameters of machine learning model 1102 have been sufficiently adjusted, training system 1100 may determine that the training process of machine learning model 1102 is completed. Training system 1100 may then select the current values of the model parameters to be the values of the model parameters in trained machine learning model 1102.

In some embodiments, once machine learning model 1102 is sufficiently trained, machine learning model 1102 may be used to compute a cluster score for a second cluster. As described herein, controller 502 may input the disaster recovery profile of containerized application 522 and the cluster profile of the second cluster into machine learning model 1102, and machine learning model 1102 may generate the cluster score for the second cluster that indicates a level at which the second cluster satisfies the requirements of containerized application 522 in the disaster recovery profile of containerized application 522. Other implementations for determining the cluster score of the second cluster are also possible and contemplated.

In some embodiments, controller 502 may identify from the second clusters a particular cluster to be the disaster recovery cluster for containerized application 522 based on the cluster score of each second cluster. For example, controller 502 may identify the particular cluster to be a second cluster that has a highest cluster score among the second clusters and therefore most satisfies the requirements of containerized application 522 in the disaster recovery profile of containerized application 522 as compared to other second clusters. Additionally or alternatively, controller 502 may identify one or more second clusters that have their cluster score higher than a cluster score threshold and therefore satisfy the requirements of containerized application 522 in the disaster recovery profile of containerized application 522 at least to a certain level. In this case, controller 502 may present a list of the one or more second clusters to a user (e.g., an authorized manager) as a recommendation of disaster recovery clusters for containerized application 522. The user may provide a user input selecting a second cluster among the one or more second clusters, and controller 502 may identify the selected second cluster to be the particular cluster for containerized application 522.

In some embodiments, controller 502 may determine that none of the second clusters satisfies the disaster recovery profile of containerized application 522. For example, controller 502 may determine that the cluster score of each second cluster does not satisfy (e.g., is lower than) the cluster score threshold and therefore does not satisfy the requirements of containerized application 522 in the disaster recovery profile of containerized application 522. In some embodiments, in response to such a determination, controller 502 may create an additional second cluster that satisfies the disaster recovery profile of containerized application 522. For example, the additional second cluster may have resources, operation metrics, and cluster attributes respectively satisfying the resource requirements, the operation requirements, and the cluster requirements specified in the disaster recovery profile of containerized application 522. In some embodiments, controller 502 may identify the additional second cluster that is newly created and satisfies the requirements of containerized application 522 in the disaster recovery profile of containerized application 522 to be the particular cluster for containerized application 522.

In some embodiments, once the particular cluster is identified, controller 502 may assign the particular cluster to be the disaster recovery cluster for containerized application 522. When the particular cluster is selected to be the disaster recovery cluster of containerized application 522, the first cluster on which containerized application 522 is currently operated may transmit to the disaster recovery cluster (e.g., the particular cluster) various information (e.g., application data, runtime data, configuration settings, etc.) associated with a first instance of containerized application 522 on the first cluster. The disaster recovery cluster may use this information to instantiate a second instance of containerized application 522 on the disaster recovery cluster that is identical to the first instance of containerized application 522 on the first cluster as described herein. In some embodiments, while the second instance of containerized application 522 may be ready to handle various requests associated with containerized application 522, the second instance of containerized application 522 may remain passive or inactive on the disaster recovery cluster as a standby backup instance of the containerized application 522. For example, the second instance of containerized application 522 on the disaster recovery cluster may not communicate with user devices and may not process requests associated with containerized application 522 while the first cluster is still up and running.

In some embodiments, the disaster recovery cluster may also be configured to detect an operation disruption of the first cluster. For example, the disaster recovery cluster and the first cluster may establish a communication channel (also referred to as a heartbeat channel) therebetween. In some embodiments, the first cluster may periodically transmit a data packet (also referred to as a heartbeat) to the disaster recovery cluster via the heartbeat channel at a predefined interval (e.g., every 5 s). The first cluster may also communicate other information (e.g., configurations, metadata, etc.) of the first instance of containerized application 522 on the first cluster to the disaster recovery cluster via the heartbeat channel, thereby keeping the operation condition of the second instance of containerized application 522 on the disaster recovery cluster similar to or identical to the operation condition of the first instance of containerized application 522 on the first cluster.

In some embodiments, the disaster recovery cluster may determine that the disaster recovery cluster did not receive a predefined number of consecutive heartbeats from the first cluster via the heartbeat channel. Because the predefined number of consecutive heartbeats are lost, the disaster recovery cluster may determine that the first cluster fails to send the heartbeat the predefined number of times and therefore determine that the first cluster may be subjected to an operation disruption. In some embodiments, to verify this determination, the disaster recovery cluster may initiate a ping request to the first cluster. If the first cluster does not respond to the ping request from the disaster recovery cluster, the disaster recovery cluster may verify that the first cluster is subjected to an operation disruption. As described herein, the operation disruption of the first cluster may be caused by a disaster such as a natural disaster, a power outage, a software and/or hardware failure, a security attack, and/or other types of disaster event.

In some embodiments, in response to determining that the first cluster is subjected to an operation disruption, the disaster recovery cluster may take over the task of operating containerized application 522 from the first cluster. For example, the disaster recovery cluster may switch the second instance of containerized application 522 on the disaster recovery cluster to the active mode. Upon being switched to the active mode, the second instance of containerized application 522 on the disaster recovery cluster may take over the processing of the workloads that the first instance of containerized application 522 on the first cluster has not yet completed. Incoming requests of containerized application 522 may also be directed to and handled by the second instance of containerized application 522 on the disaster recovery cluster.

Thus, as described above, controller 502 may identify the disaster recovery cluster for containerized application 522 based on the disaster recovery profile of containerized application 522, which is system-generated and not user-defined. As described herein, by collaborating with the storage agent that can obtain comprehensive information about operations of a containerized application 522 from different infrastructure layers at different levels, controller 502 may generate a disaster recovery profile and identify a disaster recovery cluster based on the disaster recovery profile for any containerized application 522, regardless of the application provider or service provider, the configuration setting, the hardware structure, and/or other application aspects of containerized application 522.

In some embodiments, in addition to or instead of using the disaster recovery profile of containerized application 522, controller 502 may identify the disaster recovery cluster for containerized application 522 based on a disaster recovery policy of containerized application 522. In some embodiments, different from the disaster recovery profile of containerized application 522 that is generated by controller 502, the disaster recovery policy of containerized application 522 may be specified by a user such as an authorized manager or an authorized operator associated with containerized application 522.

Figure 12:
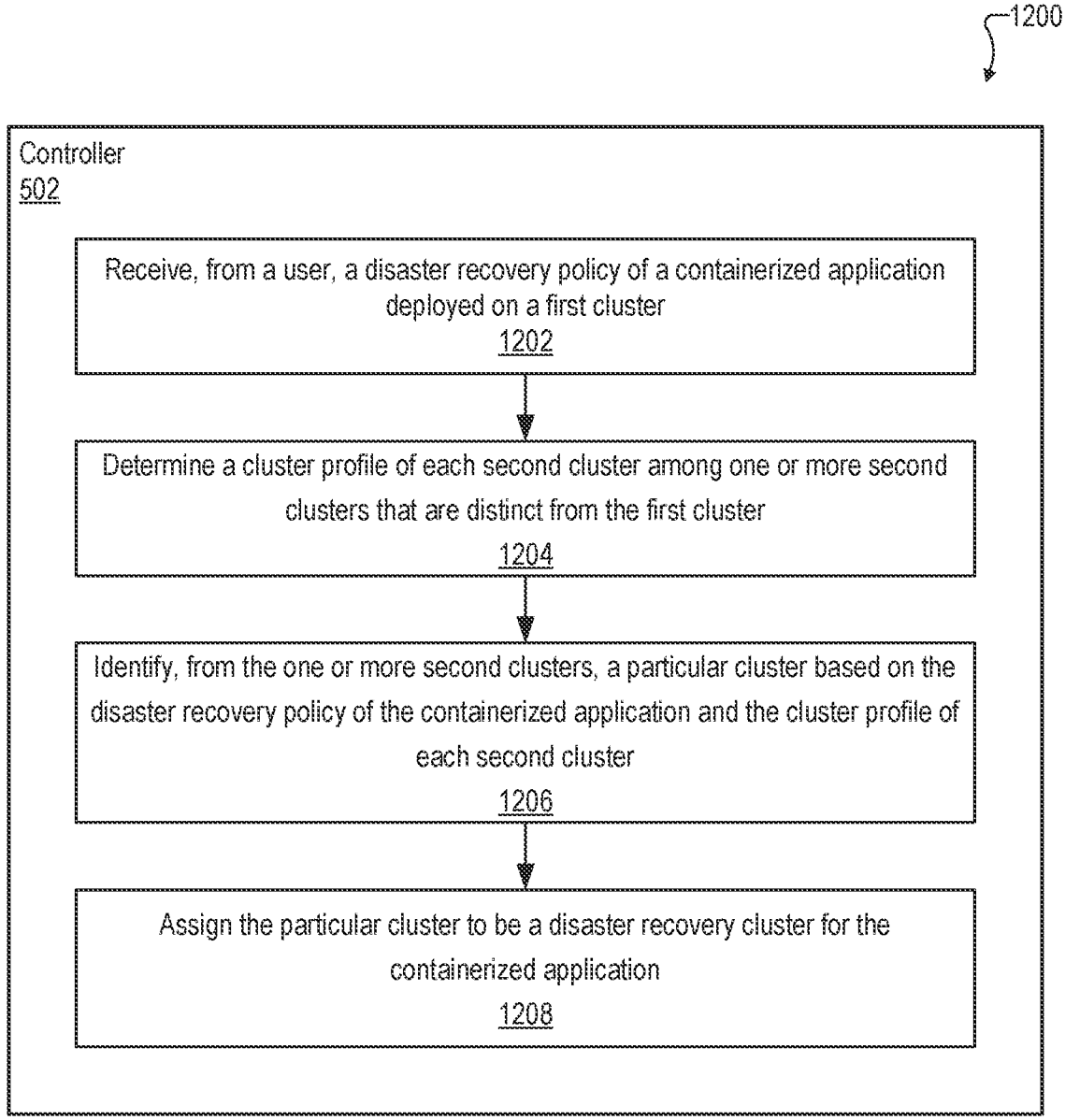
FIG. 12 depicts a flow diagram illustrating another example method for identifying a disaster recovery cluster for a containerized application in accordance with some embodiments of the present disclosure.

To illustrate, FIG. 12 shows an exemplary method 1200 for receiving a disaster recovery policy of containerized application 522 provided by a user and objectively identifying a disaster recovery cluster for containerized application 522 based on the disaster recovery policy of containerized application 522. Method 1200 may be performed by controller 502 and/or by any implementation thereof. Method 1200 may be used alone or in combination with other methods described herein.

At operation 1202, controller 502 may receive from a user (e.g., an authorized manager) a disaster recovery policy of containerized application 522 deployed on a first cluster in the plurality of clusters 504. Similar to the disaster recovery profile of containerized application 522 described herein, the disaster recovery policy of containerized application 522 may include one or more requirements (e.g., resource requirements, operation requirements, cluster requirements, etc.) that are required or desired to be satisfied in order for a disaster recovery cluster to successfully take over the operating of containerized application 522 from the first cluster when the first cluster is subjected to an operation disruption. However, different from the disaster recovery profile of containerized application 522, the one or more requirements in the disaster recovery policy of containerized application 522 may not be determined by a system component such as controller 502 and/or the storage agent of the first cluster, but may be specified by the user instead. In other words, the one or more requirements in the disaster recovery policy of containerized application 522 may be user-defined and not system-generated.

At operation 1204, controller 502 may determine a cluster profile of each second cluster among one or more second clusters that are distinct from the first cluster in the plurality of clusters 504. For example, for each second cluster distinct from the first cluster, controller 502 may receive the cluster profile describing various aspects of the second cluster from agent 506 associated with the second cluster. As described herein, the cluster profile of the second cluster may include cluster resource data describing one or more resources (e.g., a computing resource, a storage resource, a network resource, etc.) of the second cluster, one or more operations metrics of the second cluster, and/or one or more cluster attributes of the second cluster. Other types of data in the cluster profile of the second cluster are also possible and contemplated.

At operation 1206, controller 502 may identify a particular cluster based on the disaster recovery policy of containerized application 522 and the cluster profile of each second cluster. For example, controller 502 may evaluate the cluster profile of each second cluster against the disaster recovery policy of containerized application 522, and compute a cluster score for each second cluster based on the evaluating. Thus, the cluster score of each second cluster may indicate a level at which the cluster profile of the second cluster satisfies the disaster recovery policy of containerized application 522, and therefore indicate a level at which the second cluster satisfies the requirements of containerized application 522 that are specified by the user. In some embodiments, controller 502 may compute the cluster score for each second cluster not only based on the disaster recovery policy of containerized application 522 that is provided by the user, but also based on the disaster recovery profile of containerized application 522 that is generated by controller 502.

In some embodiments, controller 502 may identify the particular cluster for containerized application 522 based on the cluster score of each second cluster. For example, controller 502 may identify the particular cluster to be a second cluster that has a highest cluster score among the second clusters as described herein. Additionally or alternatively, controller 502 may identify one or more second clusters that have their cluster score satisfying (e.g., higher than) a cluster score threshold, and present a list of the one or more second clusters to the user as a recommendation of disaster recovery clusters for containerized application 522. In some embodiments, controller 502 may receive from the user a user input selecting a second cluster among the one or more second clusters, and identify the selected second cluster to be the particular cluster for containerized application 522 as described herein.

At operation 1208, controller 502 may assign the particular cluster to be a disaster recovery cluster for containerized application 522. As the disaster recovery cluster of containerized application 522, the particular cluster may be configured to detect an operation disruption of the first cluster as described herein. In response to detecting an operation disruption of the first cluster, the particular cluster may take over the operating of containerized application 522 from the first cluster. For example, the particular cluster may switch an instance of containerized application 522 on the particular cluster to the active mode. After being switched to the active mode, the instance of containerized application 522 on the particular cluster may start processing uncompleted workloads and handling incoming requests of containerized application 522 as described herein.

Thus, controller 502 may identify a particular cluster to be the disaster recovery cluster for containerized application 522 based on the disaster recovery policy of containerized application 522. As described herein, the disaster recovery policy may include one or more requirements of containerized application 522 that are required or desired to be satisfied so that the disaster recovery cluster may successfully take over the operating of containerized application 522 from the first cluster where containerized application 522 is currently operated. As described herein, the one or more requirements of containerized application 522 in the disaster recovery policy of containerized application 522 may be specified by the user. For example, the disaster recovery policy may include one or more resource requirements of containerized application 522, one or more operation requirements of containerized application 522, and/or one or more cluster requirements of containerized application 522 that are specified by the user. Other types of requirements are also possible and contemplated.

In some embodiments, the requirements of containerized application 522 in the disaster recovery policy of containerized application 522 that are specified by the user may be similar to the requirements of containerized application 522 in the disaster recovery profile of containerized application 522.

As an example, a resource requirement of containerized application 522 in the disaster recovery policy may correspond to a particular resource (e.g., a computing resource, a storage resource, a network resource, etc.) and may indicate a required or desired amount of the resource to operate containerized application 522 as specified by the user. Additionally or alternatively, the resource requirement may indicate a required or desired attribute of the resource being used for containerized application 522 as specified by the user.

As another example, an operation requirement of containerized application 522 in the disaster recovery policy may indicate a required or desired aspect (e.g., a metric threshold, a configuration, etc.) associated with the operations of containerized application 522 as specified by the user. For example, the operation requirements in the disaster recovery policy of containerized application 522 may indicate one or more of a response time threshold of containerized application 522 as specified by the user, a network latency threshold of containerized application 522 as specified by the user, an uptime threshold of containerized application 522 as specified by the user, a downtime threshold of containerized application 522 as specified by the user, a threshold number of requests to be processed by containerized application 522 during a predefined time duration as specified by the user, and/or other types of operation requirements of containerized application 522 that are specified by the user.

As another example, a cluster requirement of containerized application 522 in the disaster recovery policy may be specified by the user and may indicate a required or desired attribute of a cluster 504 to operate containerized application 522 as the disaster recovery cluster of containerized application 522. For example, the cluster requirements in the disaster recovery policy of containerized application 522 may indicate an isolation level of containerized application 522 within cluster 504 as specified by the user (e.g., the user may specify that containerized application 522 is implemented on a node 420 of cluster 504 without other containerized applications being implemented on the same node 420), an attribute of a hardware component associated with cluster 504 as specified by the user (e.g., the user may specify that cluster 504 includes a specific type of hardware device such as SSD, MDRAM, GPU, etc.), a geographic region of cluster 504 as specified by the user, and/or other types of cluster requirements of containerized application 522 that are specified by the user.

In some embodiments, to receive the disaster recovery policy specified by the user for containerized application 522, controller 502 may present to the user a user interface through which one or more requirements of containerized application 522 may be input to establish the disaster recovery policy for containerized application 522. Accordingly, controller 502 may receive the one or more requirements (e.g., the resource requirements, the operation requirements, the cluster requirements, and/or other requirements) of containerized application 522 from the user via user interface.

Additionally or alternatively, controller 502 may generate the disaster recovery profile of containerized application 522 and use the disaster recovery profile of containerized application 522 to facilitate the user in providing the disaster recovery policy of containerized application 522 to controller 502. For example, controller 502 may collaborate with the storage agent of the first cluster on which containerized application 522 is currently operated to generate the disaster recovery profile of containerized application 522. As described herein, controller 502 may receive the application information (e.g., the operation metadata and/or the requirements of containerized application 522 that are determined based on the operation metadata) of containerized application 522 from the storage agent of the first cluster, and generate the disaster recovery profile of containerized application 522 based on the application information. For example, controller 502 may obtain the requirements of containerized application 522 included in the application information of containerized application 522 and/or determine the requirements of containerized application 522 based on the operation metadata in the application information of containerized application 522 as described herein. Controller 502 may then include these requirements of containerized application 522 in the disaster recovery profile of containerized application 522.

In some embodiments, controller 502 may present to the user a subset of the one or more requirements in the disaster recovery profile of containerized application 522. For example, controller 502 may present to the user the requirements in the disaster recovery profile of containerized application 522 that are familiar to the user and may not present to the user other requirements in the disaster recovery profile of containerized application 522. For example, among the requirements in the disaster recovery profile of containerized application 522, controller 502 may present to the user the requirements indicating the required amount of a resource being used for containerized application 522, the response time threshold of containerized application 522, the downtime threshold of containerized application 522, and/or other requirements in the disaster recovery profile of containerized application 522 that are familiar to the user. In contrast, the requirements in the disaster recovery profile of containerized application 522 that are unfamiliar to the user may not be presented. In some embodiments, controller 502 may monitor user actions of the user to identify the one or more aspects of containerized application 522 with which the user usually interacts, and present to the user the requirements corresponding to these aspects and included in the disaster recovery profile of containerized application 522.

In some embodiments, controller 502 may receive from the user a user input that adjusts the subset of the one or more requirements in the disaster recovery profile of containerized application 522 to establish the disaster recovery policy of containerized application 522. For example, the user may provide the user input to increase the required amount of a resource being used for containerized application 522, decrease the downtime threshold of containerized application 522, approve a requirement to be included in the disaster recovery policy of containerized application 522, exclude a requirement from the disaster recovery policy of containerized application 522, etc. Thus, the user may customize the subset of the one or more requirements in the disaster recovery profile of containerized application 522 presented to the user to establish the disaster recovery policy of containerized application 522. In some embodiments, controller 502 may present all requirements in the disaster recovery profile of containerized application 522 to the user for consideration, and the user may approve, adjust, and/or remove these requirements as desired to establish the disaster recovery policy of containerized application 522 in the manner described above.

In some embodiments, controller 502 may also remove from the disaster recovery profile of containerized application 522 the original requirements that are presented to the user for consideration. Accordingly, the original requirements of containerized application 522 that are approved, removed, and/or adjusted by the user when establishing the disaster recovery policy of containerized application 522 based on the disaster recovery profile of containerized application 522 may no longer be included in the disaster recovery profile of containerized application 522. As a result, a conflict between the requirements of containerized application 522 in the disaster recovery profile of containerized application 522 and the requirements of containerized application 522 in the disaster recovery policy of containerized application 522 may be avoided.

In some embodiments, in addition to considering the requirements presented to the user based on the disaster recovery profile of containerized application 522, the user may also specify one or more additional requirements for containerized application 522 to establish the disaster recovery policy of containerized application 522. For example, controller 502 may receive from the user an additional user input specifying the one or more additional requirements (e.g., resource requirements, operation requirements, cluster requirements, and/or other requirements) of containerized application 522 to be included in the disaster recovery policy of containerized application 522.

Thus, the disaster recovery policy of containerized application 522 may include one or more requirements (e.g., resource requirements, operation requirements, cluster requirements, and/or other requirements) of containerized application 522 that are approved, customized, and/or created by the user. Accordingly, the disaster recovery policy of containerized application 522 may be considered user-defined and not system-generated.

In some embodiments, controller 502 may also determine a cluster profile for each second cluster distinct from the first cluster on which containerized application 522 is currently operated. As described herein, the cluster profile of each second cluster may describe various aspects of the second cluster. In some embodiments, the cluster profile of a second cluster may include the cluster resource data of the second cluster, the operation metrics of the second cluster, and/or the cluster attributes of the second cluster as described herein. The implementations for determining the cluster profile of the second cluster are described in detail herein and will not be repeated for brevity.

In some embodiments, after receiving the disaster recovery policy of containerized application 522 from the user and determining the cluster profile of each second cluster distinct from the first cluster on which containerized application 522 is currently operated, controller 502 may identify a particular cluster to be the disaster recovery cluster of containerized application 522 based on the disaster recovery policy of containerized application 522 and the cluster profile of each second cluster. For example, controller 502 may evaluate the cluster profile of each second cluster against the disaster recovery policy of containerized application 522, and compute a cluster score for each second cluster based on the evaluation. In some embodiments, controller 502 may identify from the second clusters a particular cluster to be the disaster recovery cluster of containerized application 522 based on the cluster score of each second cluster.

In some embodiments, the manner in which controller 502 may evaluate the cluster profile of a second cluster against the disaster recovery policy of containerized application 522 and compute a cluster score for the second cluster accordingly may be similar to the manner in which controller 502 evaluates the cluster profile of a second cluster against the disaster recovery profile of containerized application 522 and computes a cluster score for the second cluster accordingly.

For example, to evaluate the cluster profile of a second cluster against the disaster recovery policy of containerized application 522, for each requirement in the disaster recovery policy of containerized application 522, controller 502 may determine whether a corresponding aspect of the second cluster satisfies the requirement and assign a score value to the second cluster for the requirement based on such determination. The corresponding aspect of the second cluster may be a current metric (e.g., a resource amount, an operation metric, etc.) of the second cluster, a historical metric of the second cluster, and/or an average metric of the second cluster as described herein. In some embodiments, similar to the requirements in the disaster recovery profile of containerized application 522, controller 502 may assign different weight values for different requirements in the disaster recovery policy of containerized application 522. Controller 502 may then compute a cluster score for the second cluster based on the score value of the second cluster for each requirement in the disaster recovery policy of containerized application 522 and the corresponding weight value of the requirement. For example, controller 502 may compute a weighted average of the score values of the second cluster for the requirements in the disaster recovery policy of containerized application 522, and determine the cluster score of the second cluster to be the weighted average of the score values of the second cluster.

In some embodiments, controller 502 may use a machine learning model such as machine learning model 1102 to determine the cluster score for each second cluster based on the disaster recovery policy of containerized application 522. For example, controller 502 may input into machine learning model 1102 the cluster profile of the second cluster and the disaster recovery policy of containerized application 522. Machine learning model 1102 may then output the cluster score for the second cluster based on the input. Thus, after being trained with training examples 1110 in which each training example 1110 may include a disaster recovery profile 1112 of a containerized application 522 that is system-generated, machine learning model 1102 may be used to compute the cluster score for the second cluster with an input including the disaster recovery policy of containerized application 522 that is not system-generated but user-defined. In some embodiments, machine learning model 1102 may be trained with one or more training examples including the disaster recovery policy of containerized application 522 instead of or in addition to the disaster recovery profile of containerized application 522 in a manner similar to the training manner described herein.

In some embodiments, controller 502 may identify from the second clusters a particular cluster to be the disaster recovery cluster for containerized application 522 based on the cluster score of each second cluster as described herein. For example, controller 502 may identify the particular cluster to be a second cluster that has a highest cluster score among the second clusters and therefore most satisfies the requirements of containerized application 522 in the disaster recovery policy of containerized application 522 as compared to other second clusters. Additionally or alternatively, controller 502 may identify one or more second clusters that have their cluster score higher than a cluster score threshold and therefore satisfy the requirements of containerized application 522 in the disaster recovery policy of containerized application 522 at least to a certain level. In this case, controller 502 may present a list of the one or more second clusters to the user as a recommendation of disaster recovery clusters for containerized application 522. The user may provide a user input selecting a second cluster among the one or more second clusters, and controller 502 may identify the selected second cluster to be the particular cluster for containerized application 522 as described herein.

In some embodiments, controller 502 may determine that none of the second clusters satisfies the disaster recovery policy of containerized application 522. For example, controller 502 may determine that the cluster score of each second cluster does not satisfy (e.g., is lower than) the cluster score threshold and therefore does not satisfy the requirements of containerized application 522 in the disaster recovery policy of containerized application 522. In some embodiments, in response to such determination, controller 502 may create an additional second cluster that satisfies the disaster recovery policy of containerized application 522. For example, the additional second cluster may have resources, operation metrics, and cluster attributes respectively satisfying the resource requirements, the operation requirements, and the cluster requirements specified in the disaster recovery policy of containerized application 522. In some embodiments, controller 502 may identify the additional second cluster that is newly created and satisfies the requirements of containerized application 522 in the disaster recovery policy to be the particular cluster for containerized application 522.

As described herein, once the particular cluster is identified, controller 502 may assign the particular cluster to be the disaster recovery cluster for containerized application 522. When the particular cluster is selected to be the disaster recovery cluster of containerized application 522, the disaster recovery cluster (e.g., the particular cluster) may receive from the first cluster on which containerized application 522 is currently operated various information (e.g., application data, runtime data, configuration settings, etc.) associated with a first instance of containerized application 522 on the first cluster. The disaster recovery cluster may use this information to instantiate a second instance of containerized application 522 on the disaster recovery cluster that is identical to the first instance of containerized application 522 on the first cluster. As described herein, the second instance of containerized application 522 may remain passive or inactive on the disaster recovery cluster as a standby backup instance of the containerized application 522 while the first cluster is still up and running.

As described herein, the disaster recovery cluster may also be configured to detect an operation disruption of the first cluster. For example, as described herein, the disaster recovery cluster may determine that the first cluster did not send a predefined number of consecutive heartbeats via the heartbeat channel between the first cluster and the disaster recovery cluster, and therefore determine that the first cluster may be subjected to an operation disruption. To verify this determination, the disaster recovery cluster may initiate a ping request to the first cluster. If the first cluster does not respond to the ping request from the disaster recovery cluster, the disaster recovery cluster may verify that the first cluster is subjected to an operation disruption as described herein.

In some embodiments, in response to determining that the first cluster is subjected to an operation disruption, the disaster recovery cluster may take over the task of operating containerized application 522 from the first cluster as described herein. For example, the disaster recovery cluster may switch the second instance of containerized application 522 on the disaster recovery cluster to the active mode. Upon being switched to the active mode, the second instance of containerized application 522 on the disaster recovery cluster may take over the processing of the workloads that the first instance of containerized application 522 on the first cluster has not yet completed. Incoming requests of containerized application 522 may also be directed to and handled by the second instance of containerized application 522 on the disaster recovery cluster as described herein.

Thus, as described above, controller 502 may identify the disaster recovery cluster for containerized application 522 based on the disaster recovery policy of containerized application 522, which is user-defined and not system-generated. As the disaster recovery policy of containerized application 522 provided by the user is used to identify the disaster recovery cluster for containerized application 522, the quality of service that the user desires for containerized application 522 may be satisfied when the disaster recovery cluster takes over the operating of containerized application 522 in case of a disaster.

In some embodiments, controller 502 may identify the disaster recovery cluster for containerized application 522 not only based on the disaster recovery policy of containerized application 522 that is provided by the user but also based on the disaster recovery profile of containerized application 522 that is generated by controller 502. In some embodiments, the manner in which controller 502 may identify the disaster recovery cluster for containerized application 522 based on both the disaster recovery policy of containerized application 522 and the disaster recovery profile of containerized application 522 may be similar to the manner in which controller 502 identifies the disaster recovery cluster for containerized application 522 based only on the disaster recovery policy of containerized application 522 or based only on the disaster recovery profile of containerized application 522 described herein.

As an example, when identifying the particular cluster to be assigned as the disaster recovery cluster for containerized application 522, controller 502 may evaluate the cluster profile of each second cluster against both the disaster recovery policy of containerized application 522 and the disaster recovery profile of containerized application 522, and compute a cluster score for the second cluster based on the evaluating. For example, for each requirement in the disaster recovery policy of containerized application 522 and for each requirement in the disaster recovery profile of containerized application 522, controller 502 may determine whether a corresponding aspect of the second cluster satisfies the requirement and assign a score value to the second cluster for the requirement accordingly.

In some embodiments, controller 502 may compute a cluster score for the second cluster based on the score value of the second cluster for each requirement in the disaster recovery policy of containerized application 522 and also based on the score value of the second cluster for each requirement in the disaster recovery profile of containerized application 522. For example, each requirement in the disaster recovery policy of containerized application 522 and in the disaster recovery profile of containerized application 522 may be assigned a weight value. Controller 502 may compute a weighted average of the score values of the second cluster for the requirements in the disaster recovery policy of containerized application 522 and the score values of the second cluster for the requirements in the disaster recovery profile of containerized application 522. Controller 502 may then determine the cluster score of the second cluster to be the weighted average of the score values of the second cluster. As described herein, controller 502 may identify from the second clusters a particular cluster to be the disaster recovery cluster of containerized application 522 based on the cluster score of each second cluster.

As another example, controller 502 may use a machine learning model such as machine learning model 1102 to determine the cluster score for each second cluster based on both the disaster recovery policy of containerized application 522 and the disaster recovery profile of containerized application 522. For example, controller 502 may input into machine learning model 1102 the cluster profile of the second cluster, the disaster recovery policy of containerized application 522, and the disaster recovery profile of containerized application 522. Machine learning model 1102 may then output the cluster score for the second cluster based on the input. Thus, after being trained with the training examples in which each training example may include a disaster recovery profile of a containerized application 522 that is system-generated and/or a disaster recovery policy of a containerized application 522 that is user-defined, machine learning model 1102 may be used to compute the cluster score for the second cluster with an input including both the disaster recovery profile of containerized application 522 that is system-generated and the disaster recovery policy of containerized application 522 that is user-defined.

In some embodiments, controller 502 may aggregate the disaster recovery profile of containerized application 522 and the disaster recovery policy of containerized application 522 into disaster recovery cluster identification guidelines for containerized application 522. Controller 502 may then identify a disaster recovery cluster for containerized application 522 based on the disaster recovery identification guidelines of containerized application 522. For example, controller 502 may identify the disaster recovery cluster for containerized application 522 based on the disaster recovery identification guidelines of containerized application 522 in a manner similar to the manner in which controller 502 identifies the disaster recovery cluster for containerized application 522 based on the disaster recovery profile of containerized application 522 and/or the disaster recovery policy of containerized application 522 described herein.

It should be understood that controller 502 may identify the disaster recovery cluster for containerized application 522 based on the requirements in the disaster recovery policy of containerized application 522, the requirements in the disaster recovery profile of containerized application 522, and/or any combination of these requirements of containerized application 522. Similarly, different implementations for receiving the disaster recovery policy of containerized application 522, generating the disaster recovery profile of containerized application 522, evaluating the cluster profile of a second cluster against the disaster recovery policy of containerized application 522 and/or the disaster recovery profile of containerized application 522, and/or performing other operations described herein may be used together in any possible combination to identify the disaster recovery cluster for containerized application 522.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
generating, by a controller associated with a plurality of clusters, a disaster recovery profile of a containerized application deployed on a first cluster in the plurality of clusters, wherein the disaster recovery profile of the containerized application is generated based on data indicating operations of the containerized application in the first cluster, the disaster recovery profile specifying requirements of the containerized application;
identifying, by the controller and based on monitored user interactions with the containerized application, a subset of the requirements specified by the disaster recovery profile;
presenting, by the controller and by way of a user interface, the subset of the requirements;
receiving, by the controller and by way of a user interface, user input that adjusts a requirement included in the subset of the requirements;
generating, by the controller and based on the adjusted requirement and the disaster recovery profile, a disaster recovery policy of the containerized application;
determining, by the controller, a cluster profile of each second cluster among one or more second clusters that are distinct from the first cluster in the plurality of clusters;
identifying, by the controller and from the one or more second clusters, a particular cluster based on the disaster recovery policy of the containerized application and the cluster profile of each second cluster; and
assigning, by the controller, the particular cluster to be a disaster recovery cluster for the containerized application.

2. The method of claim 1, wherein:
the disaster recovery policy of the containerized application includes a resource requirement of the containerized application, an operation requirement of the containerized application, and a cluster requirement of the containerized application that are specified by the user.

3. The method of claim 1, wherein the generating of the disaster recovery profile of the containerized application comprises:
receiving, from an agent associated with a storage system of the first cluster, application information associated with one or more operations of the containerized application; and
generating the disaster recovery profile of the containerized application based on the application information.

4. The method of claim 3, wherein the agent is configured to:
obtain operation metadata describing the one or more operations of the containerized application, wherein the operation metadata is obtained from a plurality of infrastructure layers of a node that operates the containerized application in the first cluster.

5. The method of claim 4 wherein the plurality of infrastructure layers of the node comprise a container engine layer, an operating system layer, and a server hardware layer.

6. The method of claim 3, wherein the agent comprises a storage management containerized application that is deployed on the first cluster and provisions and provides a persistent storage resource to the containerized application.

7. The method of claim 1, further comprising:
receiving, by the controller and by way of the user interface, an additional user input that specifies one or more additional requirements of the containerized application to be included in the disaster recovery policy.

8. The method of claim 1, wherein:
the disaster recovery policy specifies an isolation level of the containerized application within a cluster that operates the containerized application.

9. The method of claim 1, wherein the identifying of the particular cluster includes:
evaluating the cluster profile of each second cluster against the disaster recovery policy of the containerized application;
computing a cluster score for each second cluster based on the evaluating; and
identifying, from the one or more second clusters, the particular cluster for the containerized application based on the cluster score of each second cluster.

10. The method of claim 1, wherein the identifying of the particular cluster includes:
determining that none of the one or more second clusters satisfies the disaster recovery policy of the containerized application;
creating, in response to the determining that none of the one or more second clusters satisfies the disaster recovery policy of the containerized application, an additional second cluster that satisfies the disaster recovery policy of the containerized application; and
identifying the additional second cluster to be the particular cluster for the containerized application.

11. The method of claim 1, wherein the disaster recovery cluster is configured to:
determine that the first cluster is subjected to an operation disruption; and
take over, in response to the determining that the first cluster is subjected to the operation disruption, a task of operating the containerized application from the first cluster.

12. The method of claim 1, wherein the disaster recovery profile of the containerized application is generated based on data collected and provided, to the controller, by a container storage system that is deployed on the first cluster and provisions and provides a persistent storage resource to the containerized application.

13. The method of claim 12, wherein the container storage system comprises a privileged containerized application deployed on the first cluster, the privileged containerized application having privileges that allow the container storage system to carry out storage-related tasks in a kernel space of a node that operates the containerized application in the first cluster.

14. A controller system associated with a plurality of clusters, the controller system comprising:
a memory storing instructions; and
one or more processors communicatively coupled to the memory and configured to execute the instructions to perform a process comprising:
generating a disaster recovery profile of a containerized application deployed on a first cluster in the plurality of clusters, wherein the disaster recovery profile of the containerized application is generated based on data indicating operations of the containerized application in the first cluster, the disaster recovery profile specifying requirements of the containerized application;
identifying, based on monitored user interactions with the containerized application, a subset of the requirements specified by the disaster recovery profile;

presenting, by way of a user interface, the subset of the requirements;

receiving, by way of a user interface, user input that adjusts a requirement included in the subset of the requirements;

generating, based on the adjusted requirement and the disaster recovery profile, a disaster recovery policy of the containerized application;

determining a cluster profile of each second cluster among one or more second clusters that are distinct from the first cluster in the plurality of clusters;

identifying, from the one or more second clusters, a particular cluster based on the disaster recovery policy of the containerized application and the cluster profile of each second cluster; and assigning the particular cluster to be a disaster recovery cluster for the containerized application.

15. The controller system of claim 14, wherein:
the disaster recovery policy of the containerized application includes a resource requirement of the containerized application, an operation requirement of the containerized application, and a cluster requirement of the containerized application that are specified by the user.

16. The controller system of claim 14, wherein the generating of the disaster recovery profile of the containerized application comprises:
receiving, from an agent associated with a storage system of the first cluster, application information associated with one or more operations of the containerized application; and
generating the disaster recovery profile of the containerized application based on the application information.

17. The controller system of claim 16, wherein the agent is configured to:
obtain operation metadata describing the one or more operations of the containerized application, wherein the operation metadata is obtained from one or more infrastructure layers of a node that operates the containerized application in the first cluster.

18. The controller system of claim 14, wherein the identifying of the particular cluster includes:
evaluating the cluster profile of each second cluster against the disaster recovery policy of the containerized application;
computing a cluster score for each second cluster based on the evaluating; and identifying, from the one or more second clusters, the particular cluster for the containerized application based on the cluster score of each second cluster.

19. The controller system of claim 14, wherein the identifying of the particular cluster includes:
determining that none of the one or more second clusters satisfies the disaster recovery policy of the containerized application;
creating, in response to the determining that none of the one or more second clusters satisfies the disaster recovery policy of the containerized application, an additional second cluster that satisfies the disaster recovery policy of the containerized application; and
identifying the additional second cluster to be the particular cluster for the containerized application.

20. A non-transitory computer-readable medium storing instructions that, when executed, direct a processor of a controller system associated with a plurality of clusters to perform a process comprising:
generating a disaster recovery profile of a containerized application deployed on a first cluster in the plurality of clusters, wherein the disaster recovery profile of the containerized application is generated based on data indicating operations of the containerized application in the first cluster, the disaster recovery profile specifying requirements of the containerized application;
identifying, based on monitored user interactions with the containerized application, a subset of the requirements specified by the disaster recovery profile;
presenting, by way of a user interface, the subset of the requirements;
receiving, by way of a user interface, user input that adjusts a requirement included in the subset of the requirements;
generating, based on the adjusted requirement and the disaster recovery profile, a disaster recovery policy of the containerized application;
determining a cluster profile of each second cluster among one or more second clusters that are distinct from the first cluster in the plurality of clusters;
identifying, from the one or more second clusters, a particular cluster based on the disaster recovery policy of the containerized application and the cluster profile of each second cluster; and
assigning the particular cluster to be a disaster recovery cluster for the containerized application.

* * * * *